United States Patent
Yamashita et al.

(10) Patent No.: US 6,584,219 B1
(45) Date of Patent: Jun. 24, 2003

(54) 2D/3D IMAGE CONVERSION SYSTEM

(75) Inventors: Syuugo Yamashita, Kadoma (JP); Yukio Mori, Kadoma (JP); Seiji Okada, Moriguchi (JP); Haruhiko Murata, Takatsuki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/152,328

(22) Filed: Sep. 14, 1998

(30) Foreign Application Priority Data

Sep. 18, 1997 (JP) ............................................. 9-253878
Sep. 22, 1997 (JP) ............................................. 9-256523
Sep. 24, 1997 (JP) ............................................. 9-259036

(51) Int. Cl.[7] ................................................. G06K 9/00
(52) U.S. Cl. ........................ 382/154; 382/103; 382/285; 345/422; 348/24; 348/169; 396/324; 396/377
(58) Field of Search ................................. 382/151, 154, 382/285, 106, 203, 103; 348/51, 48, 52–58, 44, 45, 43, 42, 24, 169; 345/1, 6, 7, 87, 302, 419, 418, 420–425, 433; 356/376, 374, 378; 396/377, 324

(56) References Cited

U.S. PATENT DOCUMENTS 5,588,067 A * 12/1996 Peterson et al. ............ 382/103
5,739,844 A * 4/1998 Kuwano et al. ............... 348/43
5,862,252 A * 1/1999 Yamamoto et al. ......... 345/419

* cited by examiner

Primary Examiner—Timothy M. Johnson
Assistant Examiner—Sheela Chawan
(74) Attorney, Agent, or Firm—Arent Fox Kintner Plotkin & Kahn

(57) ABSTRACT

A 2D/3D image conversion system includes target phase value calculating means for calculating a target phase value per parallax calculation region based on a dynamic range of a preset target phase value and depth information per given unit area generated by depth information generating means; real phase value calculating means which calculates a current real phase value per parallax calculation region in a manner to progressively approximate a real phase value to a target phase value of a parallax calculation region with a corresponding previous real phase value and then determines a current real phase value per given unit area based on the current real phase value per parallax calculation region thus obtained; and phase control means for producing a first image signal and a second image signal from a signal residing in each given unit area of the 2D input image, the first and second image signals having a horizontal phase difference therebetween based on the current real phase value corresponding to the given unit area.

14 Claims, 46 Drawing Sheets

FIG. 13

| F1 | F2 | F3 | F4 | F5 | F6 | F7 | F8 | F9 | F10 |
|----|----|----|----|----|----|----|----|----|-----|
| F11 | F12 | F13 | F14 | F15 | F16 | F17 | F18 | F19 | F20 |
| F21 | F22 | F23 | F24 | F25 | F26 | F27 | F28 | F29 | F30 |
| F31 | F32 | F33 | F34 | F35 | F36 | F37 | F38 | F39 | F40 |
| F41 | F42 | F43 | F44 | F45 | F46 | F47 | F48 | F49 | F50 |
| F51 | F52 | F53 | F54 | F55 | F56 | F57 | F58 | F59 | F60 |

FIG. 15

| G1 | G1 | G1 | G1 | G1 | G1 |
|----|----|----|----|----|----|
| G1 | G1 | G2 | G2 | G2 | G2 |
| G1 | G1 | G4 | G2 | G4 | G4 |
| G1 | G4 | G4 | G4 | G4 | G4 |
| G1 | G4 | G4 | G4 | G4 | G4 |
| G1 | G4 | G4 | G4 | G4 | G4 |
| G1 | G1 | G4 | G2 | G4 | G4 |
| G1 | G1 | G1 | G3 | G3 | G3 |
| G1 | G1 | G1 | G1 | G3 | G3 |
| G1 | G1 | G1 | G1 | G3 | G3 |

FIG. 22

| 1 | 1 | 2 | 3 | 4 | 5 |
|---|---|---|---|---|---|
| 1 | 1 | 2 | 3 | 4 | 5 |
| 1 | 2 | 3 | 4 | 5 | 5 |
| 2 | 3 | 4 | 6 | 6 | 6 |
| 2 | 4 | 6 | 6 | 7 | 7 |
| 2 | 4 | 6 | 6 | 7 | 7 |
| 2 | 3 | 4 | 6 | 6 | 6 |
| 1 | 2 | 3 | 4 | 5 | 5 |
| 1 | 1 | 2 | 3 | 4 | 5 |
| 1 | 1 | 2 | 3 | 4 | 5 |

| PARALLAX UL \ VERTICAL POSITION | HORIZONTAL POSITION | | | | |
|---|---|---|---|---|---|
| | 0~m | m~2m | 2m~3m | 3m~4m | 4m~0 |
| 0~n | E1 | E1 | E2 | E3 | E4 |
| n~2n | E1 | E1 | E2 | E3 | E4 |
| 2n~3n | E5 | E5 | E6 | E7 | E8 |
| 3n~4n | E9 | E9 | E10 | E11 | E12 |

(b)

| PARALLAX UR \ VERTICAL POSITION | HORIZONTAL POSITION | | | | |
|---|---|---|---|---|---|
| | 0~m | m~2m | 2m~3m | 3m~4m | 4m~0 |
| 0~n | E1 | E2 | E3 | E4 | E4 |
| n~2n | E1 | E2 | E3 | E4 | E4 |
| 2n~3n | E5 | E6 | E7 | E8 | E8 |
| 3n~4n | E9 | E10 | E11 | E12 | E12 |

(c)

| PARALLAX DL \ VERTICAL POSITION | HORIZONTAL POSITION | | | | |
|---|---|---|---|---|---|
| | 0~m | m~2m | 2m~3m | 3m~4m | 4m~0 |
| 0~n | E1 | E1 | E2 | E3 | E4 |
| n~2n | E5 | E5 | E6 | E7 | E8 |
| 2n~3n | E9 | E9 | E10 | E11 | E12 |
| 3n~4n | E9 | E9 | E10 | E11 | E12 |

(d)

| PARALLAX DR \ VERTICAL POSITION | HORIZONTAL POSITION | | | | |
|---|---|---|---|---|---|
| | 0~m | m~2m | 2m~3m | 3m~4m | 4m~0 |
| 0~n | E1 | E2 | E3 | E4 | E4 |
| n~2n | E5 | E6 | E7 | E8 | E8 |
| 2n~3n | E9 | E10 | E11 | E12 | E12 |
| 3n~4n | E9 | E10 | E11 | E12 | E12 |

NOTE: "0~m" DENOTES A VALUE OF NOT LESS THAN "0" AND LESS THAN "m"

FIG. 49

| 1 | 1 | 2 | 3 | 4 | 5 |
|---|---|---|---|---|---|
| 1 | 1 | 2 | 3 | 4 | 5 |
| 1 | 2 | 3 | 4 | 5 | 5 |
| 2 | 3 | 4 | 6 | 6 | 6 |
| 2 | 4 | 6 | 6 | 7 | 7 |
| 2 | 4 | 6 | 6 | 7 | 7 |
| 2 | 3 | 4 | 6 | 6 | 6 |
| 1 | 2 | 3 | 4 | 5 | 5 |
| 1 | 1 | 2 | 3 | 4 | 5 |
| 1 | 1 | 2 | 3 | 4 | 5 |

FIG. 50

| 7 | 6 | 5 | 5 | 6 | 7 |
|---|---|---|---|---|---|
| 6 | 5 | 4 | 4 | 5 | 6 |
| 5 | 4 | 3 | 3 | 4 | 5 |
| 4 | 3 | 2 | 2 | 3 | 4 |
| 3 | 2 | 1 | 1 | 2 | 3 |
| 3 | 2 | 1 | 1 | 2 | 3 |
| 4 | 3 | 2 | 2 | 3 | 4 |
| 5 | 4 | 3 | 3 | 4 | 5 |
| 6 | 5 | 4 | 4 | 5 | 6 |
| 7 | 6 | 5 | 5 | 6 | 7 |

FIG. 51

| N | N | R | R | R | R | R | R | R | R |
|---|---|---|---|---|---|---|---|---|---|
| N | N | R | R | R | R | R | R | R | R |
| N | F | F | F | R | R | R | R | R | R |
| F | F | F | F | F | R | R | R | R | R |
| F | F | F | F | F | F | R | R | R | R |
| F | F | F | F | F | F | F | R | R | R |

F : FRONT VIEW REGION
R : REAR VIEW REGION
N : UNDECIDABLE REGION

2D/3D IMAGE CONVERSION SYSTEM

BACKGROUND OF THE INVENTION

1. Field of the Invention

The present invention relates generally to a 2D/3D image conversion system for converting two-dimensional images into three-dimensional images.

2. Related Art

There has been known a method of converting two-dimensional (2D) images into three-dimensional (3D) images including the steps of: generating, from a 2D image signal, a main image signal and a sub-image signal time-delayed relative to the main image signal by utilizing a plurality of field memories; and outputting either one of the main and sub-image signals as a left-eye image signal and the other as a right-eye image signal.

A time delay of the sub-image signal relative to the main image signal (hereinafter referred to as "delay value") is determined based on a velocity of horizontal motion of the main image. That is, the greater the velocity of horizontal motion of the main image, the smaller the delay value. Further, which of the main image and the sub-image is represented by the left-eye image signal with the other represented by the right-eye image signal is determined based on a direction (leftward or rightward) of the horizontal motion of the main image.

Since such a method is adapted to convert only 2D moving images into 3D images, this method is referred to as "2D/3D moving image conversion method".

The present applicants have already developed a method of converting 2D still images into 3D images (hereinafter referred to as "2D/3D still image conversion method"), having filed an application for patent (Japanese Patent Application No.9(1997)-159949). However, having not yet been laid open, this application does not constitute the prior art.

This 2D/3D still image conversion method includes the steps of: extracting from a 2D input image signal a perspective image characteristic value of each of a plurality of parallax calculation regions defined in a one-field screen, the extraction performed on a field-by-field basis; generating parallax information per given unit area in the one-field screen based on the image characteristic value per parallax calculation region thus extracted; and generating a first image signal and a second image signal from a signal residing in each of the given unit areas of the 2D input image, the first and second image signals having a horizontal phase difference therebetween based on the parallax information corresponding to the given unit area.

Now referring to FIGS. 1 to 3, description will be made on the 2D/3D still image conversion method (Japanese Patent Application No.9(1997)-159949) developed by the applicants. It is to be noted that this 2D/3D still image conversion method has not yet been known to the art and hence, does not constitute the prior art.

FIG. 1 is a block diagram showing a whole construction of a 2D/3D image conversion system for converting 2D images into 3D images.

A luminance signal Y and color difference signals R-Y and B-Y constituting a 2D image signal are respectively converted into digital signals Y, R-Y and B-Y by means of an AD conversion circuit 1 (ADC).

The Y signal is supplied to a high-frequency component integrating circuit 8 and a luminance contrast calculating circuit 9 as well as to a first left-eye-image optional pixel delay FIFO 11 and a first right-eye-image optional pixel delay 21. The R-Y signal is supplied to an R-Y component integrating circuit 31 as well as to a second left-eye-image optional pixel delay FIFO 12 and a second right-eye-image optional pixel delay FIFO 22. The B-Y signal is supplied to a B-Y component integrating circuit 32 as well as to a third left-eye-image optional pixel delay FIFO 13 and a third right-eye-image optional pixel delay FIFO 23.

As shown in FIG. 2, the high-frequency component integrating circuit 8 performs calculation on a field-by-field basis for giving an integrated value of high-frequency component of each of the plural parallax calculation regions E1 to E12 previously defined in the one-field screen. The luminance contrast calculating circuit 9 calculates a luminance contrast of each of the parallax calculation regions E1 to E12 on a field-by-field basis. The R-Y component integrating circuit 31 calculates an integrated value of R-Y component of each of the parallax calculation regions E1 to E12 on a field-by-field basis. The B-Y component integrating circuit 32 calculates an integrated value of B-Y component of each of the parallax calculation regions E1 to E12 on a field-by-field basis.

The high-frequency component integration values, luminance contrasts, R-Y component integrated values and B-Y component integrated values of the respective parallax calculation regions E1 to E12 are used as perspective image characteristic values of the respective parallax calculation regions E1 to E12.

In an example shown in FIG. 13, the one-field screen includes a total of 60 parallax calculation regions in 6 rows and 10 columns. However, it is assumed for convenience in explanation that a total of 12 parallax calculation regions E1 to E12 in 3 rows and 4 columns are defined in a one-field screen, as shown in FIG. 2.

A CPU 3 generates parallax information on the respective parallax calculation regions E1 to E12 based on information supplied from the high-frequency component integrating circuit 8, luminance contrast calculating circuit 9, R-Y component integrating circuit 31 and B-Y component integrating circuit 32. In this example, the parallax information is generated such that the more to the front is located an object like a subject in a scene of the example, the smaller is the parallax value while the more to the back is located an object like a background of the scene of the example, the greater is the parallax value. A method of generating the parallax information will hereinafter be described in detail.

The parallax information per parallax calculation region E1 to E12 thus given by the CPU 3 is sent to a parallax control circuit 4. The parallax control circuit 4, in turn, generates parallax information per pixel position in each field based on the parallax information on the respective parallax calculation regions E1 to E12. Based on the parallax information per pixel position, the parallax control circuit 4 controls readout addresses of FIFOs 11 to 13 and 21 to 23 so as to read out an image signal(Y, R-Y and B-Y signals) from the left-eye-image optional pixel delays FIFOs 11 to 13 and from the right-eye-image optional pixel delays FIFOs 21 to 23, respectively, with the addresses of FIFOs 11 to 13 and of FIFOs 21 to 23 shifted from each other. Hence, left-eye image signals read out from the left-eye-image optional pixel delays FIFOs 11 to 13 have different horizontal phases from right-eye image signals read out from the right-eye-image optional pixel delays FIFOs 21 to 23.

The left-eye image signals (YL signal, (R-Y)L signal and (B-Y)L signal) read out from the left-eye-image optional pixel delays FIFOs 11 to 13 are converted into analog signals through a DA conversion circuit (DAC) 5 before supplied to an unillustrated three-dimensional display unit. The right-eye image signals (YR signal, (R-Y)R signal and (B-Y)R signal) read out from the right-eye-image optional pixel delays FIFOs 21 to 23 are converted into analog signals through a DA conversion circuit (DAC) 6 before supplied to the unillustrated three-dimensional display unit.

Since the left-eye image signal has a different horizontal phase from that of the right-eye image signal, a parallax is produced between the left eye image and the right eye image. Hence, by viewing the left eye image with the left eye alone and the right eye image with the right eye alone, a three-dimensional image is established wherein the subject is located to the front against the background.

FIG. 3 diagrammatically illustrates a configuration of the R-Y component integrating circuit 31.

FIG. 2 shows horizontal positions (HAD) and vertical positions (VAD) wherein a number of horizontal pixels of each parallax calculation region E1 to E12 is represented by "m", that of vertical pixels of each parallax calculation regions is represented by "n" and coordinates of an upper left vertex of the first parallax calculation region E1 are represented by (a, b).

The R-Y component integrating circuit 31 includes a timing signal generating circuit 201, an adder circuit 202, an R-Y component integration register group 203 and the selection circuit (SEL) 204. The R-Y component integration register group 203 includes first to twelfth R-Y component integration registers 211 to 222 corresponding to the respective parallax calculation regions E1 to E12.

The timing signal generating circuit 201 is supplied with a horizontal synchronizing signal Hsync and a vertical synchronizing signal Vsync of an input image signal, and a clock signal CLK for detection of a horizontal address of each horizontal period.

The timing signal generating circuit 201 serves to output first to twelfth enable signals EN1 to EN12, a reset signal RST and an output timing signal DOUT based on the horizontal synchronizing signal Hsync, vertical synchronizing signal Vsync and clock signal CLK.

The enable signals EN1 to EN12 correspond to the parallax calculation regions E1 to E12, respectively, and are normally at L level, rising to H level when the horizontal/vertical position of the input image signal is in a region corresponding thereto. The first to twelfth enable signals EN1 to En12 are inputted in first to twelfth luminance integration registers 211 to 222 as a write signal, respectively. The first to twelfth enable signals EN1 to EN12 are supplied to a selection circuit 204, as well. The selection circuit 204 selectively outputs input data in correspondence to an enable signal at H level.

The reset signal RST is outputted as timed to a start of a valid image per field of the input image signal so as to be supplied to the respective R-Y component integration registers 211 to 222. With input of the reset signal RST, a content of the respective R-Y component integration registers 211 to 222 is reset to 0.

As shown in FIG. 2, the timing signal DOUT is at H level during a predetermined period of time starting from when the vertical position of the input image signal passes a vertically lowermost position of the parallax calculation region E12 in the lowest row. The output timing signal DOUT is supplied to the CPU 3.

The reset signal is outputted as timed to the start of the valid image in the input image signal for resetting the contents of the respective R-Y component integration registers 211 to 222 to 0. Where the horizontal/vertical position of the input image signal is in the first parallax calculation region E1, the first enable signal EN1 rises to H level, so that an R-Y value retained by the first R-Y component integration register 211 is supplied to the adder circuit 202 via the selection circuit 204 while the R-Y signal of the input image signal is applied to the adder circuit 202.

Accordingly, the R-Y value retained by the first luminance integration register 211 and the R-Y signal of the input image signal are added together by the adder circuit 202. A resultant sum is stored in the first R-Y component integration register 211. That is, when the horizontal/vertical position of the input image signal is in the first parallax calculation region E1, R-Y values of the pixels in the first parallax calculation region E1 are sequentially integrated while the integration results are accordingly stored in the first R-Y component integration register 211.

In this manner, the R-Y component integration values of the respective parallax calculation regions E1 to E12 are stored in the corresponding R-Y component integration registers 211 to 222. When the output timing signal DOUT rises to H level, the R-Y component integration values stored in the respective R-Y component integration registers 211 to 222 in correspondence to the parallax calculation regions E1 to E12 are supplied to the CPU 3 via a data bus (DATA-BUS).

The B-Y component integrating circuit 32 has the same configuration with the R-Y component integrating circuit 31 of FIG. 3 and therefore, a description thereof is omitted.

FIG. 4 diagrammatically illustrates a configuration of the high-frequency component integrating circuit 8. The high-frequency component integrating circuit 8 includes a timing signal generating circuit 231, a high-pass filter (HPF) 232, an absolutizing circuit 233, a slicing circuit 234, an adder circuit 235, a high-frequency component integration register group 236 and a selection circuit 237. The high-frequency component integration register group 236 includes first to twelfth high-frequency component integration registers 241 to 252 in correspondence to the parallax calculation regions E1 to E12.

Input and output signals of the timing signal generating circuit 231 are the same with those of the timing signal generating circuit 201 shown in FIG. 3.

As shown in FIG. 5, for example, the high-pass filter 232 may include five D flip-flops 261 to 165, a bit shift circuit 266 for providing an output twice the value of an input value, an adder 267 and a subtractor 268, having tap factors of −1, 0, 2, 0 and −1.

The slicing circuit 234 may have input/output characteristics shown in FIG. 6. The circuit is adapted to provide an output of 0 with respect to an input in a range of between 0 and Ia in order to prevent noises from being extracted as a high-frequency component.

Thus, the high-pass filter 232 extracts a high-frequency component of Y signal of the input image signal, an absolute value of which component is obtained by the absolutizing circuit 233 and is removed of noises by the slicing circuit 234.

The reset signal is outputted as timed to the start of a valid image of the input image signal so as to reset contents of the high-frequency component integration registers 241 to 252 to 0. Where a horizontal/vertical position of the input image signal is in the first parallax calculation region E1, the first enable signal EN1 rises to H level so that the high-frequency component retained in the first high-frequency component integration register 241 is supplied to the adder circuit 235 via the selection circuit 237 while the high-frequency component of Y signal (or the output from the slicing circuit 234) of the input image signal is supplied to the adder circuit 235.

Thus, the high-frequency component retained by the first high-frequency component integration register 241 and that of Y signal of the input image signal are added together by the adder circuit 235. A resultant sum is stored in the first high-frequency component integration register 241. That is, when the horizontal/vertical position of the input image signal is in the first parallax calculation region E1, high-frequency components of the pixels in the first parallax calculation region E1 are sequentially integrated while integration results are accordingly stored in the first high-frequency component integration register 241.

In this manner, high-frequency component integration values of the respective parallax calculation regions E1 to E12 are stored in the corresponding high-frequency component integration registers 241 to 252. When the output timing signal DOUT rises to H level, the high-frequency component integration values stored in the respective high-frequency component integration registers 241 to 252 in correspondence to the parallax calculation regions E1 to E12 are supplied to the CPU 3 via a data bus.

FIG. 7 diagrammatically illustrates another exemplary configuration of the high-frequency component integration circuit 8.

This high-frequency component integration circuit 8 includes a timing signal generating circuit 238, the high-pass filter 232, a peak detecting circuit 239, the adder circuit 235, the high-frequency component integration register group 236 and the selection circuit 237.

The timing signal generating circuit 238 operates substantially the same way with the timing signal generating circuit 201 of FIG. 3 except for that a trigger pulse (region boundary signal RST1) is outputted when the input image signal reaches each horizontal position preceding the parallax calculation region E1, E5 or D9 and the last horizontal position of each parallax calculation region E1 to E12, as shown in FIG. 2. The region boundary signal RST1 is supplied to the peak detecting circuit 239.

The high-frequency component of Y signal extracted by the high-pass filter 232 is supplied to the peak detecting circuit 239. The peak detecting circuit 239 detects a maximum value of the high-frequency components of each horizontal line of each parallax calculation region E1 to E12. The peak detecting circuit 239 may include a comparison circuit 271, a maximum value register 272 and a gate 273, as shown in FIG. 8. FIG. 9 is a timing chart showing the horizontal synchronizing signal Hsync, the region boundary signal RST1 and an output from the gate 273.

The maximum value register 272 is supplied with the high-frequency component of Y signal extracted by the high-pass filter 232, the region boundary signal RST1, a judgment signal La from the comparison circuit 271 and the clock signal CLK. The comparison circuit 271 compares the output from the maximum value register 272 and the high-frequency component of Y signal of the input image signal so as to raise the judgment signal La to H level when determining the high-frequency component of Y signal to be greater than the output from the maximum value register 272.

Rising to H level, the region boundary signal RST1 resets a content of the maximum value register 272 to 0. If the judgment signal La from the comparison circuit 271 is at H level while the region boundary signal RST1 is at L level, the high-frequency component of Y signal is stored in the maximum value register 272. That is, the content of the maximum value register 272 is updated. Thus, in each period during which the region boundary signal RST1 is at L level, the maximum value register 272 stores the maximum value of high-frequency components of Y signal with respect to the respective pixels in one horizontal line of one of the parallax calculation regions E1 to E12 that corresponds to the horizontal/vertical position of the input image signal.

The gate 273 provides an output value of the maximum value register 272 in response to the region boundary signal RST1 rising to H level while providing an output of 0 when the region boundary signal RST1 is at L level. More specifically, each time the region boundary signal RST1 rises to H level, the gate circuit 273 outputs the maximum value of the high-frequency components of Y signal with respect to one horizontal line of a given parallax calculation region E1 to E12, the maximum value stored in the maximum value register 272. Hence, integration values of maximum values of high-frequency components of Y signal with respect to the respective horizontal lines of the respective parallax calculation regions are stored in the corresponding high-frequency integration registers 241 to 252 (see FIG. 7).

FIG. 10 diagrammatically illustrates a configuration of the luminance contrast calculating circuit 9.

The luminance contrast calculating circuit 9 includes a timing signal generating circuit 301 and a luminance contrast sensing circuit group 302. The luminance contrast sensing circuit group 302 includes first to twelfth luminance contrast sensing circuits 311 to 322 corresponding to the parallax calculation regions E1 to E12, respectively.

The timing signal generating circuit 301 provides the same input and output signals as those of the timing signal generating circuit 201 shown in FIG. 3.

As shown in FIG. 11, the luminance contrast sensing circuits 311 to 322 each include a first comparison circuit 331, a maximum value register 332, a second comparison circuit 333, a minimum value register 334 and a subtractor 335.

The maximum value register 332 is supplied with Y signal of the input image signal, one of the enable signals EN (N=1,2 . . . 12) associated with one of the regions E1 to E12 corresponding to one of the luminance contrast sensing circuits, a reset signal RST, a judgment signal Lb outputted from the first comparison circuit 331 and a clock signal CLK. The first comparison circuit 331 compares an output value of the maximum value register 332 with Y signal of the input image signal so as to raise the judgment signal Lb to H level when determining the Y signal of the input image signal to be greater than the output value from the maximum value register 332.

Raised to H level, the reset signal RST resets a content of the maximum value register 332 to 0. When the enable signal EN associated with that of the regions E1 to E12 corresponding to the luminance contrast sensing circuit and the judgment signal Lb are both at H level, the Y signal is stored in the maximum value register 332. That is, the content of the maximum value register 332 is updated. Accordingly, immediately before an output timing signal DOUT is outputted, the maximum value of luminance values of the respective pixels in that of the parallax calculation regions E1 to E12 corresponding to the luminance contrast sensing circuit is stored in the maximum value register 332.

The minimum value register 334 is supplied with Y signal of the input image signal, an enable signal EN (N=1,2 . . .

12) associated with one of the regions E1 to E12 corresponding to one of luminance contrast sensing circuits, the reset signal RST, a judgment signal Lc outputted from the second comparison circuit 333 and the clock signal CLK. The second comparison circuit 333 compares an output value from the minimum value register 334 with the Y signal of the input image signal so as to raise the judgment signal Lc to H level when determining the Y signal of the input image signal to be smaller than the output value from the minimum value register 334.

When the reset signal RST rises to H level, a predetermined maximum value is set in the minimum value register 334. When the enable signal EN associated with that of the regions E1 to E12 corresponding to the luminance contrast sensing circuit and the judgment signal Lc are both at H level, the Y signal is stored in the minimum value register 334. That is, the content of the minimum value register 334 is updated. Accordingly, immediately before the output timing signal DOUT is outputted, the minimum value of luminance values of the pixels in that of the parallax calculation regions E1 to E12 corresponding to the luminance contrast sensing circuit is stored in the minimum value register 334.

As a result, at the time of output of the output timing signal DOUT, an output from the subtractor 335 has a value equal to a difference (luminance contrast) between the maximum value and the minimum value of the luminance values of the pixels in the corresponding one of the parallax calculation regions E1 to E12. Subsequently, when the output timing signal DOUT is outputted, the subtractor 335 applies the output (luminance contrast) to the CPU 3.

FIG. 12 is a flow chart representing steps in a parallax information generating procedure taken by the CPU 3 on a per-parallax-calculation-region basis.

The parallax information generating procedure performed on each segment region includes: a grouping processing (Step 1); a spatial separation processing (Step 2); a singular point processing (Step 3); an intergroup coupling processing (Step 4); a per-group depth information generation processing (Step 5); an all-region depth information correction processing (Step 6); a group-boundary depth information correction processing (Step 7); an in-group depth information correction processing (Step 8); and a parallax information calculation processing (Step 9).

Now the parallax information generating procedure will hereinbelow be described by way of example of 60 parallax calculation regions actually defined in one field. FIG. 13 shows 60 parallax calculation regions F1 to F60 defined in one field.

(1) Grouping Processing

The grouping processing of Step 1 is an initial processing of the procedure which is intended to divide all the regions constituting one image frame into groups associated with respective objects included in the image frame. There are two grouping methods which will be described as below.

(1-1) First Method

First, high-frequency component integration values of the respective parallax calculation regions F1 to F60 are normalized to values in a predetermined range (e.g., 0 to 20). This is followed by producing a distribution (histogram) of parallax calculation regions (by number) belonging to the respective values normalized from the high-frequency component integration values. FIG. 14 shows an example of the histogram thus produced. Parallax calculation regions included in bars between valleys in the histogram are combined into one group. The histogram may be based on luminance contrasts instead of high-frequency component integration values. FIG. 15 shows the result of dividing the parallax calculation regions F1 to F60 into groups with symbols G1 to G4 each indicating a group number.

(1-2) Second Method

First, R-Y component integration values of the respective parallax calculation regions F1 to F60 are normalized to values in a range of between 0 and 20. This is followed by the production of distribution (histogram) of parallax calculation regions (by number) belonging to the respective normalized values of the R-Y component integration values. Based on the resultant histogram, intergroup boundary values are found from the normalized values of the R-Y component integration values.

On the other hand, the B-Y component integration values of the respective parallax calculation regions F1 to F60 are normalized to values in a range of between 0 and 10. This is followed by the production of distribution (histogram) of parallax calculation regions (by number) belonging to the respective normalized values of the B-Y component integration values. Based on the resultant histogram, intergroup boundary values are found from the normalized values of the B-Y component integration values.

By using two types of boundary values thus found, all the parallax calculation regions F1 to F60 are divided into groups, as shown in FIG. 16. FIGS. 17 and 18 show the result of dividing the parallax calculation regions F1 to F60 into groups with symbols G1 to G5 each indicating a group number.

In this example, the grouping processing is performed according to the second method.

(2) Spatial Separation Processing In the spatial separation processing of Step 2, out of the parallax calculation regions combined into the same group at Step 1, parallax calculation regions spatially adjoining each other are considered to belong to the same group. In short, although combined into the same group by the processing of Step 1, parallax calculation regions spatially separated by another group are considered to belong to different groups.

More specifically, the parallax calculation regions determined to be included in the group 3 (G3) are divided into three groups 31 (G31), 32 (G32) and 33 (G33).

(3) Singular Point Processing

In a case where a group consisting of a single parallax calculation region exists, the singular point processing determines whether the single parallax calculation region corresponds to an object different from object(s) corresponded by other adjoining groups or to the same object with that corresponded by other adjoining group.

It is assumed, for example, that a group consists of a parallax calculation region A alone, as shown in FIG. 20. In the figure, of the two parallax calculation regions located upwardly of the parallax calculation region A, the closest one to the region A is denoted by U1 and the other by U2. Of the two parallax calculation regions located downwardly of the region A, the closest one to the region A is denoted by D1 and the other by D2. Of the two parallax calculation regions located leftwardly of the region A, the closest one to the region A is denoted by L1 and the other by D2. Of the two parallax calculation regions located rightwardly of the region A, the closest one to the region A is denoted by R1 and the other by R2.

In this case, when color distances between the region A and the adjoining regions U1, D1, L1 and R1 are greater than those between the regions U1, D1, L1 and R1 and their adjoining regions U2, D2, L2 and R2, respectively, the group consisting of the region A alone is determined to constitute one independent group. Otherwise, the region A is determined to belong to any one of the neighboring groups. That is, the grouping of the regions is corrected.

Now, the definition of the color distance will be described. It is herein assumed that a B-Y component integration value and an R-Y component integration value with respect to a certain parallax calculation region Fa are denoted by Fa(B-Y) and Fa(R-Y) while a B-Y component integration value and an R-Y component integration value with respect to another parallax calculation region Fb are denoted by Fb(B-Y) and Fb(R-Y). Then, a color distance "dist" between the region Fa and the region Fb is defined by the following equation (1):

$$dist=|Fa(B-Y)-Fb(B-Y)|+|Fa(R-Y)-Fb(R-Y)| \quad (1)$$

For example, if the region A has (B-Y component integration value, R-Y component integration value) of (−4, 5), the region U2 has those of (−5, 4) and the region U2 has those of (−7, 2), in FIG. 20. Then, a color distance "dist" between the regions A and U1 is "2" whereas a color distance "dist" between the regions U1 and U2 is "4".

If the group 31 (G31) in FIG. 19 consists of a single parallax calculation region and is determined to belong to the group 1 (G1) by the above singular point processing, the grouping of the regions is corrected as shown in FIG. 21.

(4) Intergroup Coupling Processing

In the intergroup coupling processing of Step 4, firstly calculated are mean values of the R-Y component integration values and of the B-Y component integration values of parallax calculation regions constituting each group.

Subsequently, a color distance between adjacent two groups is calculated. Provided that the two adjoining groups are denoted by Ga and Gb. If the group Ga consists of n parallax calculation regions a1, a2, ... an, a mean value *Ga(B-Y) of the B-Y component integration values and a mean value *Ga(R-Y) of the R-Y component integration values of the group Ga are given by the following equations (2):

$$*Ga(B-Y)=\{a1(B-Y)+a2(B-Y)+ \ldots +an(B-Y)\}\div n \quad *Ga(R-Y)=\{a1(R-Y)+a2(R-Y)+ \ldots +an(R-Y)\}\div n \quad (2)$$

Provided that the group Gb consists of m parallax calculation regions b1, b2, ... bm, a mean value *Gb(B-Y) of the B-Y component integration values and a mean value *Gb(R-Y) of the R-Y component integration values of the group Gb are given by the following equations (3):

$$*Gb(B-Y)=\{b1(B-Y)+b2(B-Y)+ \ldots +bm(B-Y)\}\div m \quad *Gb(R-Y)=\{b1(R-Y)+b2(R-Y)+ \ldots +bm(R-Y)\} \quad (3)$$

A color distance "dist" between the groups Ga and Gb is defined by the following equation (4):

$$dist=|*Ga(B-Y)-*Gb(B-Y)|+|*Ga(R-Y)-*Gb(R-Y)| \quad (4)$$

Then, whether the color distance between the adjacent groups is smaller than a threshold value or not is determined. If the color distance is smaller than the threshold value, these two groups are coupled together or combined into one group.

(5) Per-Group Depth Information Generation Processing

In the per-group depth information generation processing of Step 5, high-frequency component integration values of the respective parallax calculation regions F1 to F60 are first normalized to values in a range of between 0 and 10. Further, luminance contrasts of the respective parallax calculation regions F1 to F60 are also normalized to values in the range of between 0 and 10.

The resultant normalized values of the high-frequency component integration values and of the luminance contrasts as well as background weight components previously given to the respective parallax calculation regions F1 to F60 are used to generate depth information on a group-by-group basis.

Now, description will be made on a process of generating depth information on optional one group. First, the number n of parallax calculation regions included in this group is found. On the other hand, a calculation is performed to find a sum total Σa of normalized values "a" of high-frequency component integration values of the parallax calculation regions included in the group. A calculation is also performed to find a sum total Σb of normalized values b of luminance contrasts of the parallax regions of the group. Further, a calculation is performed to find a sum total Σc of weight components c with respect to the parallax calculation regions of the group.

Then, depth information H on the group is generated based on the following equation (5):

$$H=(K1 \cdot \Sigma a+K2 \cdot \Sigma b+K3 \cdot \Sigma c)\div n \quad (5)$$

wherein K1, K2 and K3 denote factors defined as, for example, K1=3/8, K2=1/8, K3=4/8, respectively.

(6) All-Region Depth Information Correction Processing

In the all-region depth information correction processing of Step 6, a mean value of depth information on the parallax calculation regions F1 to F60 is first determined on a row-by-row basis. In a case where the depth information per parallax calculation region F1 to F60 is as shown in FIG. 23, for example, the first to the sixth region rows respectively have a mean value of 1.2, 3.6, 6.0, 7.2, 4.0 and 1.2.

Of the rows of parallax calculation regions, extracted is a row of regions wherein foreground object(s) occupy greater area than in the other region rows. That is, the region row having the greatest mean value of the depth information is extracted. According to the example of FIG. 23, the regions of the fourth row are extracted.

Subsequently, regions in rows below the extracted row are each subject to adjustment of the depth information thereof so that each of the regions is not sharply decreased in the depth information thereof relative to that of the region immediately thereabove. More specifically, of the regions included in the rows below the extracted row, a region, having depth information smaller than a region thereabove by not less than three, is changed in its depth information to a value smaller than that of the region thereabove by two.

In the example of FIG. 23, out of the regions F41 to F50 of the fifth row, the regions F42 to F49 having the depth information smaller than the respective regions thereabove by not less than three are first corrected in their depth information, as shown in FIG. 24. Subsequently, of the regions F51 to F60 in the sixth row, the regions F53 to F58 having the depth information smaller than those (after correction) of the respective regions thereabove by not less than three are corrected in the depth information thereof.

Where depth information has a relation with a vertical level of screen at an optional horizontal position as represented by a curve U1 in FIG. 25, the relation of the depth information versus the vertical level of screen is corrected to that represented by a curve U2 in FIG. 25.

It is for the following reason that, of the rows of parallax calculation regions, the region rows below the region row wherein foreground object(s) occupy greater area than in these rows are corrected in the depth information thereof.

In most cases, objects on the front of the scene are located on the lower side of the screen. In addition, images of objects located on the lower side of the screen, such as of ground and the like, often have a little variation. The image with a little variation like that of the ground has a low high-frequency component and therefore, has a low depth information value despite being located to the front of the scene. Hence, the depth correction is provided in order to increase the depth information value with respect to the image of the foreground object and with a low high-frequency component to a degree that the depth information value of such a region is not excessive of that of a region thereabove.

(7) Group-Boundary Depth Information Correction Processing

In some cases, regions in a boundary portion between two adjacent groups may not be divided into correct groups. Further if, in the boundary portion between the two adjacent groups, depth estimations of the respective groups have great difference from each other, a serious image distortion results.

Hence, the group-boundary depth information correction processing of Step 7 first checks a boundary portion between the respective pairs of adjacent groups to determine whether a difference between depth information of parallax calculation regions of one group and that of regions of the other group exceeds a predetermined value or not. If the difference in depth information between the two groups exceeds the predetermined value, the smaller depth information (or that of the parallax calculation regions corresponding to objects located relatively rearwardly) is increased so that the difference in depth information therebetween may be less than the predetermined value.

(8) In-Group Depth Information Correction Processing

The aforesaid correction processings of Steps 6 and 7 may result in production of difference in the depth information of regions of the same group. If this difference is great, a serious image distortion results. Therefore, the in-group depth information correction processing of Step 8 smoothes out depth estimations with respect to regions of each group.

It is assumed that a target region A has depth information HA while four regions U, D, L and R adjacent thereto and included in the same group with the region A have depth information Hu, HD, HL and HR, respectively, as shown in FIG. 26. Then, the depth estimation HA of the target region A is corrected based on the following equation (6):

$$HA=(HA/2)+\{(HU+HD+HL+HR)/8\} \quad (6)$$

Depth information on the respective parallax calculation regions F1 to F60 thus obtained are normalized again within the range of between 1 and 10.

(9) Parallax Information Calculation Processing

In the parallax information calculation processing of Step 9, the depth information on the respective parallax calculation regions F1 to F60 is converted into parallax information on the respective regions F1 to F60.

More specifically, based on a predetermined relation between the depth information and the parallax information, the depth information on the regions F1 to F60 is converted into the parallax information on a per-region basis. The relation of the parallax information versus the depth information is inversely proportional, as shown by straight lines S1 or S2 in FIG. 27.

Referring to FIG. 27, the relation of the parallax information with the depth information represented by the straight line S1 is used for obtaining a 3D image with a relatively great stereoscopic effect. On the other hand, the relation of the parallax information with the depth information represented by the straight line S2 is used for obtaining a 3D image with a relatively small stereoscopic effect. The stereoscopic effect can be adjusted by adjusting the relation of the parallax information versus the depth information in a range of between the straight lines S1 and S2.

The parallax information per parallax calculation region thus obtained is supplied to the parallax control circuit 4 (see FIG. 1).

FIG. 28 diagrammatically illustrates essential configurations of the parallax control circuit and the optional pixel delay FIFO shown in FIG. 1. The description hereinafter will be made on the assumption that there are the parallax calculation regions E1 to E12, as shown in FIG. 2.

In FIG. 28, out of the optional pixel delays FIFOs 11 to 13 and 21 to 23, only the left-eye-image optional pixel delay FIFO 11 and the right-eye-image optional pixel delay FIFO 21 with respect to Y signal are shown. However, the other optional pixel delays FIFOs 12–13 and 22–23 have the same configuration and are subject to the same control and therefore, a description thereof is omitted.

It is to be noted that the parallax information calculated by the CPU 3 pertains a central position of the respective parallax calculation regions E1 to E12. The parallax control circuit 4 serves to obtain parallax information with respect to the respective pixel positions in the one-field screen based on the parallax information with respect to the central position of the respective parallax calculation regions E1 to E12. The readout addresses of the left-eye-image optional pixel delays FIFOs 11 to 13 and of the right-eye-image optional pixel delays FIFOs 21 to 23 are controlled based on the parallax information per pixel position in order to produce, from a 2D image signal per pixel position, a left eye image and a right eye image which have parallax according to the parallax information with respect to the pixel position.

The parallax information with respect to the respective pixel positions in the one-field screen is generated by means of a timing signal generating circuit 51, a parallax interpolation factor generating circuit 52, parallax information storage means 60, a parallax selection circuit 80, first to fourth multipliers 81 to 84 and an adder circuit 85.

The horizontal synchronizing signal Hsync and the vertical synchronizing signal Vsync of the input image signal are applied to the timing signal generating circuit 51. In addition, the clock signal CLK for detecting the horizontal address in each horizontal period is also applied to the timing signal generating circuit 51.

Based on the horizontal synchronizing signal Hsync, vertical synchronizing signal Vsync and clock signal CLK, the timing signal generating circuit 51 generates and outputs a horizontal address signal HAD indicative of an absolute horizontal position of the input image signal, a vertical address signal VAD indicative of an absolute vertical position of the input image signal, a relative horizontal position signal HPOS indicative of a relative horizontal position of the input image signal and a relative vertical position signal VPOS indicative of a relative vertical position of the input image signal.

Now, the relative horizontal position and the relative vertical position of the input image signal will hereinbelow be described.

As shown in FIG. 29, the parallax calculation regions E1 to E12 of FIG. 2 are defined in the following manner. A whole screen is divided into 20 regions (hereinafter referred to as "first segment region") arranged in 4 rows and 5 columns, as indicated by broken lines in FIG. 29. A rectangular area having four vertexes positioned at centers of upper left, upper right, lower left and lower right first segment regions, respectively, is divided into 12 regions (hereinafter referred to as "second segment region") arranged in 3 rows and 4 columns. These 12 second segment regions are defined as the parallax calculation regions E1 to E12, respectively.

In the figure, a number of horizontal pixels of the first and second segment regions is denoted by "m" whereas a number of vertical pixels of the first and second segment regions is denoted by "n". The relative horizontal position of the input image signal is denoted by any one of 0 to (m−1) with "0" indicating a left end position and "(m−1)" indicating a right end position of each first segment region. A relative vertical position of the input image signal is denoted by any one of 0 to (n−1) with "0" indicating an upper end position and (n−1) indicating a lower end position of each first segment region.

The relative horizontal position signal HPOS and the relative vertical position signal VPOS of the input image signal are supplied to the parallax interpolation factor generating circuit 52. Based on the relative horizontal position signal HPOS, relative vertical position signal VPOS and the following equations (7), the parallax interpolation factor generating circuit 52 generates and outputs a first parallax interpolation factor KUL, a second parallax interpolation factor KUR, a third parallax interpolation factor KDL and a fourth parallax interpolation factor KDR:

$$KUL=\{(m-HOPS)/m\}\times\{(n-VPOS)/n\} KUR=(HPOS/m)\times\{(N-VPOS)/n\} KDL=\{(m-HPOS)/m\}\times(VPOS/n) KDR=(HPOS/m)\times(VPOS/n) \qquad (7)$$

Now referring to FIG. 30, description will be made on a basic concept of a method of generating the parallax information with respect to each pixel position in the one-field screen. It is assumed that a horizontal/vertical position (hereinafter referred to as "target position") indicated by the horizontal address signal HAD and the vertical address signal VAD is at Pxy in FIG. 30. How to obtain parallax information with respect to the target position Pxy will be described as below.

(1) First, out of the parallax information on the respective parallax calculation regions E1 to E12 calculated by the CPU 3, parallax information pieces on the parallax calculation regions E1 to E4 are first extracted as UL, UR, DL and DR, respectively. In this example, the regions E1 to E4 include four vertexes PE1 to PE4 of a first segment region with the target position Pxy at their respective centers. More specifically, the parallax information piece on the region E1, wherein the upper left vertex of the first segment region with the target position Pxy is located at the center thereof, is extracted as a first parallax information UL, the parallax information piece on the region E2 with the upper right vertex of the first segment region located at its center being extracted as a second parallax information UR, the parallax information piece on the region E5 with the lower left vertex of the first segment region located at its center as a third parallax information DL and the parallax information piece on the region E6 with the lower right vertex of the first segment region located at its center as a fourth parallax information DR.

It is to be noted that in a case where only one of the four vertexes of a first segment region with the target position is at the center of a parallax calculation region like when the first segment region is at the upper left corner of the screen, a parallax information piece on this parallax calculation region is extracted as the first to the fourth parallax information pieces UL, UR, DL, DR.

In a case where only lower two of the four vertexes of a first segment region with the target position are located at the respective centers of parallax calculation regions like when the first segment region adjoins an upper-left-corner first segment region on its right side, parallax information pieces on parallax calculation regions corresponding to the lower two vertexes of the first segment region are extracted also as parallax information pieces UL and UR on parallax calculation regions corresponding to the upper two vertexes thereof.

In a case where only right-hand two of the four vertexes of a first segment region with the target position are located at the respective centers of parallax calculation regions like when the first segment region is immediately under the upper-left-corner first parallax region, parallax information pieces on the parallax calculation regions corresponding to the two right-hand vertexes of the first segment region are extracted also as parallax information pieces UL, DL on parallax calculation regions corresponding to the two left-hand vertexes thereof.

In a case where only upper two of the four vertexes of a first segment region with the target position are located at the respective centers of parallax calculation regions like when the first segment region adjoins a lower-right-corner first segment region on its left side, parallax information pieces on the parallax calculation regions corresponding to the upper two vertexes of the first segment region are extracted also as parallax information pieces DL, DR on parallax calculation regions corresponding to the lower two vertexes thereof.

In a case where only left-hand two of the four vertexes of a first segment region with the target position are located at the respective centers of parallax calculation regions like when the first segment region is located immediately above the lower-right-corner first segment region, parallax information pieces on the parallax calculation regions corresponding to the two left-hand vertexes of the first segment region are extracted also as parallax information pieces UR, DR on parallax calculation regions corresponding to the two right-hand vertexes thereof.

(2) Next, there are determined the first to the fourth parallax interpolation factors KUL, KUR, KDL and KDR.

The first parallax interpolation factor KUL is given by a product of a ratio {(m−HPOS)/m} of a distance ΔXR between the target position Pxy and a right side of a first segment region e including the target pixel Pxy to a horizontal width m of the first segment region e, and a ratio {(n−VPOS)/n} of a distance ΔYD between the target pixel Pxy and a lower side of the first segment region e to a vertical width n of the first segment region e. That is, the first parallax interpolation factor KUL correspondingly increases as a distance between an upper left vertex PE1 of the first segment region e with the target position Pxy and the target position Pxy decreases.

The second parallax interpolation factor KUR is given by a product of a ratio (HPOS/m) of a distance ΔXL between the target position Pxy and a left side of the first segment region e with the target position Pxy to the horizontal width m of the first segment region e, and a ratio {(n−VPOS)/n} of a distance ΔYD between the target position Pxy and the lower side of the first segment region e to the vertical width n of the first segment region e. That is, the second parallax interpolation factor KUR correspondingly increases as a distance between an upper right vertex PE2 of the first segment region e and the target pixel position Pxy decreases.

The third parallax interpolation factor KDL is given by a product of a ratio {(m−HPOS)/m} of a distance ΔXR between the target position Pxy and the right side of the first segment region e with the target position Pxy to the horizontal width m of the first segment region e, and a ratio (VPOS/n) of a distance ΔYU between the target position Pxy and an upper side of the first segment region e to the vertical width n of the first segment region e. That is, the third parallax interpolation factor KDL correspondingly increases as a distance between a lower left vertex PE5 of the first segment region e and the target position Pxy decreases.

The fourth parallax interpolation factor KDR is given by a product of a ratio (HPOS/m) of a distance ΔXL between the target position Pxy and the left side of the first segment region e with the target position Pxy to the horizontal width m of the first segment region e, and a ratio (VPOS/n) of a distance ΔYU between the target position Pxy and the upper side of the first segment region e to the vertical width n of the first segment region e. That is, the fourth parallax interpolation factor KDR correspondingly increases as a distance between a lower right vertex PE6 of the first segment region e and the target position Pxy decreases.

(3) The first to the fourth parallax information pieces UL, UR, DL, DR extracted in the aforesaid step (1) are respectively multiplied by the first to the fourth parallax interpolation factors KUL, KUR, KDL, KDR given in the aforesaid step (2). Then, parallax information on the target position Pxy is generated by summing up the resultant four products.

The parallax information storage means 60 includes first to twelfth parallax registers 61 to 72 in corresponding relation with the regions E1 to E2, respectively. The first to twelfth parallax registers 61 to 72 respectively store the parallax information per region E1 to E12 generated by the CPU 3.

The parallax selection circuit 80 is provided rearwardly of the parallax information storage means 60. The parallax selection circuit 80 is supplied with the parallax information by the parallax registers 61 to 72, respectively. Furthermore, the parallax selection circuit 80 is supplied with the horizontal address signal HAD and the vertical address signal VAD by the timing signal generating circuit 51.

According to a rule shown in FIG. 31(a), the parallax selection circuit 80 selectively outputs parallax information on a region corresponding to a horizontal address signal HAD and a vertical address signal VAD (in the example shown in FIG. 30, the parallax calculation region having the upper left vertex of the first segment region with the target position located at the center thereof) as the first parallax information UL. Further according to a rule shown in FIG. 31(b), the parallax selection circuit 80 selectively outputs parallax information on a region corresponding to a horizontal address signal HAD and a vertical address signal VAD in the example of FIG. 30, the parallax calculation region having the upper right vertex of the first segment region with the target position located at the center thereof) as the second parallax information UR.

According to a rule shown in FIG. 31(c), the parallax selection circuit 80 selectively outputs parallax information on a region corresponding to a horizontal address signal HAD and a vertical address signal VAD (in the example of FIG. 30, the parallax calculation region having the lower left vertex of the first segment region with the target position located at the center thereof) as the third parallax information DL. Further according to a rule shown in FIG. 31(d), the parallax selection circuit 80 selectively outputs parallax information on a region corresponding to a horizontal address signal HAD and a vertical address signal VAD (in the example of FIG. 30, the parallax calculation region having the lower right vertex of the first segment with the target position located at the center thereof) as the fourth parallax information DR. In FIG. 31, a representation "a~b" like "0~m" denotes a value of not less than "a" and less than "b".

The first parallax information UL, the second parallax information UR, the third parallax information DL and the fourth parallax information DR are applied to the first to the fourth multipliers 81 to 84, respectively.

The first to the fourth multipliers 81 to 84 also receives from the parallax interpolation factor generating circuit 52 the first parallax interpolation factor KUL, the second parallax interpolation factor KUR, the third parallax interpolation factor KDL and the fourth parallax interpolation factor KDR, respectively.

The first multiplier 81 multiplies the first parallax information UL by the first parallax interpolation factor KUL. The second multiplier 82 multiplies the second parallax information UR by the second parallax interpolation factor KUR. The third multiplier 83 multiplies the third parallax information DL by the third parallax interpolation factor KDL. The fourth multiplier 84 multiplies the fourth parallax information DR by the fourth parallax interpolation factor KDR.

Outputs of these multipliers 81 to 84 are added together by the adder circuit 85 for generating parallax information PR on the target position.

The optional pixel delays FIFOs 11 and 21 each include a pair of line memories 11a–11b or 21a–21b for performing horizontal phase control on a basis smaller than one pixel. The respective pairs of line memories 11a–11b and 21a–21b of the optional pixel delays FIFOs 11, 21 are supplied with Y signal and the clock signal CLK.

The horizontal address signal HAD outputted from the timing signal generating circuit 51 is also applied to a standard address generating circuit 90. The standard address generating circuit 90 generates and outputs a standard write address WAD and a standard readout address RAD with respect to the line memories 11a–11b and 21a–21b of the optional pixel delays FIFOs 11 and 21. Further, the standard address generating circuit 90 also outputs a synchronizing signal Csync added to the left-eye image signal and the right-eye image signal which are generated by the 2D/3D image conversion system. A horizontal synchronizing signal represented by the synchronizing signal Csync is delayed relative to the horizontal synchronizing signal Hsync of the input image signal by a predetermined number of clocks.

The standard readout address RAD is delayed relative to the standard write address WAD by a predetermined number of clocks so that the horizontal phase of the image signal inputted in the respective optional pixel delays FIFOs 11, 21 may be advanced or lagged relative to a reference horizontal phase defined by the standard readout address. The standard write address WAD outputted from the standard address generating circuit 90 is applied to the respective pairs of line memories 11a–11b and 21a–21b of the optional pixel delays FIFOs 11, 21 as a write control signal indicative of an address to write to.

The standard readout address RAD from the standard address generating circuit 90 is applied to an adder 91 and a subtractor 92. The adder 91 and the subtractor 92 are also supplied with the parallax information PR on the target position which is supplied from the adder circuit 85.

The adder 91 serves to add the parallax information PR to the standard readout address RAD, thereby giving a left-eye image readout address PRL.

An integer portion PRL1 of the left-eye image readout address PRL is applied, as a readout address RADL1, to the first line memory 11a of the left-eye image optional pixel delay FIFO 11. This permits Y signal to be read out from an address of the first line memory 11a in correspondence to the address RADL1. The Y signal thus read out is applied to a first left-eye image multiplier 101.

An address value given by adding 1 to the integer portion PRL1 of the left-eye image readout address PRL is applied as a readout address RADL2 to the second line memory 11b of the left-eye image optional pixel delay FIFO 11. This permits Y signal to be read out from an address of the second line memory 11b in correspondence to the address RADL2. The Y signal thus read out is applied to a second left-eye image multiplier 102.

The readout address RADL1 with respect to the first line memory 11a differs from the readout address RADL2 with respect to the second line memory 11b by "1" and therefore, a Y signal read out from the first line memory 11a has a horizontal position shifted by "1" from that of a Y signal read out from the second line memory 11b.

A decimal fraction portion PRL2 of the left-eye image readout address PRL is applied, as a second left-eye image interpolation factor, to the second left-eye image multiplier 102. A value (1–PRL2) is obtained by subtracting the decimal fraction portion PRL2 of the left-eye image readout address PRL from 1 so as to be applied, as a first left-eye image interpolation factor, to the first left-eye image multiplier 101.

Thus, the first left-eye image multiplier 101 multiplies the Y signal read out from the first line memory 11a by the first left-eye image interpolation factor (1–PRL2). The second left-eye image multiplier 102 multiplies the Y signal read out from the second line memory 11b by the second left-eye image interpolation factor PRL2. The resultant Y signals thus given by these multipliers 101, 102 are added together by an adder 103 and then outputted as a left-eye image Y signal YL-OUT.

Thus is obtained the left-eye image Y signal, the horizontal phase of which is lagged relative to the reference horizontal phase defined by the standard readout address RAD by a value based on the parallax information on the target position.

The subtractor 92 serves to subtract the parallax information PR from the standard readout address RAD, thereby giving a right-eye image readout address PRR.

An integer portion PRR1 of the right-eye image readout address PRR is applied, as a readout address RADR1, to the first line memory 21a of the right-eye image optional pixel delay FIFO 21. This permits Y signal to be read out from an address of the first line memory 21a in correspondence to the address RADR1. The Y signal thus read out is applied to a first right-eye image multiplier 111.

An address value is given by adding 1 to the integer portion PRR1 of the right-eye image readout address PRR and applied as a readout address RADR2 to the second line memory 21b of the right-eye image optional pixel delay FIFO 21. This permits Y signal to be read out from an address of the second line memory 21b in correspondence to the address RADR2. The Y signal thus read out is applied to a second right-eye image multiplier 112.

The readout address RADR1 with respect to the first line memory 21a differs from the readout address RADR2 with respect to the second line memory 21b by "1" and therefore, the Y signal read out from the first line memory 21a has a horizontal position shifted by "1" from that of the Y signal read out from the second line memory 21b.

A decimal fraction portion PRR2 of the right-eye image readout address PRR is applied, as a second right-eye image interpolation factor, to the second right-eye image multiplier 112. A value (1–PRR2) is obtained by subtracting the decimal fraction portion PRR2 of the right-eye image readout address PRR from 1 so as to be applied, as a first right-eye image interpolation factor, to the first right-eye image multiplier 111.

Thus, the first right-eye image multiplier 111 serves to multiply the Y signal read out from the first line memory 21a by the first right-eye image interpolation factor (1–PRR2). The second right-eye image multiplier 112 serves to multiply the Y signal read out from the second line memory 21b by the second right-eye image interpolation factor PRR2. The resultant Y signals thus given by these multipliers 111, 112 are added together by an adder 113 and then outputted as a right-eye image Y signal YR-OUT.

Thus is obtained the right-eye image Y signal, the horizontal phase of which leads relative to the reference horizontal phase defined by the standard readout address RAD by a value based on the parallax information on the target position.

FIG. 32 is a timing chart showing signals at the respective addresses in a case where the parallax information on the target position is 0. Where the parallax information is 0, the left-eye image readout address PRL outputted from the adder 91 and the right-eye image readout address PRR outputted from the subtractor 92 are both equal to the standard readout address RAD, consisting only of the integer portion without the decimal fraction portion.

Therefore, the readout address RADL1 with respect to the first line memory 11a of the left-eye image optional pixel delay FIFO 11 and the readout address RADR1 with respect to the first line memory 21a of the right-eye image optional pixel delay FIFO 21 are both equal to the standard readout address RAD.

On the other hand, the readout address RADL2 with respect to the second line memory 11b of the left-eye image optional pixel delay FIFO 11 and the readout address RADR2 with respect to the second line memory 21b of the right-eye image optional pixel delay FIFO 21 are both at a value greater than the standard readout address RAD by one.

The first left-eye image interpolation factor (1–PRL2) and the first right-eye image interpolation factor (1–PRR2) are both at a value of 1 whereas the second left-eye image interpolation factor PRL2 and the second right-eye image interpolation factor PRR2 are both at a value of 0.

As a result, Y signal read out from the address of the first line memory 11a of the left-eye image optional pixel delay FIFO 11 in correspondence with the standard address RAD is outputted from the adder 103 as the left-eye image Y signal YL-OUT, whereas Y signal read out from the address of the first line memory 21a of the right-eye image optional pixel delay FIFO 21 in correspondence with the standard address RAD is outputted from the adder 113 as the right-eye image Y signal YR-OUT. That is, the two Y signals having the same horizontal phase shift value or the two Y signals without parallax are outputted as the left-eye image Y signal and the right-eye image Y signal, respectively.

FIG. 33 is a block diagram showing exemplary address values in a case where a standard write address with respect to a certain target position is 20, the standard readout address with respect to the target position is at 10 and the parallax information on the target position is at 1.2. FIG. 34 is a timing chart showing signals at the respective addresses in this example.

In this case, a left-eye image readout address PLR outputted from the adder 91 is 11.2, the integer portion PRL1 of which is 11 and the decimal fraction portion PRL2 of which is 0.2.

Accordingly, a readout address RADL1 with respect to the first line memory 11a of the left-eye image optional pixel delay FIFO 11 is 11 whereas a readout address RADL2 with respect to the second line memory 11b is 12. On the other hand, a first left-eye image interpolation factor KL1{=(1–

PRL2)} is 0.8 whereas a second left-eye image interpolation factor KL2(=PRL2) is 0.2.

Thus, a Y signal ($Y_{11}$) is read out from the address 11 of the first line memory 11*a* of the left-eye image optional pixel delay FIFO 11 so that the first multiplier 101 outputs a signal ($0.8*Y_{11}$) given by multiplying the read Y signal ($Y_{11}$) by 0.8.

On the other hand, a Y signal ($Y_{12}$) is read out from the address 12 of the second line memory 11*b* of the left-eye image optional pixel delay FIFO 11 so that the second multiplier 102 outputs a signal ($0.2*Y_{12}$) given by multiplying the read Y signal ($Y_{12}$) by 0.2. Then, the adder 103 outputs a left-eye image Y signal YL-OUT equal to $0.8*Y_{11}+0.2*Y_{12}$. In other words, the Y signal equal to the readout address of 11.2 is outputted as the left-eye image Y signal YL-OUT.

The subtractor 92 outputs a right-eye image readout address PRR of 8.8, the integer portion of which is 8 and the decimal fraction portion of which is 0.8.

Accordingly, the readout address RADR1 with respect to the first line memory 21*a* of the right-eye image optional pixel delay FIFO 21 is at 8 whereas the readout address RADR2 with respect to the second line memory 21*b* is at 9. On the other hand, the first right-eye image interpolation factor KR1{=(1−PPR2)} is 0.2 whereas the second right-eye image interpolation factor KR2(=PRR2) is 0.8.

Thus, a Y signal($Y_8$) is read out from the address 8 of the first line memory 21*a* of the right-eye image optional pixel delay FIFO 21 so that the first multiplier 111 outputs a signal ($0.2*Y_8$) given by multiplying the read Y signal ($Y_8$) by 0.2.

On the other hand, a Y signal ($Y_9$) is read out from the address 9 of the second line memory 21*b* of the right-eye image optional pixel delay FIFO 21 so that the second multiplier 112 outputs a signal ($0.8*Y_9$) given by multiplying the read Y signal ($Y_9$) by 0.8. Then, the adder 113 outputs a right-eye image Y signal YR-OUT equal to $0.2*Y_8+0.8*Y_9$. In other words, the Y signal equal to the readout address of 8.8 is outputted as the right-eye image Y signal YR-OUT.

As a result, there are obtained left-eye and right-eye images each having a parallax of 11.2−8.8=2.4, or twice the parallax information piece of 1.2.

In the aforementioned 2D/3D still image conversion method, there may sometimes be a great parallax value between regions in the one-field screen or the parallax value may sometimes vary greatly between fields. This results in poor visibility of a resultant 3D image.

It is therefore, an object of the invention to provide a 2D/3D image conversion system offering 3D images suffering less image distortion.

By the way, a 2D image signal to be converted into a 3D image signal includes both a moving image portion and a still image portion. Hence, it may be designed that the moving image portion is subjected to the 2D/3D moving image conversion process for generating a 3D image while the still image portion is subjected to the 2D/3D still image conversion process for generating a 3D image.

More specifically, a motion vector is sensed from the 2D image to be converted. If a value of a horizontal motion vector exceeds a predetermined value, a currently inputted image is determined to be a moving image and subjected to the 2D/3D moving image conversion process for conversion into the 3D image. If, on the other hand, the value of the horizontal motion vector is below the predetermined value, the currently inputted image is determined to be a still image and subjected to the 2D/3D still image conversion process for conversion into the 3D image.

According to such a conversion process, however, the parallax varies greatly when the input image is switched between the moving image and the still image. This results in an image which detrimentally appears incongruous to an observer.

In view of the foregoing, it is an object of the invention to provide a 2D/3D image conversion system and method which utilize the 2D/3D moving image conversion method and the 2D/3D still image conversion method in combination for converting two-dimensional images into three-dimensional images in a manner such that the parallax variations are decreased when the input images are switched between the moving image and the still image.

The aforesaid 2D/3D still image conversion method utilizes the image characteristic value as well as the background weight for generation of the depth information per group. The background weight is a numerical value preset per parallax calculation region in order to enhance precisions of the depth information. If, for example, a more front view has a correspondingly greater depth information value while a more rear view has a correspondingly smaller depth information value, the background weights for the respective parallax calculation regions F1 to F60 (see FIG. 13) generally have values such that a central portion of the image field is greater than a peripheral portion thereof while a lower portion thereof is greater than an upper portion thereof, as shown in FIG. 49. This is because objects in the front view range are placed at the central portion rather than the peripheral portion or at the lower portion rather than the upper portion of the typical image frame.

However, in an image of an exit of a tunnel or an image viewed through an endscope, the front view occupies the peripheral portion of the image and the rear view occupies the central portion. Hence, in this case, incorrect depth information is generated, resulting in an incorrect 3D image.

Alternatively, there is known a method wherein the motion vector per parallax calculation region is generated from the 2D image signal and used for generating the depth information. Unfortunately however, the method of generating depth information by the use of the motion vector is difficult to apply to still images with no motion.

It is therefore, an object of the invention to provide a 2D/3D image conversion system and method of converting two-dimensional images into three-dimensional images, which system and method are adapted to generate depth information increased in precision.

SUMMARY OF THE INVENTION

A first 2D/3D image conversion system according to the invention comprises: depth information generating means which extracts from a 2D input image a perspective image characteristic value of each of a plurality of parallax calculation regions defined in a one-field screen, and generates depth information per parallax calculation region based on the extracted image characteristic value; target phase value calculating means for calculating a target phase value per parallax calculation region based on a dynamic range of a preset target phase value and on depth information generated per given unit area by the depth information generating means;

real phase value calculating means which calculates a current real phase value of each parallax calculation region in a manner to progressively approximate a current real phase value to a target phase value of a parallax calculation region with a corresponding previous real phase value, and then determines a current real phase value per given unit area in the one-field screen based on the current real phase value per parallax calculation region thus obtained; and phase control means for generating a first image signal and a second image signal from a signal residing in each given unit area of the 2D input image, the first and second image signals having a horizontal phase difference therebetween based on the current real phase value corresponding to the given unit area.

A second 2D/3D image conversion system according to the invention comprises: depth information generating means which extracts from a 2D input image a perspective image characteristic value of each of a plurality of parallax calculation regions defined in a one-field screen, and generates depth information per parallax calculation region based on the extracted image characteristic value; correction means for correcting a dynamic range of a preset target phase value thereby decreasing the dynamic range of the target phase value when a maximum value of depth information differences between respective pairs of adjacent regions exceeds a reference value; target phase value calculating means for calculating a target phase value per parallax calculation region based on the dynamic range of the target phase value given by the correction means and on depth information per given unit area generated by the depth information generating means; real phase value calculating means which calculates a current real phase value per parallax calculation region in a manner to progressively approximate a current real phase value to a target phase value of a parallax calculation region with a corresponding previous real phase value, and determines a current real phase value per given unit area in the one-field screen based on the current real phase value per parallax calculation region thus obtained; and phase control means for generating a first image signal and a second image signal from a signal residing in each given unit area of the 2D input image, the first and second image signals having a horizontal phase difference therebetween based on the current real phase value corresponding to the given unit area.

A third 2D/3D image conversion system according to the invention comprises: image converting means which produces from a 2D input image a main image serving as a base and a sub-image time-delayed relative to the main image, and outputs either one of the main image and the sub-image as a left eye image and the other as a right eye image; moving image/still image judging means for determining whether the 2D input image is a moving image or a still image; still image rate calculating means for calculating a still image rate based on a judgment result given by the moving image/still image judging means; depth information generating means which extracts from the 2D input image a perspective image characteristic value of each of a plurality of parallax calculation regions defined in a one-field screen, and generates depth information per parallax calculation region based on the extracted image characteristic value; correction means for correcting a dynamic range of a preset target phase value by multiplying the dynamic range of the target phase value by the still image rate; target phase value calculating means for calculating a target phase value per parallax calculation region based on the dynamic range of the target phase value corrected by the correction means and on depth information per given unit area generated by the depth information generating means; real phase value calculating means which calculates a current real phase value per parallax calculation region in a manner to progressively approximate a current real phase value to a target phase value of a parallax calculation region with a corresponding previous real phase value, and determines a current real phase value per given unit area in the one-field screen based on the current real phase value per parallax calculation region thus obtained; and phase control means for performing a horizontal phase control on a signal residing in each given unit area of the right eye image and the left eye image which are outputted by the image converting means, the horizontal phase control being based on a real phase value of the given unit area supplied by the real phase value calculating means.

A fourth 2D/3D image conversion system according to the invention comprises: image converting means which produces from a 2D input image a main image serving as a base and a sub-image time-delayed relative to the main image, and outputs either one of the main image and the sub-image as a left eye image and the other as a right eye image; moving image/still image judging means for determining whether the 2D input image is a moving image or a still image; still image rate calculating means for calculating a still image rate based on a judgment result given by the moving image/still image judging means; depth information generating means which extracts from the 2D input image a perspective image characteristic value of each of a plurality of parallax calculation regions defined in a one-field screen, and generates depth information per parallax calculation region based on the extracted image characteristic value; first correction means for correcting a dynamic range of a preset target phase value thereby decreasing the dynamic range of the target phase value when a maximum value of depth information differences between respective pairs of adjacent regions exceeds a reference value; second correction means for correcting the dynamic range of the target phase value by multiplying the dynamic range of the target phase value, given by the first correction means, by the still image rate; target phase value calculating means for calculating a target phase value per parallax calculation region based on the dynamic range of the target phase value given by the second correction means and on depth information per given unit area generated by the depth information generating means; real phase value calculating means which calculates a current real phase value per parallax calculation region in a manner to progressively approximate a current real phase value to a target phase value of a parallax calculation region with a corresponding previous real phase value, and determines a current real phase value per given unit area in the one-field screen based on the current real phase value per parallax calculation region thus obtained; and phase control means for performing a horizontal phase control on a signal residing in each given unit area of the right eye image and the left eye image which are outputted by the image converting means, the horizontal phase control being based on a real phase value of the given unit area supplied by the real phase value calculating means.

The aforesaid still image rate calculating means may include, for example, means for setting the still image rate to "0" when the 2D input image is determined to be a moving image by the moving image/still image judging means while setting the still image rate to "100" when the 2D input image is determined to be a still image, and means for smoothing the set still image rates between fields.

The aforesaid real phase value calculating means may, for example, calculate an amount of image motion per parallax calculation region based on the 2D input image so as to calculate a current real phase value per parallax calculation region in a manner such that a current real phase value of a parallax calculation region with greater image motion is correspondingly more quickly approximated to a target phase value of the region, and then determine a current real phase value per given unit area in the one-field screen based on the current real phase value per parallax calculation region thus obtained.

A fifth 2D/3D image conversion system according to the invention comprises: image converting means which produces from a 2D input image a main image serving as a base and a sub-image time-delayed relative to the main image, and outputs either one of the main image and the sub-image as a left eye image and the other as a right eye image; moving image/still image judging means for determining whether the 2D input image is a moving image or a still image; still image rate calculating means for calculating a still image rate based on a judgment result given by the moving image/still image judging means; parallax information generating means which extracts from the 2D input image a perspective image characteristic value of each of a plurality of parallax calculation regions defined in a one-field screen, and generates parallax information per parallax calculation region based on the extracted image characteristic value; parallax information correcting means which corrects the parallax information per parallax calculation region by multiplying the parallax information per parallax calculation region, generated by the parallax information generating means, by the still image rate given by the still image rate calculating means, and generates parallax information per given unit area in the one-field screen based on each parallax information piece thus corrected; and phase control means for performing a horizontal phase control on a signal residing in each given unit area of the right eye image and the left eye image which are outputted by the image converting means, the horizontal phase control being based on the parallax information of the given unit area supplied by the parallax information correcting means.

The still image rate calculating means may include, for example, means for setting the still image rate to "0" when the 2D input image is determined to be a moving image while setting the still image rate to "100" when the 2D input image is determined to be a still image, and means for smoothing the set still image rates between fields.

A first method of converting a 2D image into a 3D image according to the invention comprises the steps of: a first step of producing from a 2D input image a main image serving as a base and a sub-image time-delayed relative to the main image, followed by outputting either one of the main image and the sub-image as a left eye image and the other as a right eye image; a second step of determining whether the 2D input image is a moving image or a still image; a third step of calculating a still image rate based on the determination given by the second step; a fourth step of extracting from the 2D input image a perspective image characteristic value of each of a plurality of parallax calculation regions defined in a one-field screen, followed by generating parallax information per parallax calculation region based on the extracted image characteristic value; a fifth step of correcting the parallax information per parallax calculation region by multiplying the parallax information per parallax calculation region generated at the fourth step by the still image rate given by the third step, followed by generating parallax information per given unit area in the one-field screen based on each parallax information piece thus corrected; and a sixth step of performing a horizontal phase control on a signal residing in each given unit area of the right eye image and the left eye image which are outputted at the first step, the horizontal phase control being based on the parallax information of the given unit area supplied by the fifth step.

The third step may include, for example, a step of setting the still image rate to "0" when the 2D input image is determined by the second step to be a moving image while setting the still image rate to "100" when the 2D input image is determined to be a still image, and a step of smoothing the still image rates between fields.

A sixth system for converting a 2D image into a 3D image comprises: depth information generating means for generating depth information from a 2D input image signal on a field-by-field basis, the depth information indicating a perspective image characteristic of each of a plurality of parallax calculation regions defined in a one-field screen; parallax information generating means for generating parallax information per parallax calculation region based on the depth information; and parallax control means which controls the 2D input image signal based on the parallax information in a manner to produce parallax between a left eye image and a right eye image, and produces a left-eye image signal and a right-eye image signal; the depth information generating means including: (a) image characteristic value generating means for generating from the 2D input image signal an image characteristic value of each parallax calculation region; (b) group information generating means which divides, based on the image characteristic value, all the parallax calculation regions in the one-field screen into groups associated with respective objects included in the field, and generates group information indicating to which group each parallax calculation region belongs; (c) background weight generating means for generating a background weight per parallax calculation region; and (d) depth information calculating means which combines the image characteristic value and the background weight on a group-by-group basis by using said image characteristic value, group information and background weight, thereby calculating the depth information; the background weight generating means including optionally selected one of the following means or an optional combination thereof: (a) background-weight data receiving means for receiving from an external source background weight data including the background weight per parallax calculation region; (b) background-weight data selection means for selectively reading out a desired background weight from background-weight data storage means previously storing one or plural pieces of background weight data; and (c) view range judging means which generates a motion vector from the 2D input image signal for using the generated motion vector for determination of a view range of each parallax calculation region, and generates a background weight based on the determination of the view range.

A second method of converting a 2D image into a 3D image comprises the steps of generating depth information from a 2D input image signal on a field-by-field basis, the depth information indicating a perspective image characteristic of each of a plurality of parallax calculation regions defined in a one-field screen; generating parallax information per parallax calculation region based on the depth information thus generated; and generating a left-eye image signal and a right-eye image signal based on the parallax information, the method wherein the generation of the depth information is accomplished through the steps of generating from the 2D input image signal an image characteristic value of each parallax calculation region; dividing, based on the image characteristic value, all the regions in the one-field screen into groups associated with respective objects included in the field for generation of group information indicating to which group each parallax calculation region belongs; generating a background weight per parallax calculation region; and combining the image characteristic value and the background weight on a group-by-group basis by using the image characteristic value, group information and background weight, thereby calculating the depth information, the generation of the background weight being performed by optionally selected one of the following methods or an optional combination thereof which include a method of receiving from an external source background weight data including background weights of the respective parallax calculation regions; a method of selectively reading out a desired background weight from a plurality of background-weight data pieces previously stored; and a method of determining a view range of each parallax calculation region based on a motion vector and generating a background weight based on the determination of the view range.

BRIEF DESCRIPTION OF THE DRAWINGS

FIG. 13 is a schematic diagram showing parallax calculation regions actually defined;

FIG. 15 is a schematic diagram showing a result of a grouping processing based on the histogram of FIG. 14;

FIG. 22 is a schematic diagram showing background weight components preset for the respective parallax calculation regions;

FIG. 31 is a table for illustrating a selection rule followed by a parallax selection circuit;

FIG. 49 is a schematic diagram showing general background weights defined for the respective parallax calculation regions;

FIG. 50 is a schematic diagram showing background weights suitable for an image wherein a rear view occupies a central portion of a screen and a front view occupies a peripheral portion;

FIG. 51 is a schematic diagram showing results of view range decision made by a view range decision circuit on a per-parallax-calculation-region basis.

DETAILED DESCRIPTION OF PREFERRED EMBODIMENTS

[1] First Embodiment

Now referring to FIGS. 35 to 42, a first embodiment of the invention will hereinbelow be described.

Figure 35:
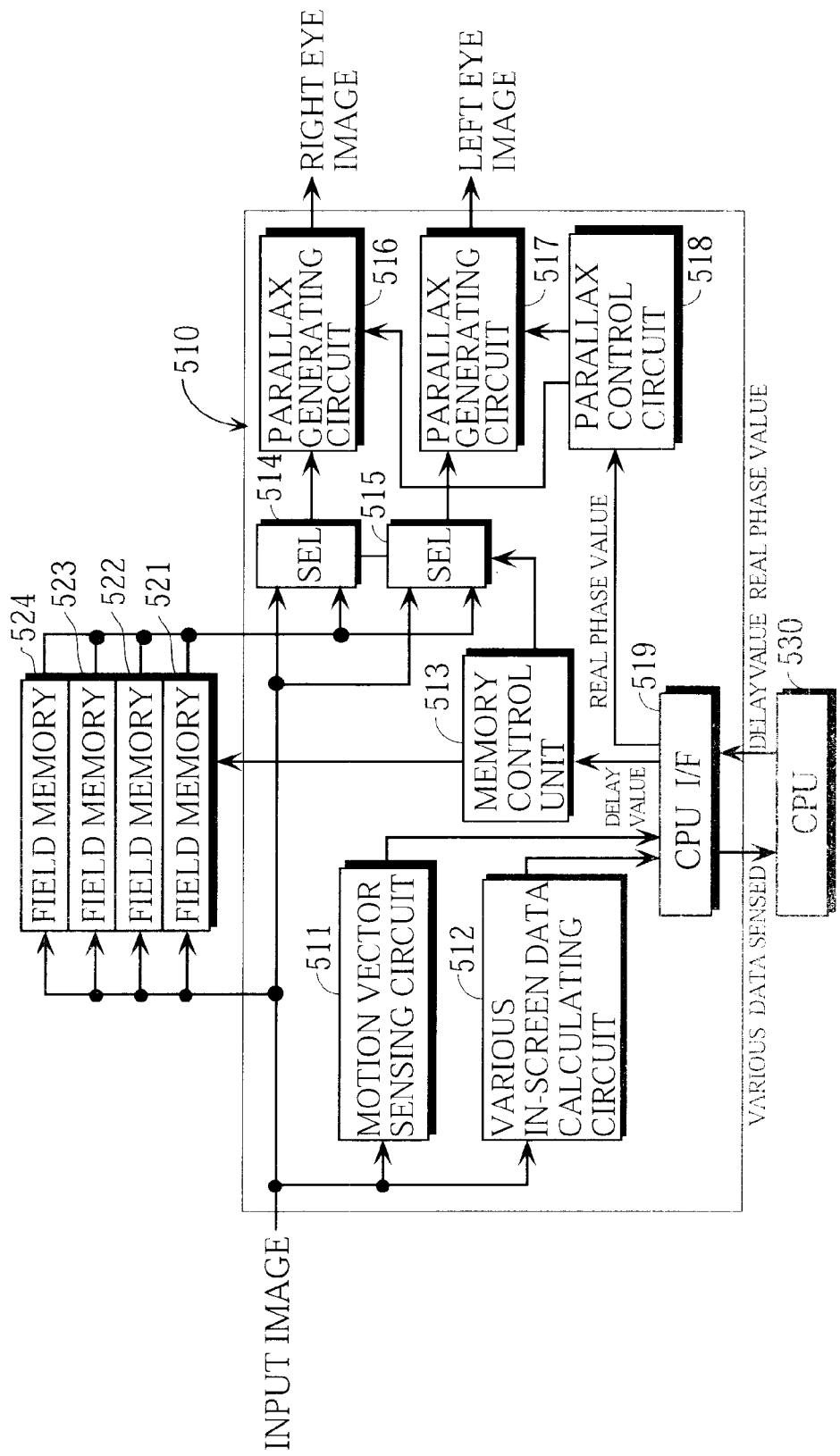
FIG. 35 is a block diagram showing a construction of a 2D/3D image conversion system according to a first embodiment of the invention.

FIG. 35 diagrammatically illustrates a construction of a 2D/3D image conversion system of this embodiment.

The 2D/3D image conversion system includes a large scale integrated circuit (LSI) 510, a plurality of field memories 521 to 524 connected to the LSI 510 and a CPU 530.

The LSI 510 includes a motion vector sensing circuit 511, various in-screen data calculating circuit 512, a memory control unit 513, a right-eye image selection circuit 514, a left-eye image selection circuit 515, a right-eye parallax generating circuit 516, a left-eye parallax generating circuit 517, a parallax control circuit 518, a CPU interface 519 and the like.

The motion vector sensing circuit 511 serves to sense a motion vector on a field-by-field basis according to the representative point matching method. The motion vector sensed by the motion vector sensing circuit 511 is supplied to the CPU 530 via the CPU interface 519.

Figure 1:
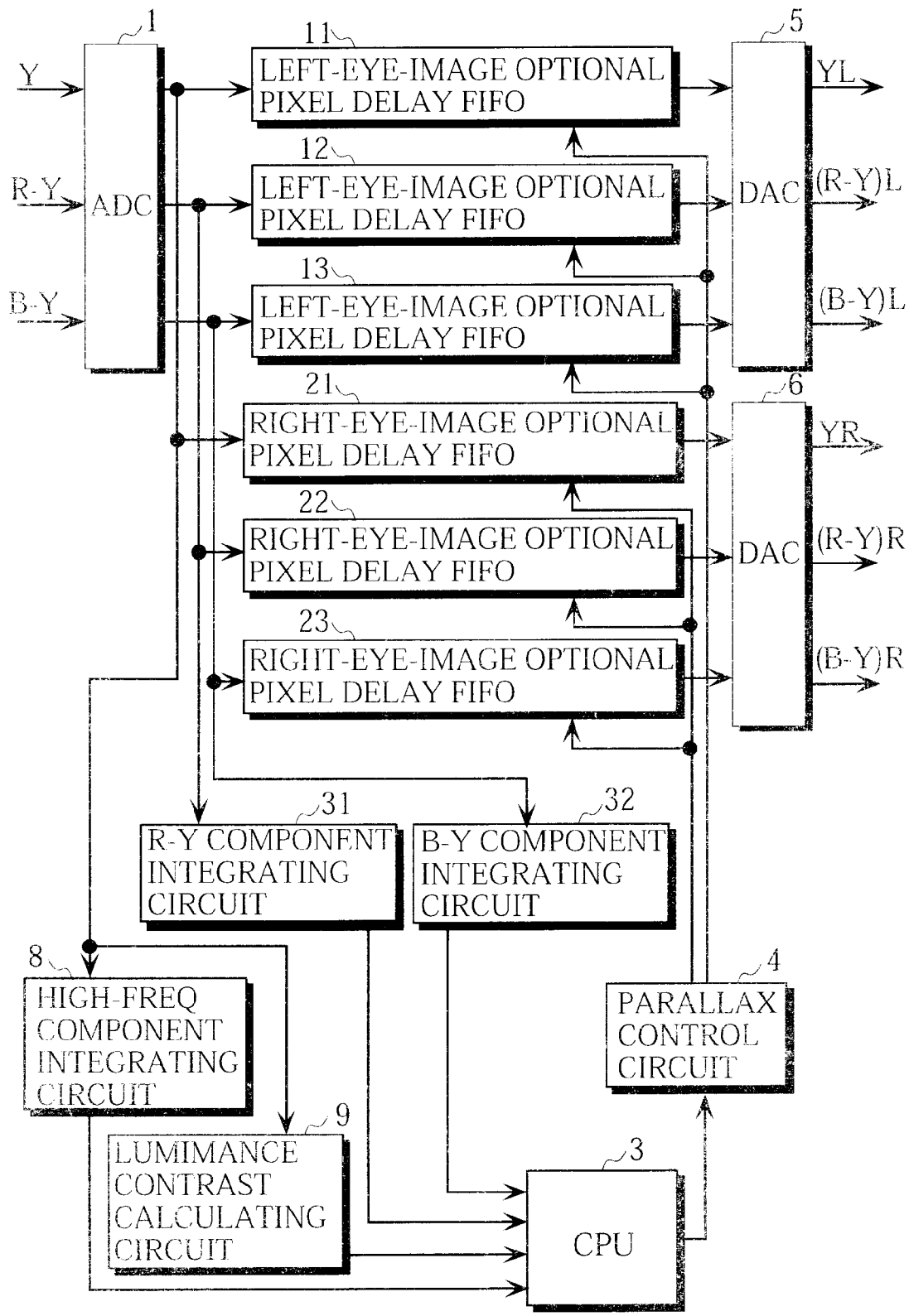
FIG. 1 is a block diagram showing a whole construction of a 2D/3D image conversion system according to the invention.

The various in-screen data calculating circuit 512 includes the high-frequency component integrating circuit 8, the luminance contrast calculating circuit 9, the R-Y component integrating circuit 31 and the B-Y component integrating circuit 32 shown in FIG. 1. The various in-screen data calculating circuit 512 serves to calculate a perspective image characteristic value of each of the plural parallax calculation regions defined in a one-field screen on a field-by-field basis.

Figure 2:
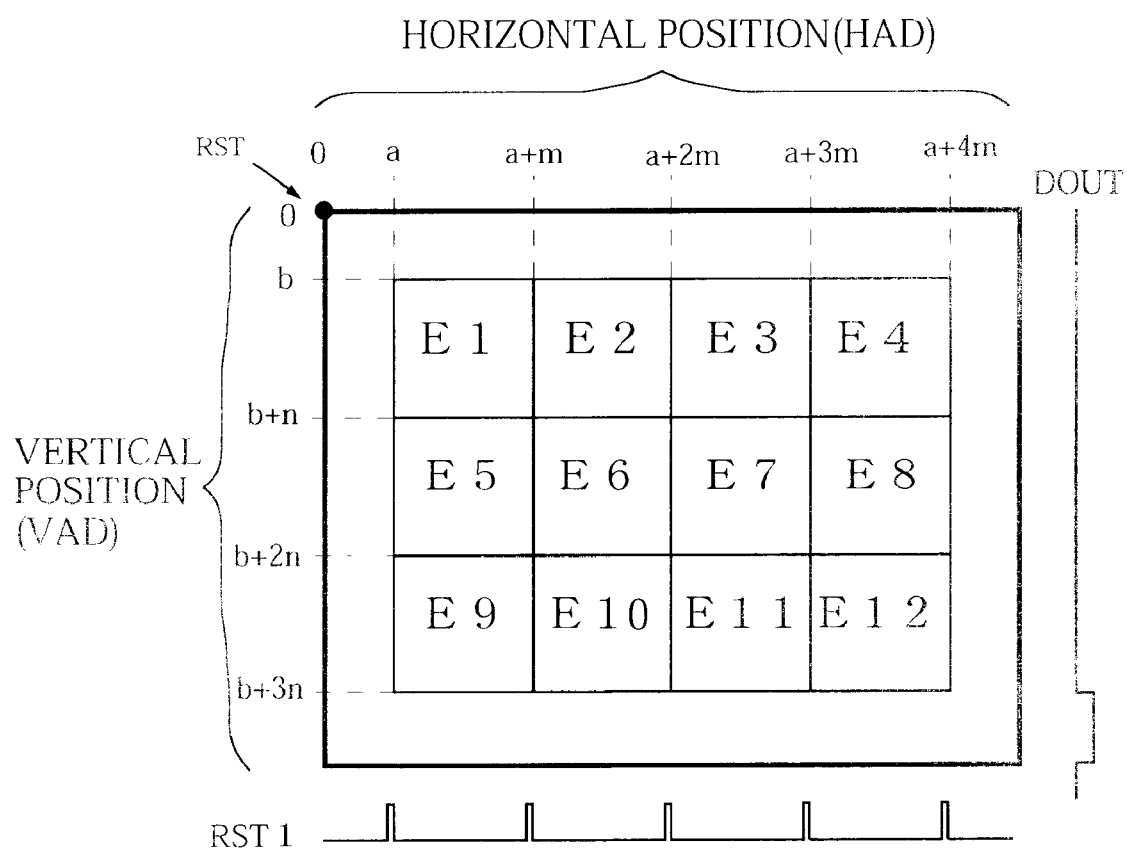
FIG. 2 is a schematic diagram showing parallax calculation regions.

The high-frequency component integrating circuit 8 performs calculation on a field-by-field basis for determining a high-frequency component integration value of each of the plural parallax calculation regions E1 to E12 previously defined in the one-field screen, as shown in FIG. 2. The luminance contrast calculating circuit 9 performs calculation on a field-by-field basis for determining a luminance contrast of each of the parallax calculation regions E1 to E12. The R-Y component integrating circuit 31 performs calculation on a field-by-field basis for determining an R-Y component integration value of each of the parallax calculation regions E1 to E12. The B-Y component integrating circuit 32 performs calculation on a field-by-field basis for deterring a B-Y component integration value of each of the parallax calculation regions E1 to E12. The perspective image characteristic value calculated by the various in-screen data calculating circuit 512 is supplied to the CPU 530 via the CPU interface 519.

Figure 36:
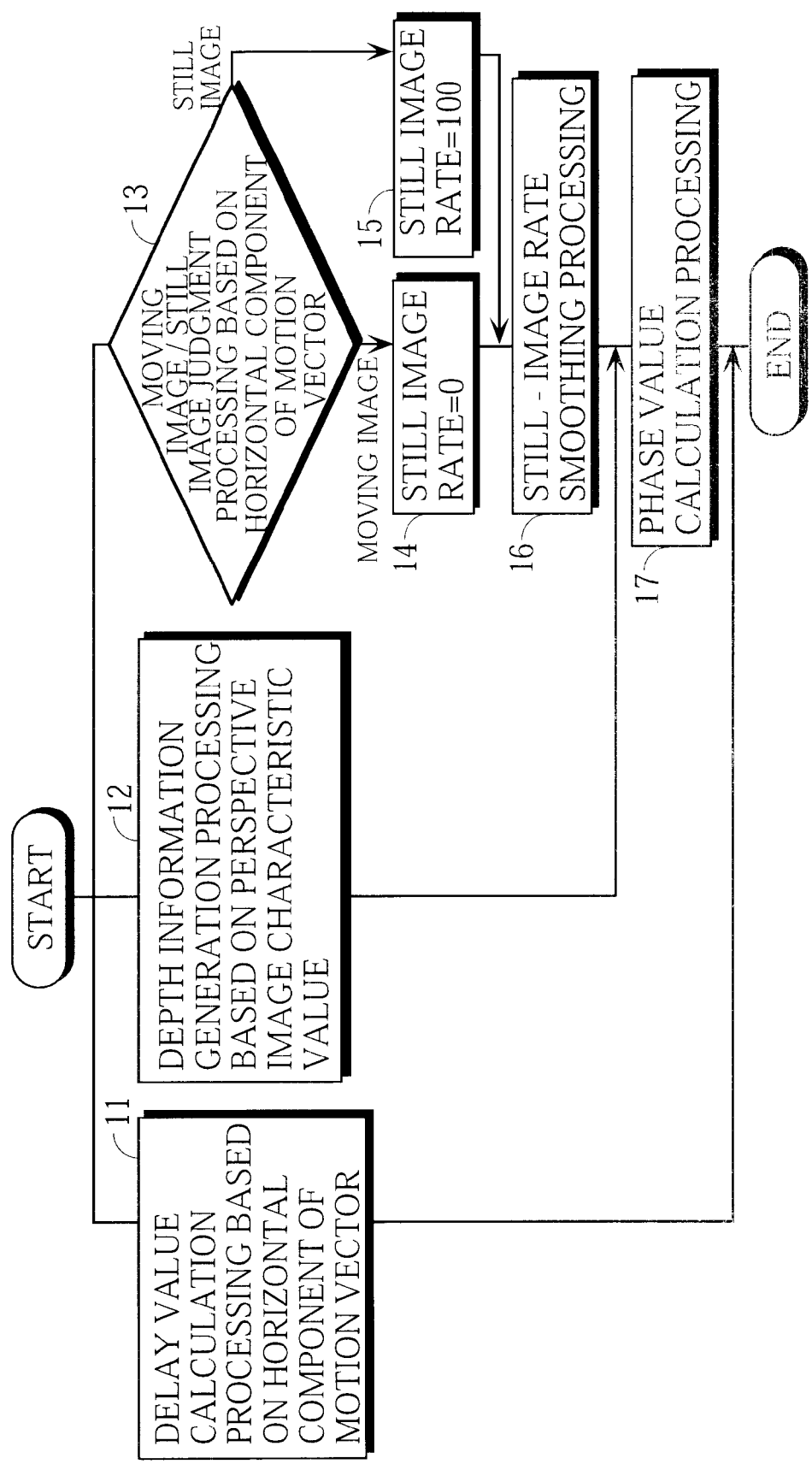
FIG. 36 is a flow chart representing steps of a procedure taken by a CPU 530.

FIG. 36 is a flow chart representing steps of a procedure taken by the CPU 530.

Based on a horizontal component of the motion vector sensed by the motion vector sensing circuit 511, the CPU 530 calculates, on a field-by-field basis, a delay value used for the 2D/3D moving image conversion process (Step 11). At this time, the CPU 530 determines which of a main image and a sub-image to be used as the left eye image with the other used as the right eye image, based on a direction (rightward or leftward) of the horizontal component of the motion vector, the main image serving as a base in the 2D/3D moving image conversion process. A result of this determination is represented by way of sign (positive and negative) of the delay value.

Figure 3:
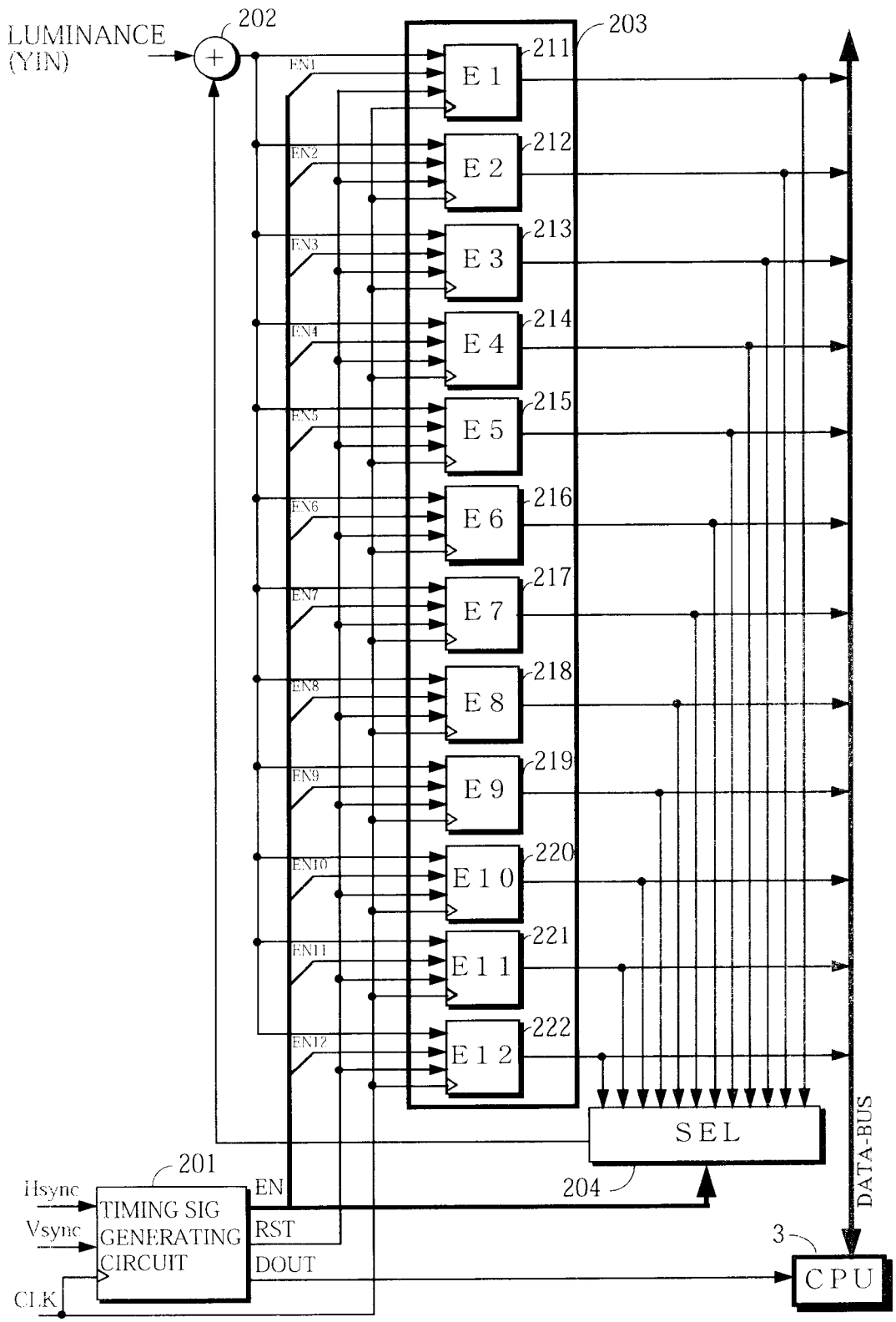
FIG. 3 is a block diagram showing a configuration of an R-Y component integrating circuit.
Figure 4:
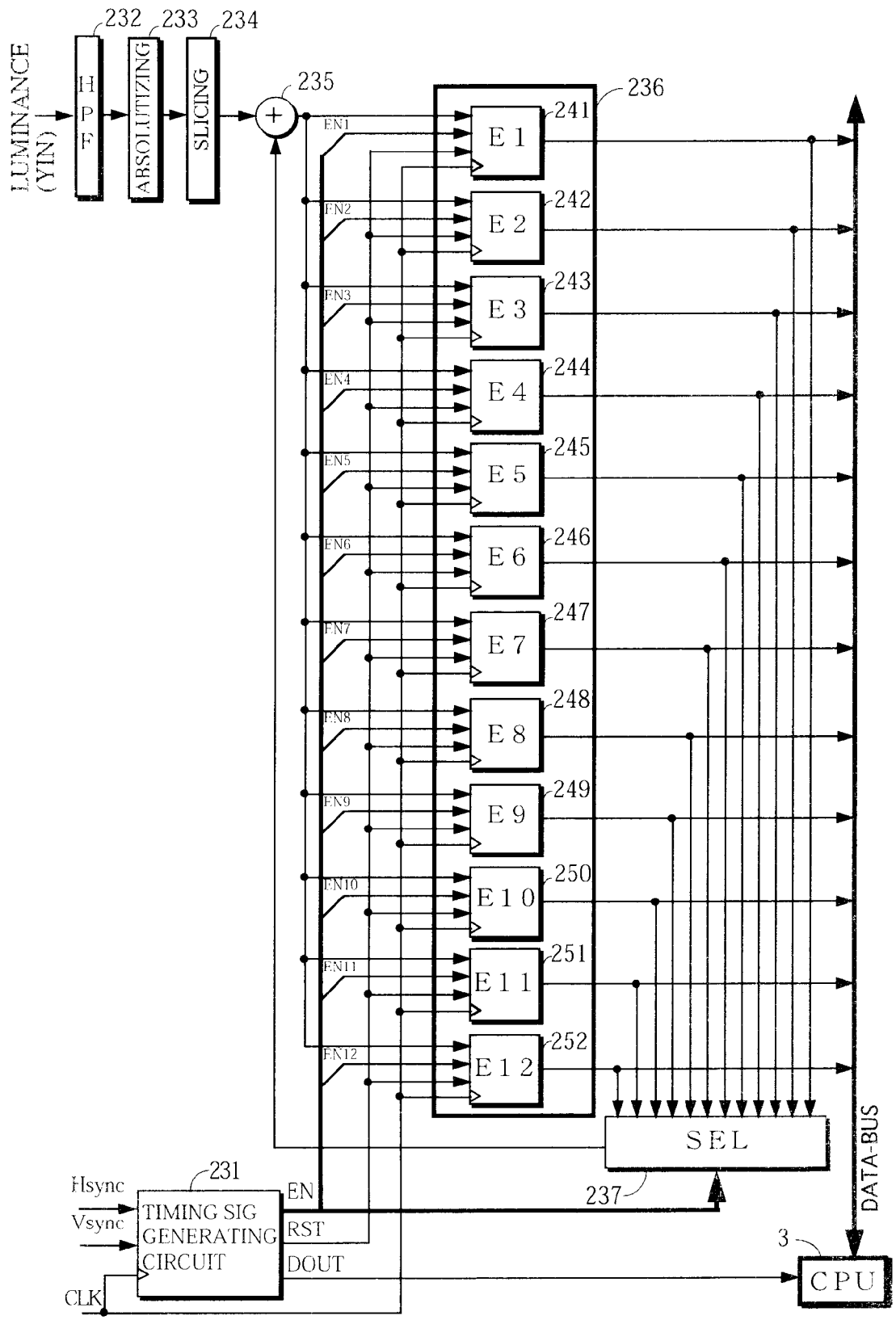
FIG. 4 is a block diagram showing a configuration of a high-frequency component integrating circuit.
Figure 5:
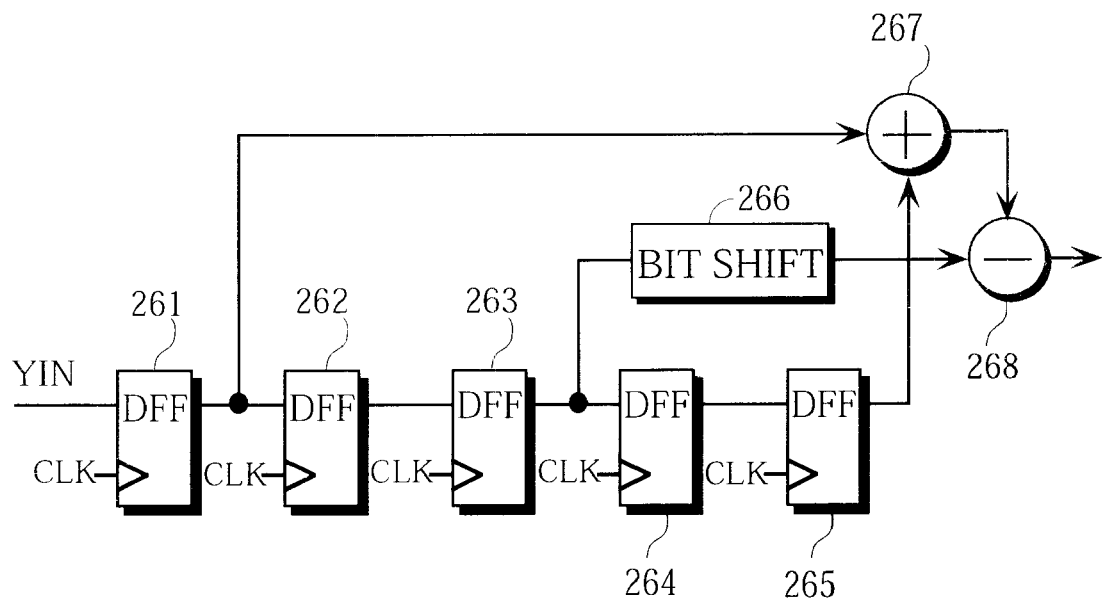
FIG. 5 is a circuit diagram showing an exemplary configuration of a high-pass filter 232 in FIG. 4.
Figure 6:
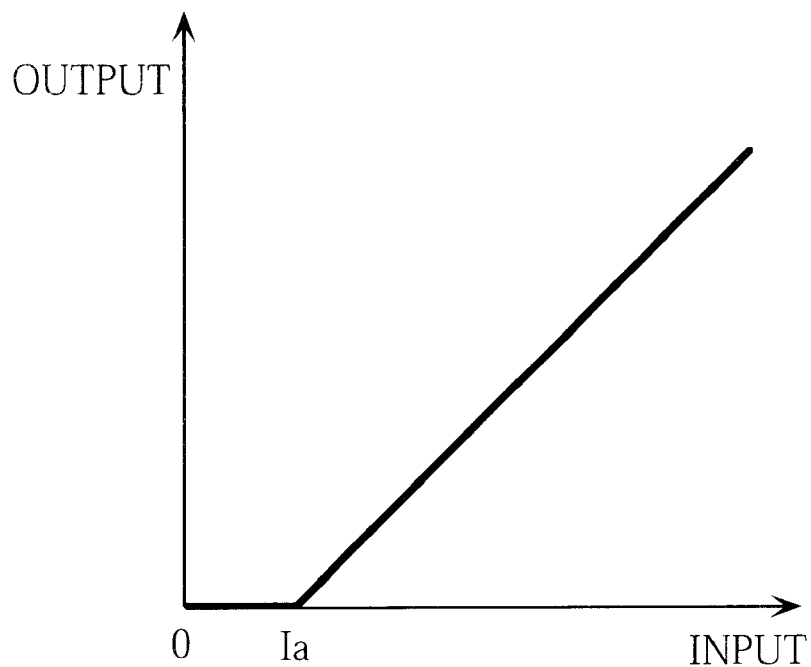
FIG. 6 is a graphical representation of input/output characteristics of a slicing circuit 234 in FIG. 4.
Figure 7:
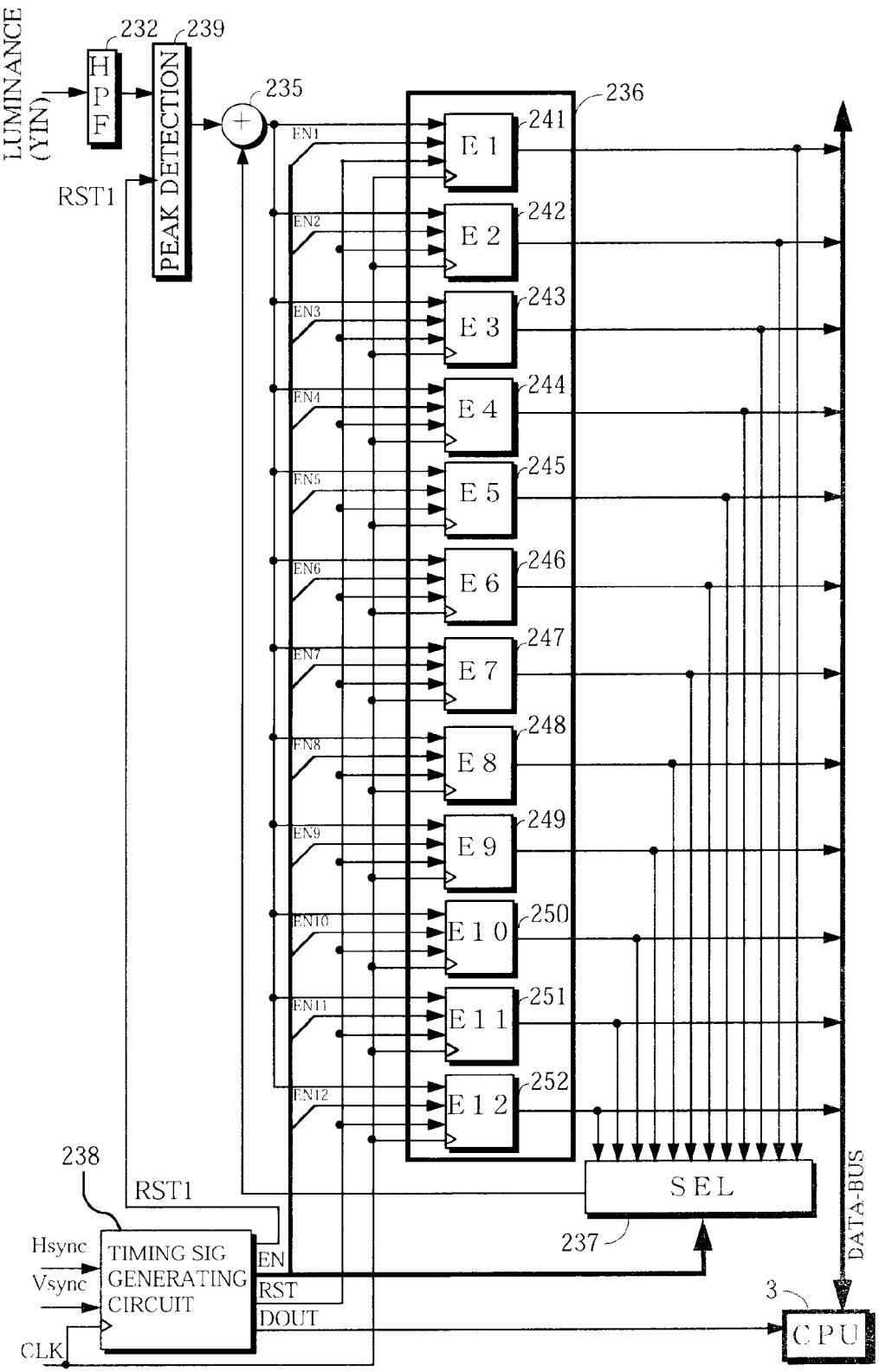
FIG. 7 is a block diagram showing another exemplary configuration of the high-frequency component integrating circuit.
Figure 8:
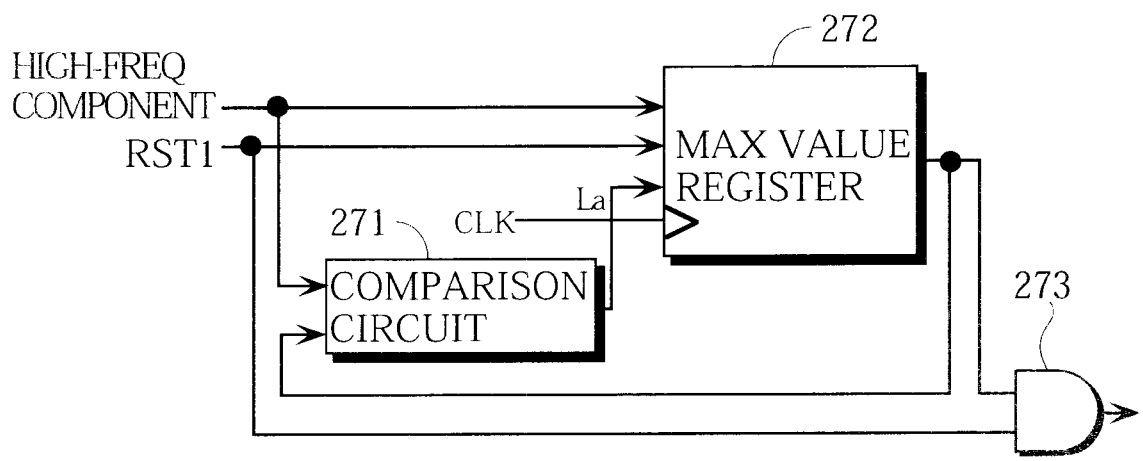
FIG. 8 is a circuit diagram showing an exemplary configuration of a peak detecting circuit 239 in FIG. 7.
Figure 9:
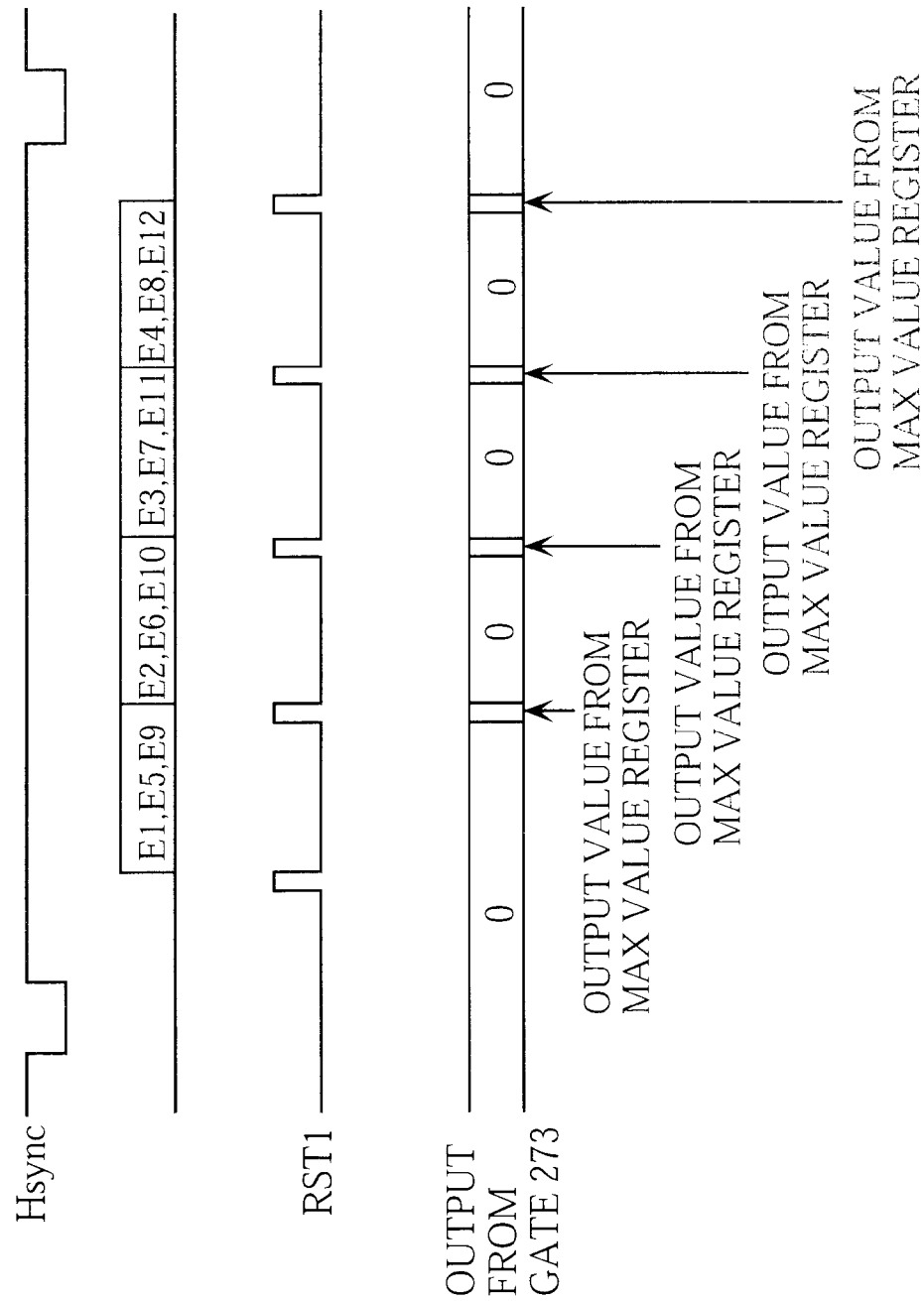
FIG. 9 is a timing chart showing signals at components of the peak detecting circuit 239.
Figure 10:
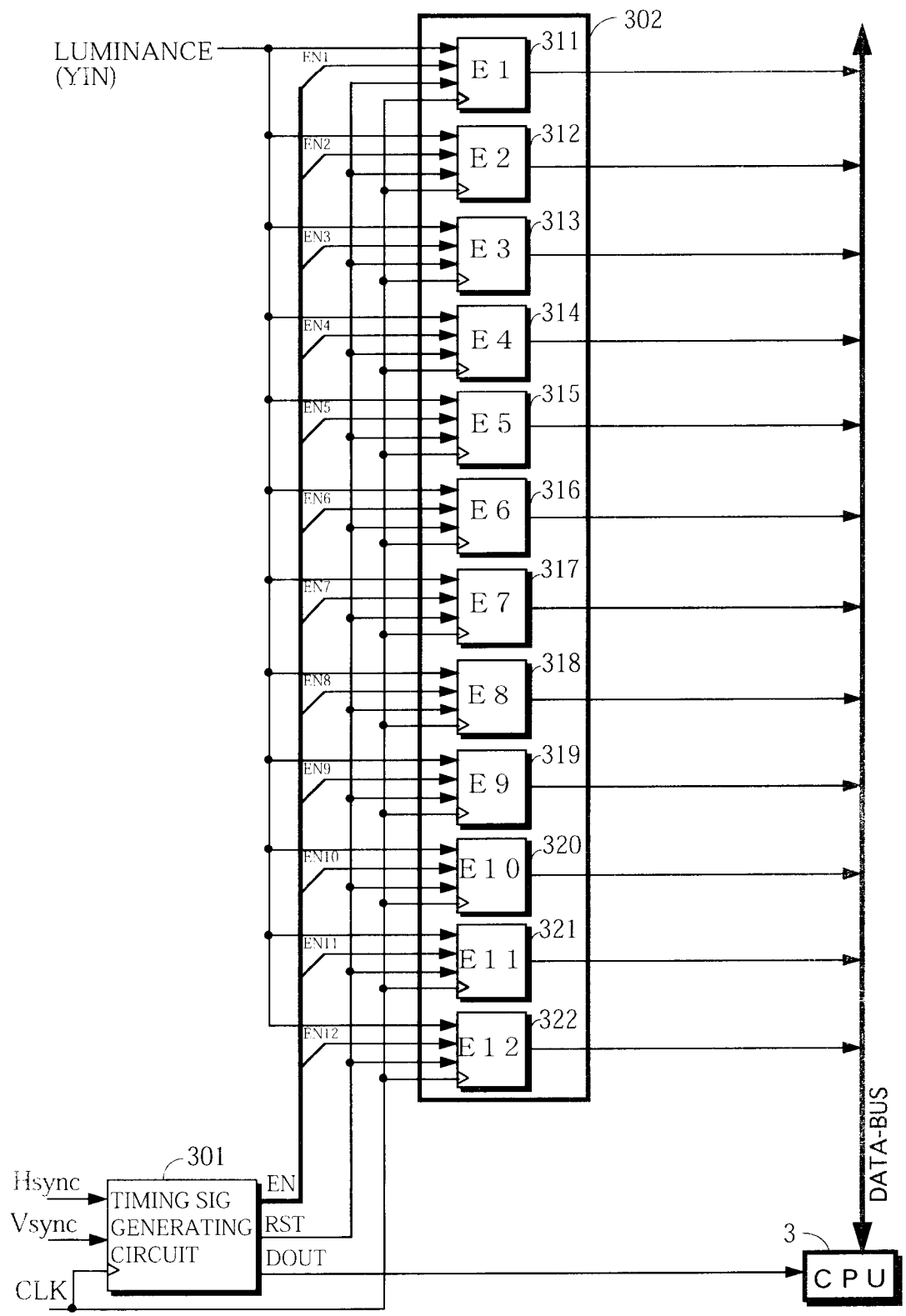
FIG. 10 is a block diagram showing a configuration of a luminance contrast calculating circuit.
Figure 11:
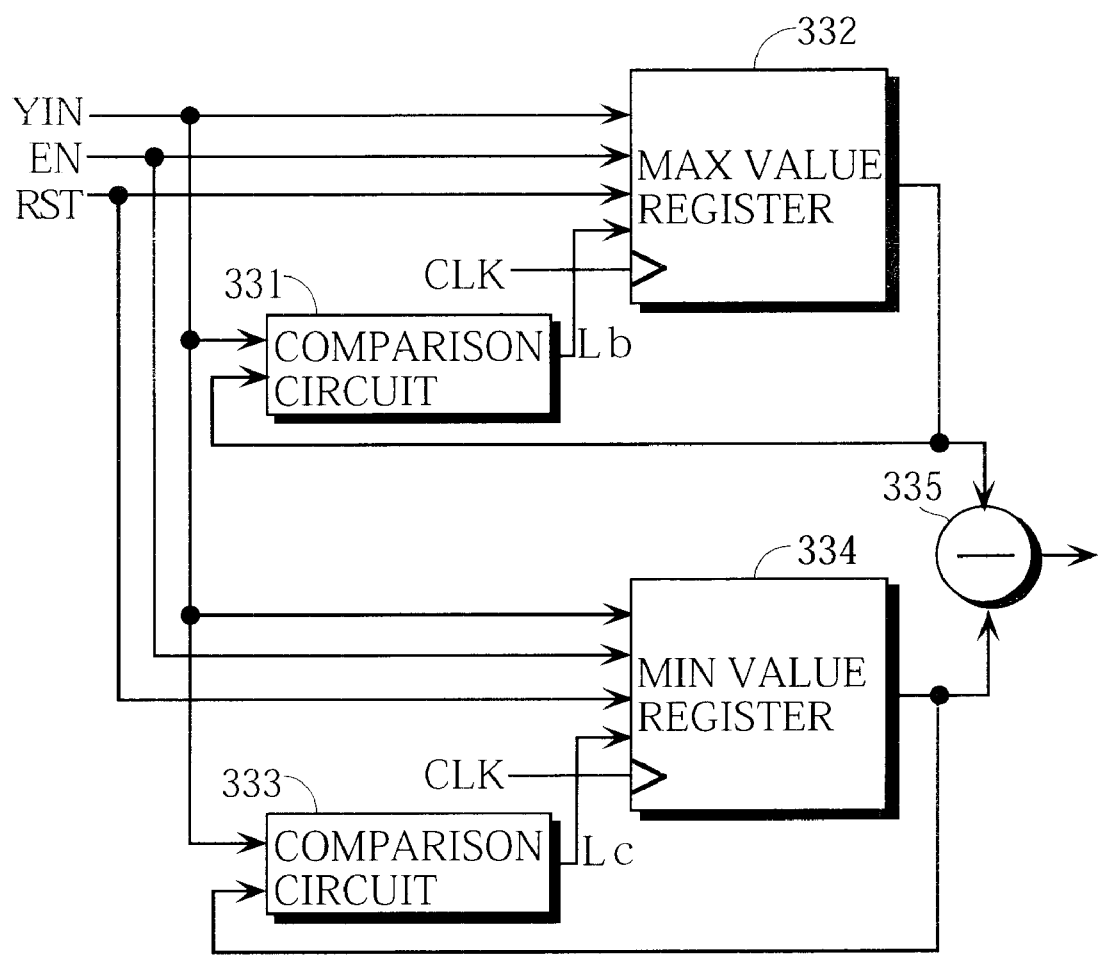
FIG. 11 is a circuit diagram showing a configuration of a luminance contrast sensing circuit in FIG. 10.

As a method of determining the delay value, an algorithm disclosed in FIG. 3 of Japanese Unexamined Patent Publication No.8(1996)-149513, for example, may be used. It is to be noted that the algorithm shown in FIG. 3 of the patent publication No.8(1996)-149513 may be used for smoothing the resultant delay values, thereby decreasing the delay value variations between fields. The delay value calculated by the CPU 530 is supplied to the memory control unit 513.

Further, the CPU 530 uses the perspective image characteristic value calculated by the various in-screen data calculating circuit 512 for calculating, on a per-field basis, depth information on each of the plural parallax calculation regions in the one-field screen (Step 12). As a method of calculating the depth information, the algorithm including the steps 1 to 8 shown in FIG. 12 may be used.

Further, the CPU 530 determines, on a per-field basis, whether the present field is an image with motion (moving image) or an image without motion (still image) based on the horizontal component of the motion vector sensed by the motion vector sensing circuit 511 (Step 13). In the case of the moving image, a still image rate is set to 0 (Step 14). In the case of the still image, the still image rate is set to 100 (Step 15). Subsequently, the still image rate is smoothed for decreasing the still image rate variations between fields (Step 16).

Figure 38:
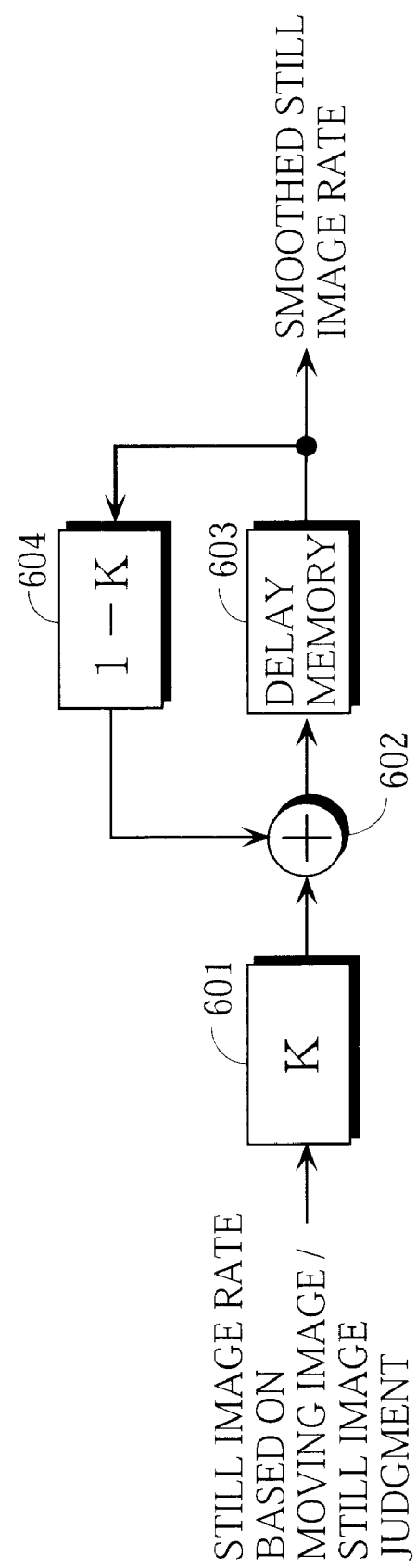
FIG. 38 is a block diagram for illustrating a still-image rate smoothing processing.

Although the smoothing processing of the still image rate is actually performed by a software, the description thereof is facilitated by way of reference to the block diagram of FIG. 38.

More specifically, when the still image rate is set at Step 14 or 15, a multiplier 601 multiplies the set still image rate by a factor K. Examples of the factor include values such as ¼, ⅛, ¹⁄₁₆ and the like. The resultant product is supplied to an adder 602.

The adder 602 is further supplied with a product of multiplying an added sum of a preceding field by a factor (1−K) via a delay memory 603 and a multiplier 604 serving to multiply the added sum by the factor (1−K), the added sum of the preceding field given by the adder 602. Thus, in the adder 602, the product of multiplying the present still image rate by the factor K is added with the product of multiplying the added sum of the preceding field by the factor (1−K).

The result of this arithmetic addition is stored in the delay memory 603 so as to be outputted in the succeeding field as a still image rate smoothed by the smoothing processing.

Such a smoothing processing of the still image rate provides progressive variations of the smoothed still image rate between fields even if the input image is switched between the moving image and the still image.

Further, the CPU 530 performs a phase value calculation procedure for calculating a phase value per parallax calculation region based on the depth information per parallax calculation region in the one-field screen, the depth information obtained by the depth information calculation processing (Step 17).

Figure 37:
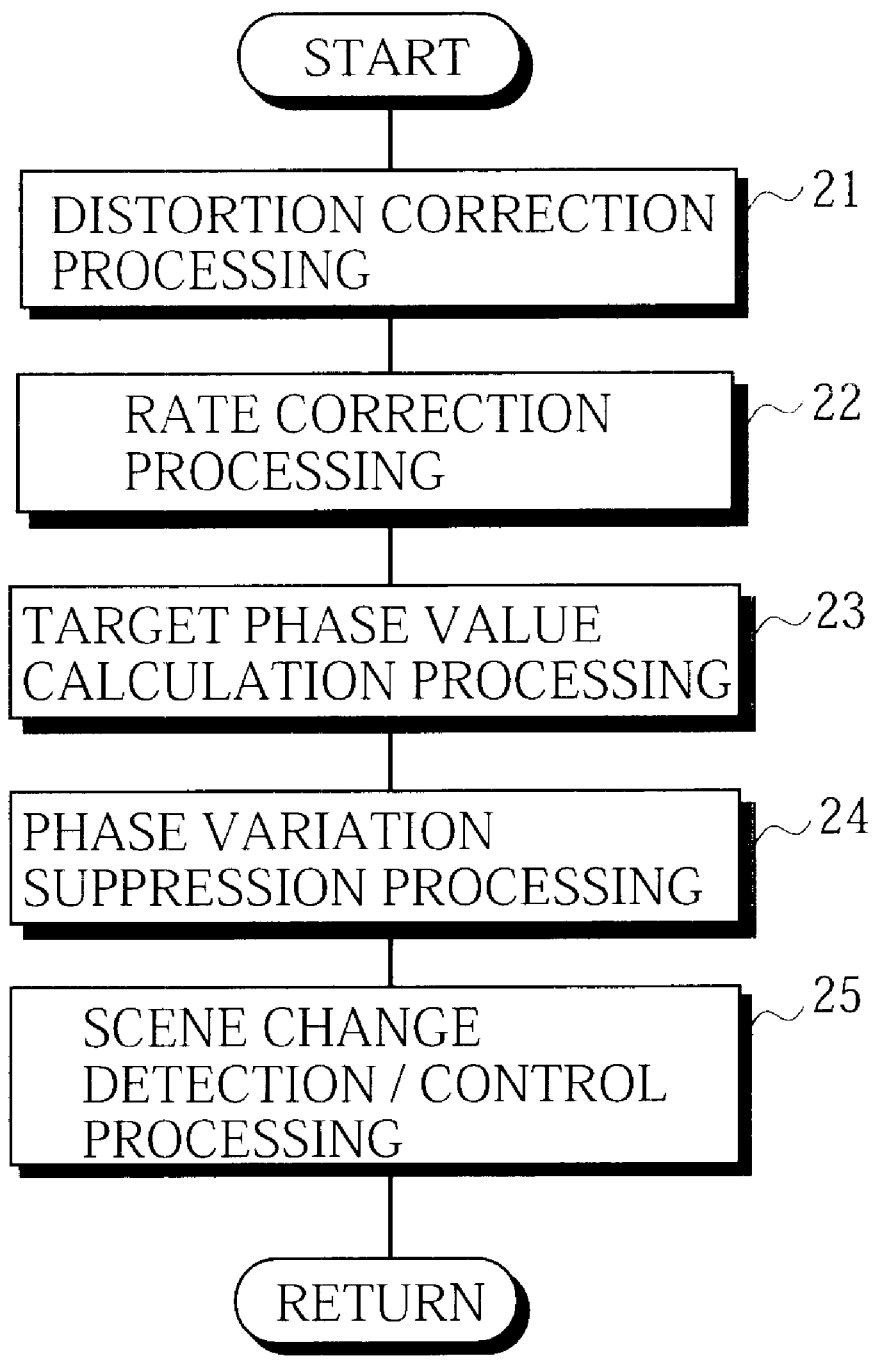
FIG. 37 is a flow chart representing steps taken in a phase value calculation procedure.

FIG. 37 is a flow chart representing steps taken in the phase value calculation procedure.

It is assumed here that the depth information is generated in a range of between 0 (rear) and 100 (front). The following method may be used for converting the depth information per parallax calculation region in the one-field screen into a target phase value, the depth information obtained through the steps 1 to 8 of the algorithm shown in FIG. 12.

It is hereinafter assumed that, with "front" [pixel] denoting a limit of the target phase value when the image is projected forwardly with respect to a display screen surface and "rear" [pixel] denoting a limit of the target phase value when the image is retracted rearwardly with respect to the display screen surface, a dynamic range of the phase value is represented by "front−rear" [pixel]. The value of the front [pixel] is at 10 [pixel], for example, whereas the value of the rear [pixel] is at −10 [pixel], for example. Values set by the user by means of a knob or the like are used as the front [pixel] and the rear [pixel].

With the depth information denoted by "depth" and the target phase value denoted by "tphase", the target phase value tphase is expressed by the following equation (8):

$$\text{tphase} = \{\text{depth} \times (\text{front}-\text{rear}) \div 100\} + \text{rear} \quad (8)$$

It will be understood from the above equation (8) that increase in the dynamic range (front−rear) results in increase in the target phase value. It is apparent that increase in the target phase value inevitably leads to increased phase difference between adjacent parallax calculation regions. The increased phase difference between adjacent regions results in increased distortion of image corresponding to these regions.

Hence, the distortion correction processing for correcting such an image distortion is performed in the phase value calculation procedure (Step 21).

According to the distortion correction processing, if a maximum value of the phase difference between adjacent regions exceeds a predetermined value PHASETH, the dynamic range of the target phase value is changed in order to decrease the phase difference.

Actually, in a case where a maximum value dvmax of depth information differences between respective pairs of adjacent regions exceeds the predetermined value DEPTHTH, the dynamic range "dvrange(=front−rear)" of the target phase value set by the user is changed.

The predetermined value DEPTHTH is given by the following equation (9):

$$\text{DEPTHTH} = \text{PHSETH} \times 100 \div (\text{front}-\text{rear}) \quad (9)$$

Where the maximum value dvmax of depth information differences between respective pairs of adjacent regions exceeds the predetermined value DEPTHTH, the dynamic range dvrange of the target phase value is changed by using the following equation (10):

$$\text{dvrange}' = \text{front}' - \text{rear}' = (\text{front}-\text{rear}) \times \text{DEPTHTH} \div \text{dvmax} \quad (10)$$

wherein dvrange' denotes a dynamic range corrected through the distortion correction processing, and front' and rear' respectively denote corrected limit values of the target phase value for projecting the image forwardly with respect to the screen surface and for retracting the image rearwardly with respect to the screen surface, which limit values are given by the following equations (11):

$$\text{front}' = \text{front} \times \text{DEPTHTH} \div \text{dvmax} \quad \text{rear}' = \text{rear} \times \text{DEPTHTH} \div \text{dvmax} \quad (11)$$

Figure 39:
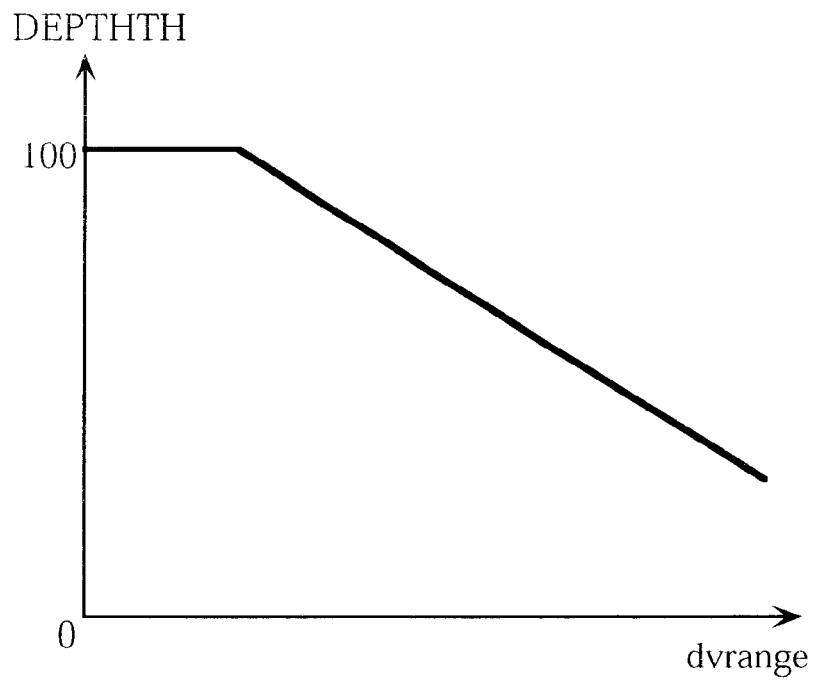
FIG. 39 is a graphical representation of a relation between a dynamic range "dvrange" and "DEPTHTH" used in a distortion correction processing wherein "DEPTHTH" is varied based on the dynamic range "dvrange" set by a user.

It is to be noted that the predetermined value DEPTHTH is a fixed value in the above example, but it may be a variable, as shown in FIG. 39, which correspondingly decreases as the dynamic range dvrange set by the user increases. This provides an optimum stereoscopic effect for the dynamic range set by the user. In FIG. 39, the predetermined value DEPTHTH is saturated when the dynamic range dvrange set by the user is at small values because with a small dynamic range set by the user, the image distortion is less perceivable even if adjacent regions have a great depth information difference therebetween.

The distortion correction processing is followed by a correction processing (hereinafter referred to as "rate correction processing") of the still image rate determined at the aforesaid Step 16 (Step 22).

With the still image rate determined by the aforesaid Step 16 denoted by "rate", the dvrange', front' and rear' given by the distortion correction processing are respectively converted into dvrange", front" and rear" by using the following equations (12):

$$\text{dvrange}'' = \text{dvrange}' \times \text{rate} \quad \text{front}'' = \text{front}' \times \text{rate} \quad \text{rear}'' = \text{rear}' \times \text{rate} \quad (12)$$

It is to be noted that, in the equation (10) and (11) used in the distortion correction processing of the above Step 21, DEPTHTH may be replaced by DEPTHTH" represented by the following equation (13) and taking the still image rate "rate" into consideration:

$$\text{EPTHTH} = \text{DEPTHTH}' \times \text{RATE} \quad (13)$$

The distortion correction and rate correction processings are followed by a target-phase-value calculation processing (Step 23). More specifically, the depth information "depth" is converted into the target phase value "tphase" by using the dynamic range dvrange" (=front"−rear"), given by the rate correction processing, in the following equation (14):

$$\text{tphase} = \{(\text{front}''-\text{rear}'') \times \text{depth} \div 100\} + \text{rear} \quad (14)$$

The target phase value "tphase" is directly affected by the depth information generation processing, the distortion correction processing and the rate correction processing. Therefore, the target phase value has a strong tendency to vary. For reduction of this tendency, the phase variation suppression processing is carried out (Step 24).

In the phase variation suppression processing, a target phase value "tphase" of each parallax calculation region is compared with a real phase value "phase" of each parallax calculation region and if a difference exists therebetween, a given phase value variation VT (>0) is added to or subtracted from the real phase value. That is, the real phase value is approximated to the target phase value on a basis of the given value VT (>0).

A content of the phase variation suppression processing is expressed by the following conditional expressions:

$$\text{phase} = \text{phase} + \text{VT for tphase} > \text{phase}$$

phase=phase for tphase=phase phase=phase−VT for tphase<phase

A preferred given value VT is, for example, 1/32 [pixel]. In the case of the given value VT=1/32[pixel], 32 fields are required for varying the phase value by 1 [pixel].

Figure 40:
FIG. 40 is a graphical representation of a relation between the still image rate "rate" and "VT" used in a phase variation suppression processing wherein "VT" is varied based on the still image rate "rate"

In the above example, the given value VT used in the phase variation suppression processing is fixed but, as shown in FIG. 40, VT may be a variable reaching the maximum in correspondence to a still image rate of about 50%. Alternatively, as shown in FIG. 41, the value VT may be variable in such a manner as to increase with increase in the absolute value of difference between the target phase value "tphase" and the real phase value "phase".

Figure 41:
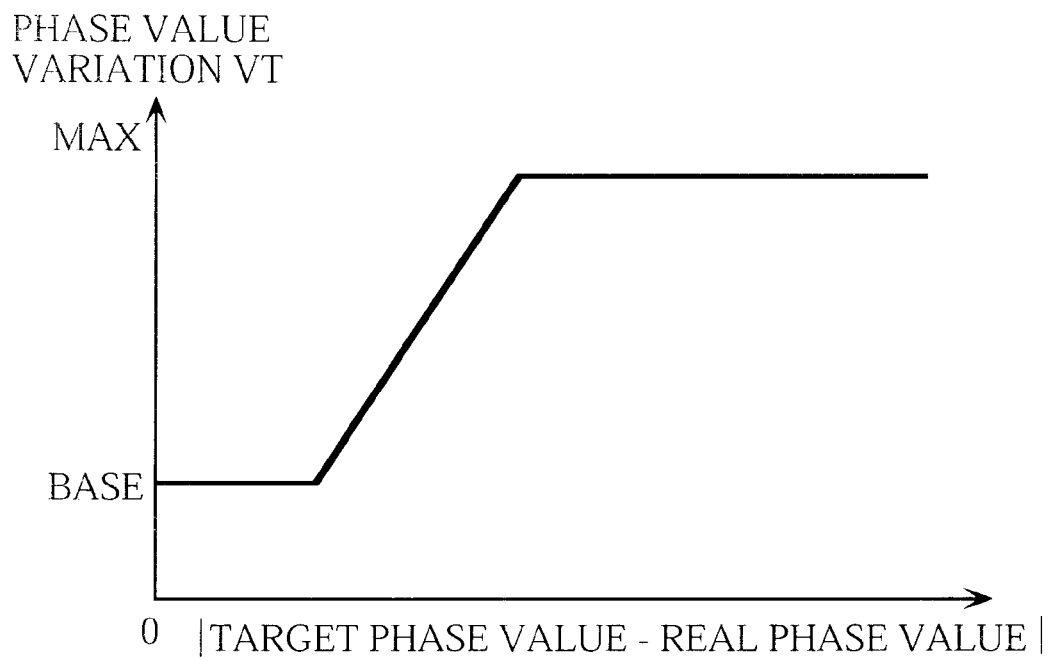
FIG. 41 is a graphical representation of a relation of an absolute value of difference between a target phase value "tphase" and a real phase value "phase" versus "VT" used in the phase variation suppression processing wherein "VT" is varied based on the absolute value of difference between the target phase value "tphase" and the real phase value "phase"

In FIGS. 40 and 41, BASE denotes a lower limit of VT while MAX denotes an upper limit of VT. The upper limit of VT is specified because an excessive VT detrimentally allows the observer to perceive how the image is being distorted in conjunction with variations in the real phase value. The VT set to not less than 1 [pixel] often allows the observer to perceive the process of image distortion.

Figure 42:
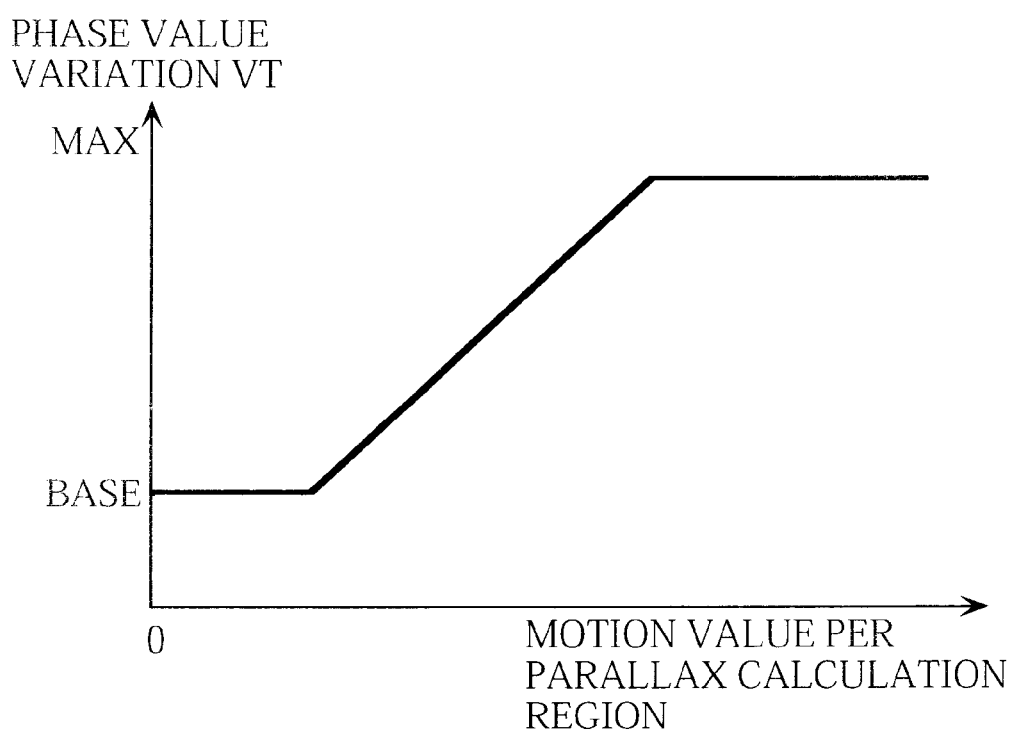
FIG. 42 is a graphical representation of a relation between a motion value per parallax calculation region and "VT" used in the phase variation suppression processing wherein "VT" is varied for each parallax calculation region based on the motion value of the parallax calculation region.

Further, a value VT of each parallax calculation region may be varied according to an image motion of each parallax calculation region. More specifically, an amount of image motion is sensed on a per-parallax-calculation-region basis so that a region with a greater motion value correspondingly has a greater value VT, as shown in FIG. 42. The greater VT is given to a region with the greater image motion value because the image with a greater motion value has a smaller tendency of allowing the observer to perceive the process of image distortion, as compared with the image with a smaller motion value.

According to the method of FIG. 42 wherein the greater VT is specified for the region with the greater image motion value, it is possible to vary the real phase value to "0" more quickly in a moving image region susceptible to image degradation. This means a more prompt elimination of resolution deterioration in the moving image region by means of the phase control, the resolution deterioration occurring in the process of image distortion. In general, the stereoscopic effect is augmented correspondingly to increase in the resolution and hence, the stereoscopic effect of the moving image region can be improved.

In normal operation, the real phase value "phase" per parallax calculation region given by the phase variation suppression processing is supplied to the parallax control circuit 518.

However, when scenes are changed, the depth information, target phase value "tphase", real phase value "phase" and "VT" are controlled in the following manner by means of a scene change detection/control processing (Step 25).

In response to a detection of scene change, the depth information, target phase value "tphase" and real phase value "phase" are forcibly reset to "0". That is, the depth information, target phase value "tphase" and real phase value "phase" become "0". A method disclosed in Japanese Unexamined Patent Publication No.8(1996)-149514, for example, may be used for the scene change detection.

In a system requiring time of less than several fields between the scene change and decision of the target phase value, a target phase value determined immediately after the scene change is defined as the real phase value.

In a system requiring time of not less than several fields between the scene change and the decision of the target phase value, the real phase value is progressively approximated to the target phase value on a basis of a give value VT.

In the case of a small VT value used for the phase variation suppression processing, a substantial time must be taken between the scene change and production of the stereoscopic effect and hence, the VT value used for the phase variation suppression processing of Step 24 is set to a greater value than a normal VT value during a period of several dozens fields subsequent to the scene change detection.

Based on the delay value supplied from the CPU 530, the memory control unit 513 of FIG. 35 decides a field memory to which the input image is written and a field memory from which the input image is read out. Further, the memory control unit 513 applies a selection control signal to the right-eye image selection circuit 514 and the left-eye image selection circuit 515 based on the sign of the delay value.

For convenience of the explanation, it is assumed hereinafter that the input image itself constitutes the main image while an image read out from the field memory constitutes the sub-image time-delayed relative to the main image. The main image is applied to a first input terminal of the right-eye image selection circuit 514 and to a first input terminal of the left-eye image selection circuit 515. The sub-image is applied to a second input terminal of the right-eye image selection circuit 514 and to a second input terminal of the left-eye image selection circuit 515.

The selection circuits 514, 515 responds to the selection control signal from the memory control unit 513 for selectively outputting either one of the image signals applied to the first and second input terminals. Thus, the main image is outputted from either of the selection circuits 514, 515 while the sub-image is outputted from the other circuit.

The parallax control circuit 518 of FIG. 35 serves to generate a real phase value per pixel based on the real phase value "phase" per parallax calculation region supplied from the CPU 530. The parallax control circuit 518 of FIG. 35 is equivalent to the parallax control circuit 4 shown in FIG. 1 and more specifically, to a circuit occupying a portion indicated at 701 in FIG. 28. However, the parallax control circuit 518 of FIG. 3 differs from the parallax control circuit 4 of FIG. 1 in that the circuit 518 is supplied with the real phase value "phase" per parallax calculation region given by the aforementioned phase value calculation procedure (see FIG. 38). Except for this, the parallax control circuit 518 of FIG. 35 operates the same way as the circuit occupying the portion indicated at 701 in FIG. 28 and therefore, a description thereof is omitted.

The right-eye parallax generating circuit 516 and the left-eye parallax generating circuit 517 respectively perform the horizontal phase control on each pixel of the right-eye and the left-eye image signals obtained through the 2D/3D moving image conversion process, the horizontal phase control being based on a real phase value of the pixel supplied from the parallax control circuit 518.

Figure 28:
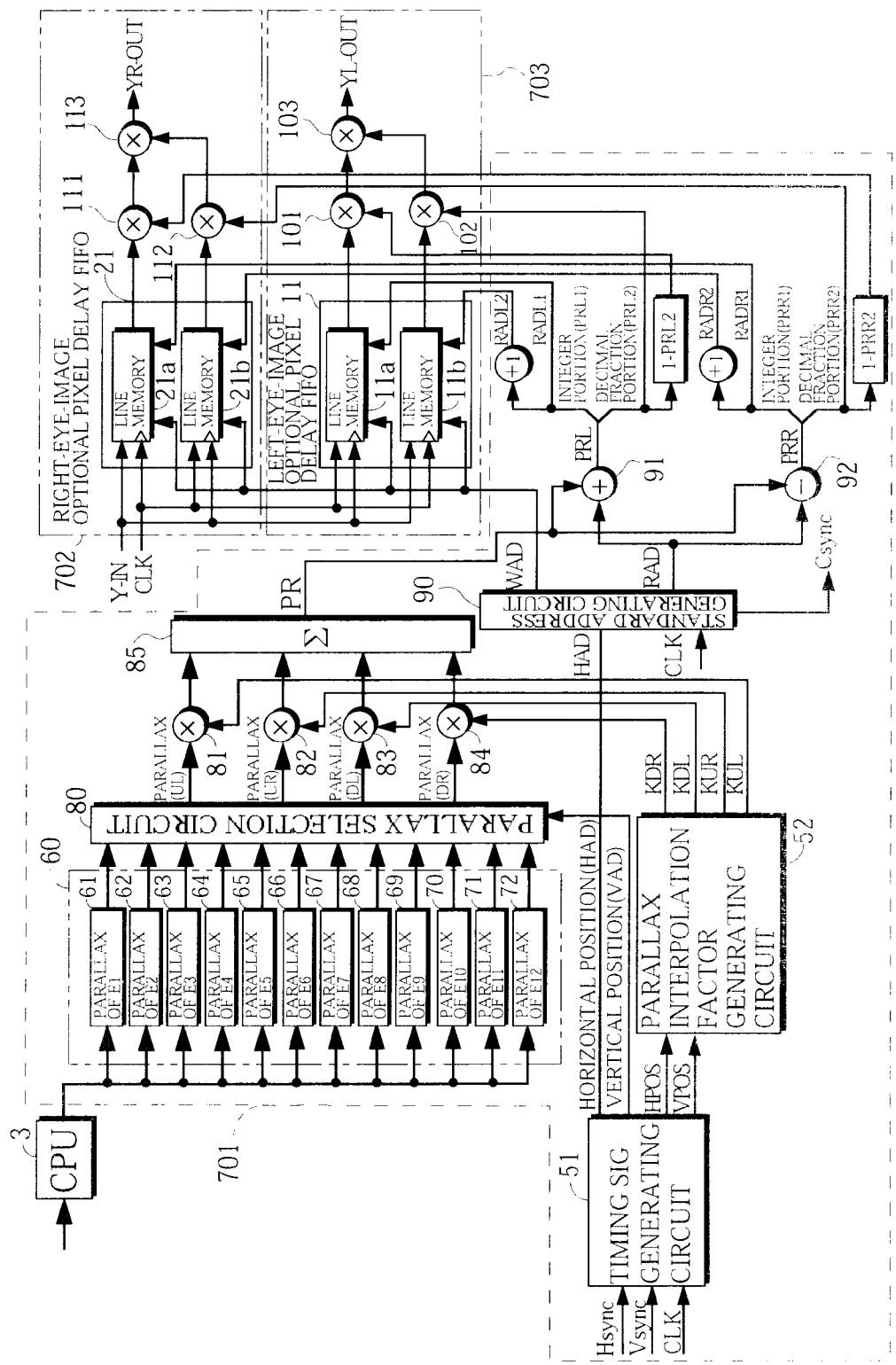
FIG. 28 is a block diagram showing essential configurations of a parallax control circuit and an optional pixel delay FIFO.
Figure 29:
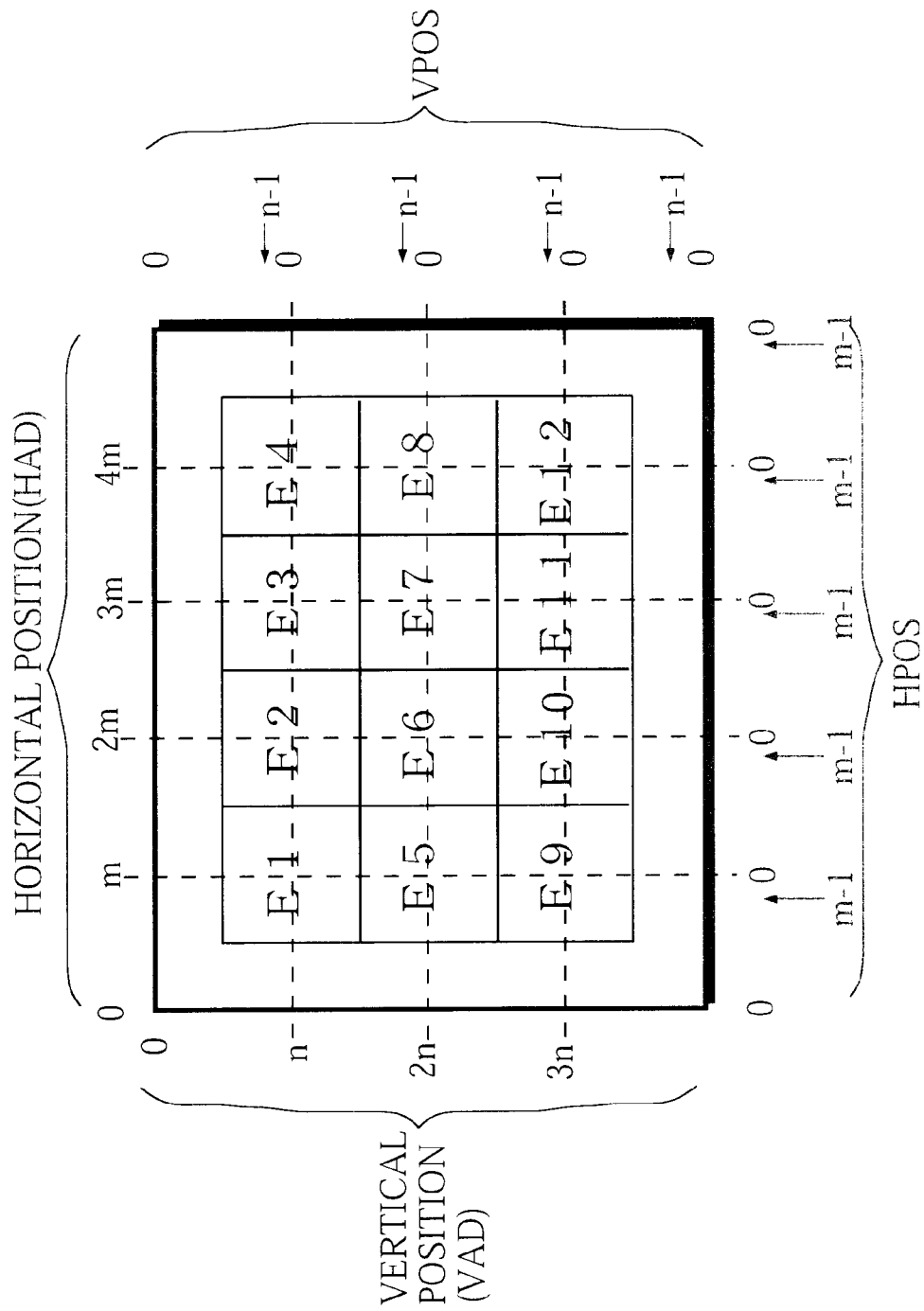
FIG. 29 is a schematic diagram for illustrating relative horizontal positions and relative vertical positions.
Figure 30:
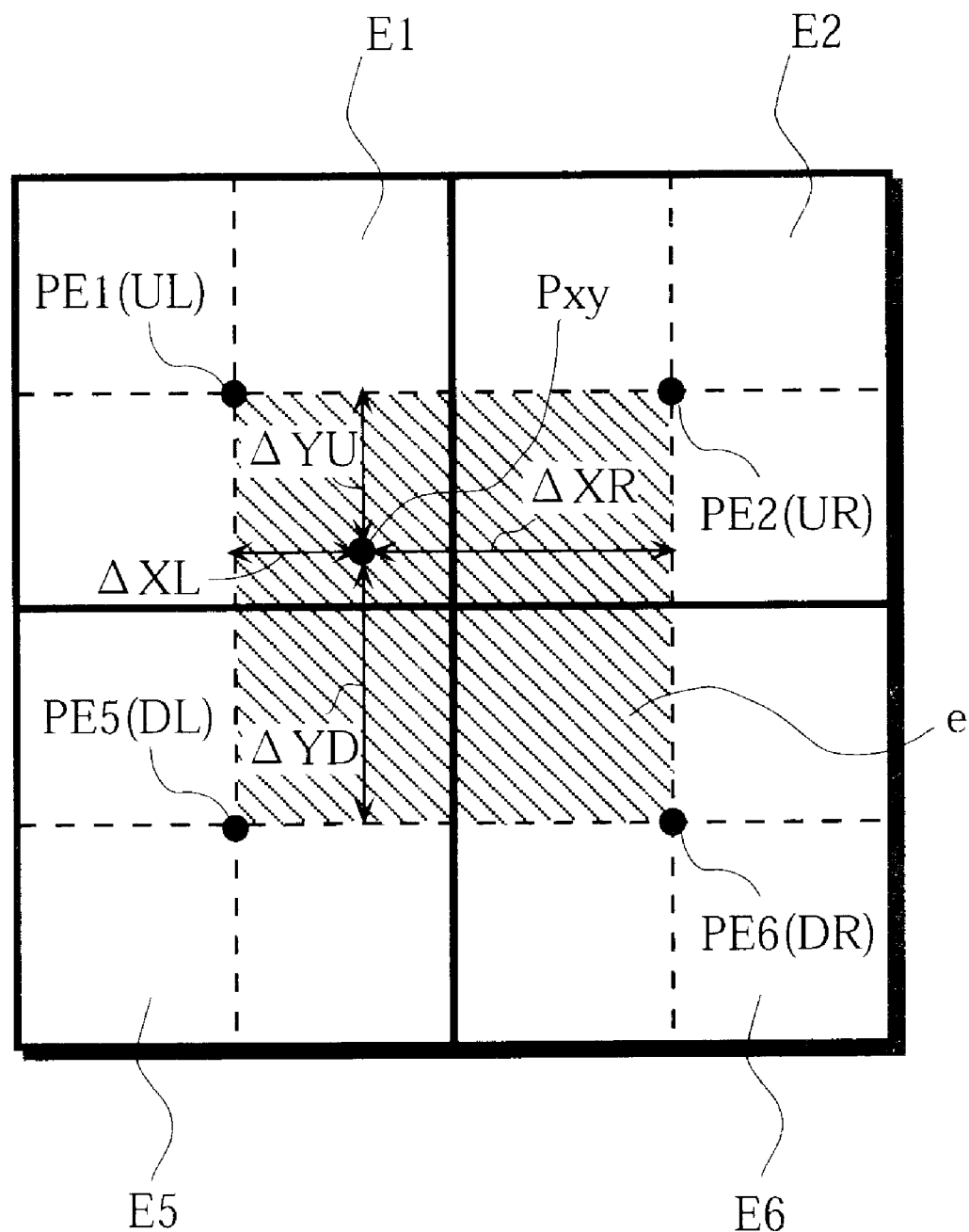
FIG. 30 is a schematic diagram for illustrating a method of generating parallax information on a target pixel.
Figure 32:
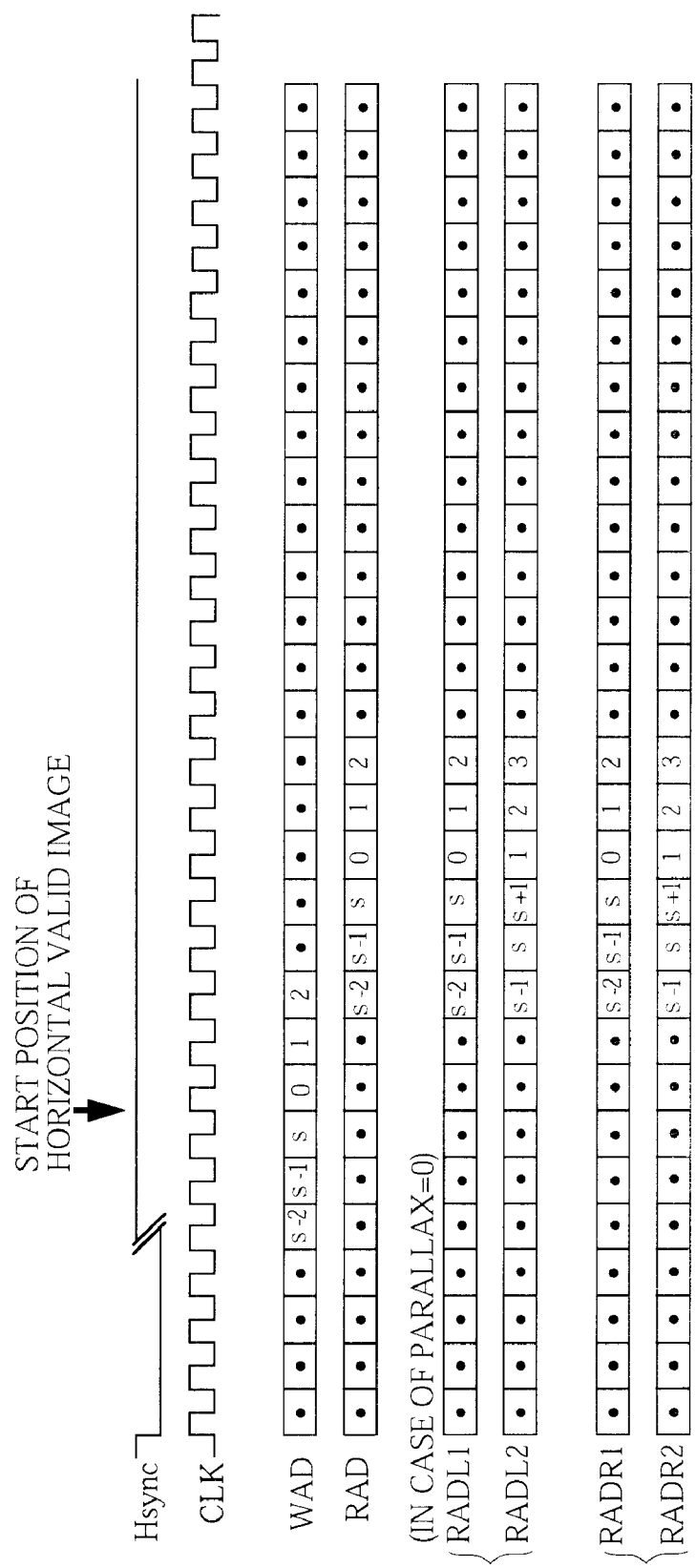
FIG. 32 is a timing chart showing signals at respective addresses in a case where parallax information is at 0.
Figure 33:
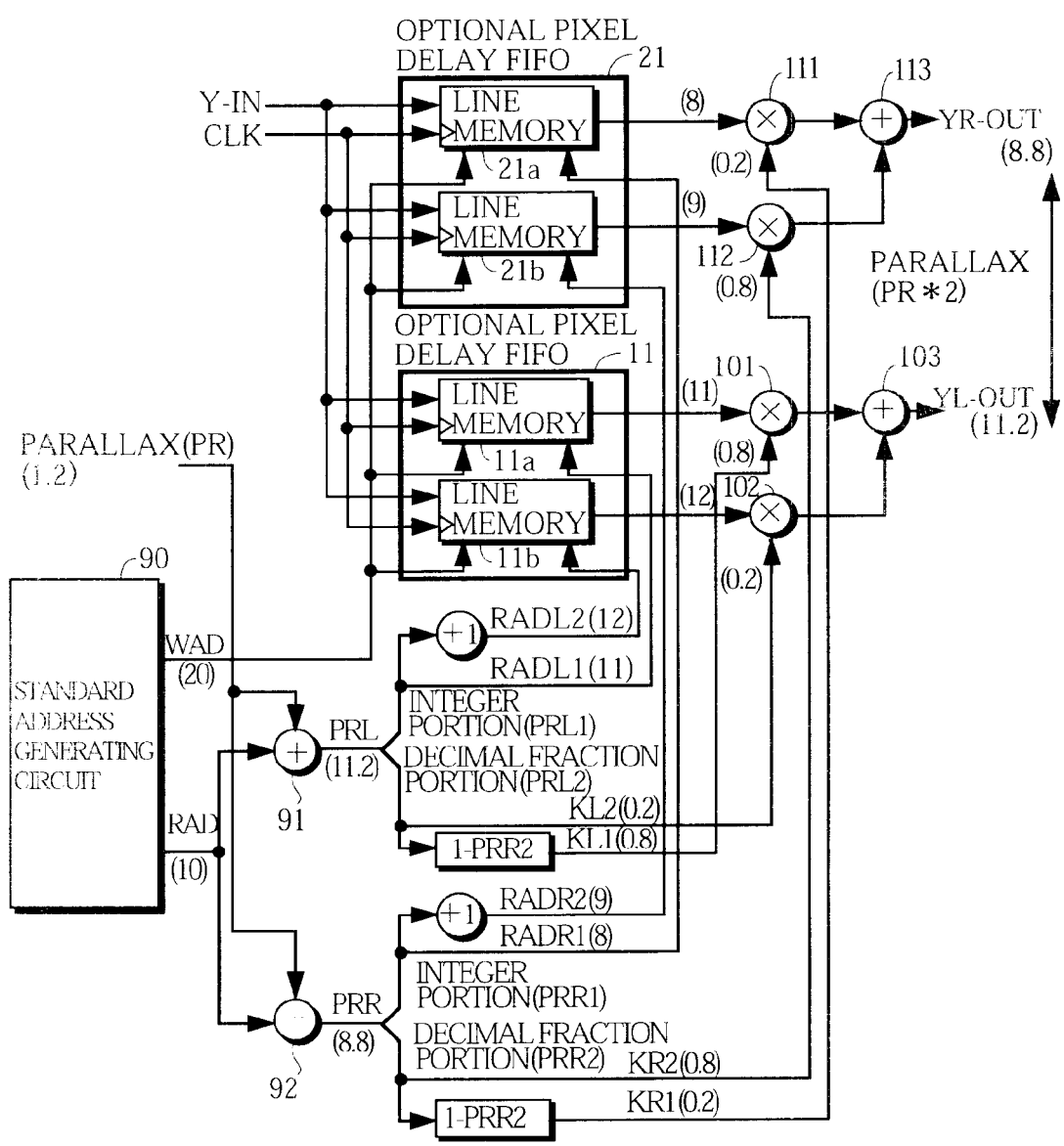
FIG. 33 is a block diagram showing a configuration of the parallax control circuit with address values appended thereto in the case of parallax information=1.2.
Figure 34:
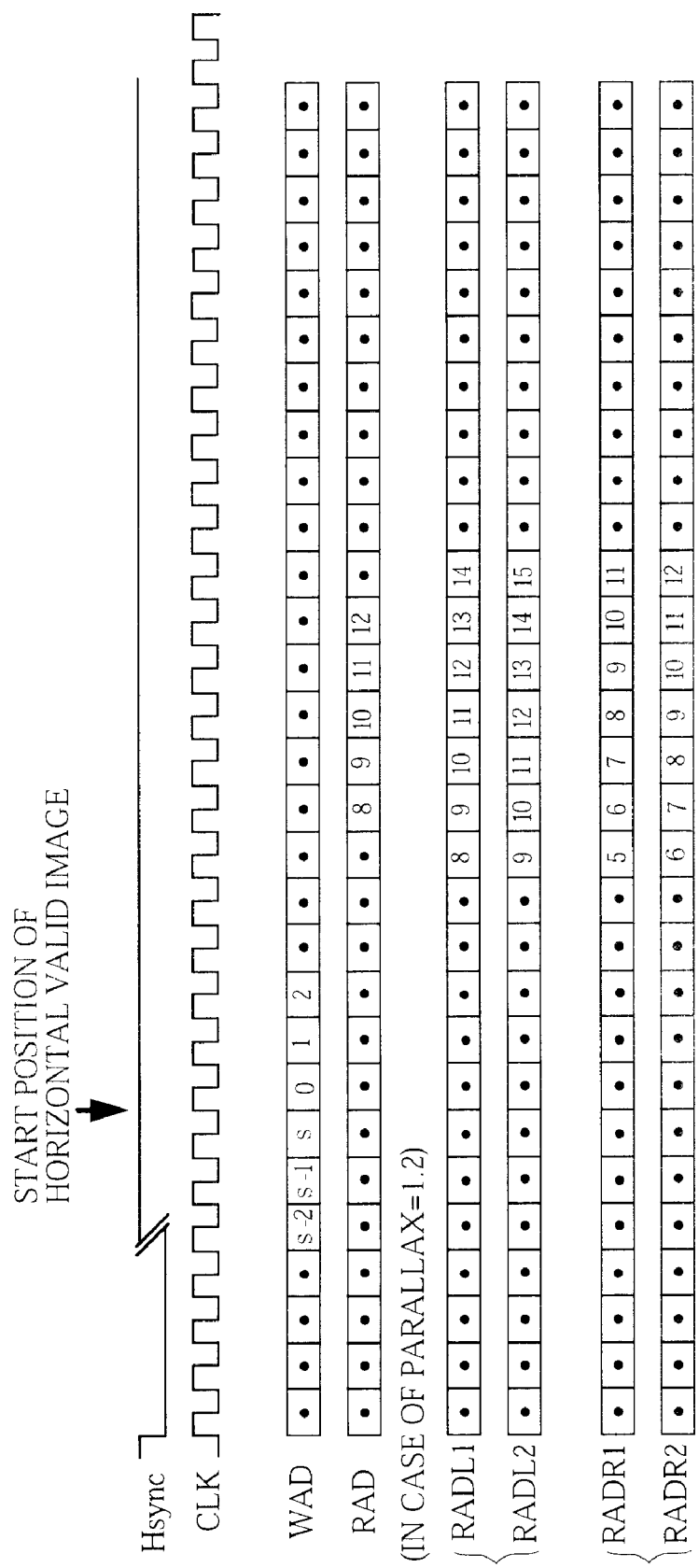
FIG. 34 is a timing chart showing signals at addresses in the case of parallax information=1.2.

The right-eye parallax generating circuit 516 is equivalent to the circuit occupying the portion indicated at 702 in FIG. 28 whereas the left-eye parallax generating circuit 517 of FIG. 35 is equivalent to the circuit occupying the portion indicated at 703 in FIG. 28. However, the image signals inputted in the right-eye parallax generating circuit 516 and the lift-eye parallax generating circuit 517 of FIG. 35 differ from those inputted in the circuits indicated at 702 and 703 in FIG. 28 in that the image signals applied to the circuits of FIG. 35 are the right-eye and left-eye image signals generated by the 2D/3D moving image conversion method. Except for this, the right-eye parallax generating circuit 516 and the left-eye parallax generating circuit 517 of FIG. 35 respectively operate the same way as the circuits indicated at 702 and 703 in FIG. 28 and therefore, detailed descriptions thereof are omitted.

In the above embodiment, the right and the left eye images are always produced by the 2D/3D moving image conversion method. The right and left eye images thus produced are subjected to the phase control based on the real phase value per pixel which is given according to a method based on essentially the same concept with that of the 2D/3D still image conversion method.

In this embodiment, the distortion correction processing (see Step 21 in FIG. 37) determines such a target phase value that no image distortion occurs between adjacent parallax calculation regions in the one-field screen. On the other hand, the rate correction processing (see Step 22 in FIG. 37) determines such a target phase value as to decrease in correspondence to a small still image rate. Further, the phase variation suppression processing (see Step 24 in FIG. 37) determines such a real phase value that no image distortion occurs between fields. As a result, finally obtained 3D images feature high visibility. Incidentally, the distortion correction processing (see Step 21 in FIG. 37) may be omitted.

In the above embodiment, the right and left eye images produced by the 2D/3D moving image conversion method are subjected to the phase control based on the real phase value. However, the 2D/3D image conversion according to the 2D/3D moving image conversion method may be omitted so that the two-dimensional signal may be subjected only to the phase control based on the real phase value. In this case, the rate correction processing (see Step 22 in FIG. 37) is omitted. Further, in the case of omission of the rate correction processing, the distortion correction processing (see Step 21 in FIG. 37) may be omitted.

[2] Second Embodiment

Figure 43:
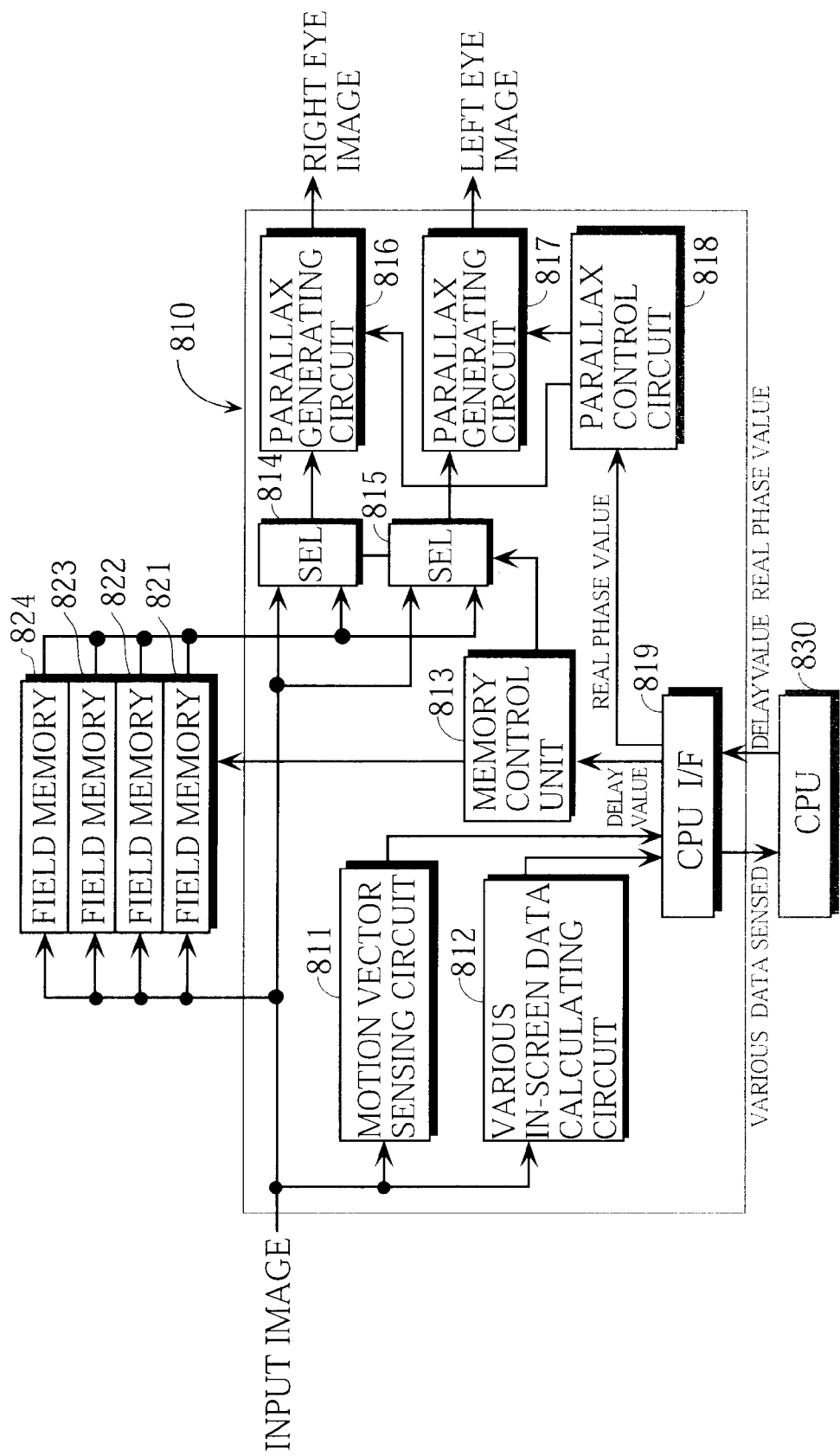
FIG. 43 is a block diagram showing a construction of a 2D/3D image conversion system according to a second embodiment of the invention.

Now referring to FIGS. 43 to 45, a second embodiment of the invention will hereinbelow be described. FIG. 43 diagrammatically illustrates a construction of the 2D/3D image conversion system.

The 2D/3D image conversion system includes a large scale integrated circuit (LSI) 810, a plurality of field memories 821 to 824 connected to the integrated circuit 810 and a CPU 830.

The integrated circuit 810 includes a motion vector sensing circuit 811, a various in-screen data calculating circuit 812, a memory control unit 813, a right-eye image selection circuit 814, a left-eye image selection circuit 815, a right-eye parallax generating circuit 816, a left-eye parallax generating circuit 817, a parallax control circuit 818, a CPU interface 819 and the like.

According to the representative point matching method, the motion vector sensing circuit 819 senses a motion vector on a per-field basis. The motion vector sensed by the motion vector sensing circuit 811 is supplied to the CPU 830 via the CPU interface 819.

The various in-screen data calculating circuit 812 includes the high-frequency component integrating circuit 8, the luminance contrast calculating circuit 9, the R-Y component integrating circuit 31 and the B-Y component integrating circuit 32 shown in FIG. 1. The circuit 812 performs a calculation on a field-by-field basis for determining a perspective image characteristic value of each of the plural parallax calculation regions defined in the one-field screen.

The high-frequency component integrating circuit 8 performs a calculation on a per-field basis for determining a high-frequency component integration value of each of the plural parallax calculation regions E1 to E12 previously defined in the one-field screen, as shown in FIG. 2. The luminance contrast calculating circuit 9 performs a calculation on a per-field basis for determining a luminance contrast of each of the parallax calculation regions E1 to E12. The R-Y component integrating circuit 31 performs a calculation on a per-field basis for determining an R-Y component integration value of each of the parallax calculation regions E1 to E12. The B-Y component integrating circuit 32 performs a calculation on a per-field basis for determining a B-Y component integration value of each of the parallax calculation regions E1 to E12. The perspective image characteristic value given by the various in-screen data calculating circuit 812 is supplied to the CPU 830 via the CPU interface 819.

Figure 44:
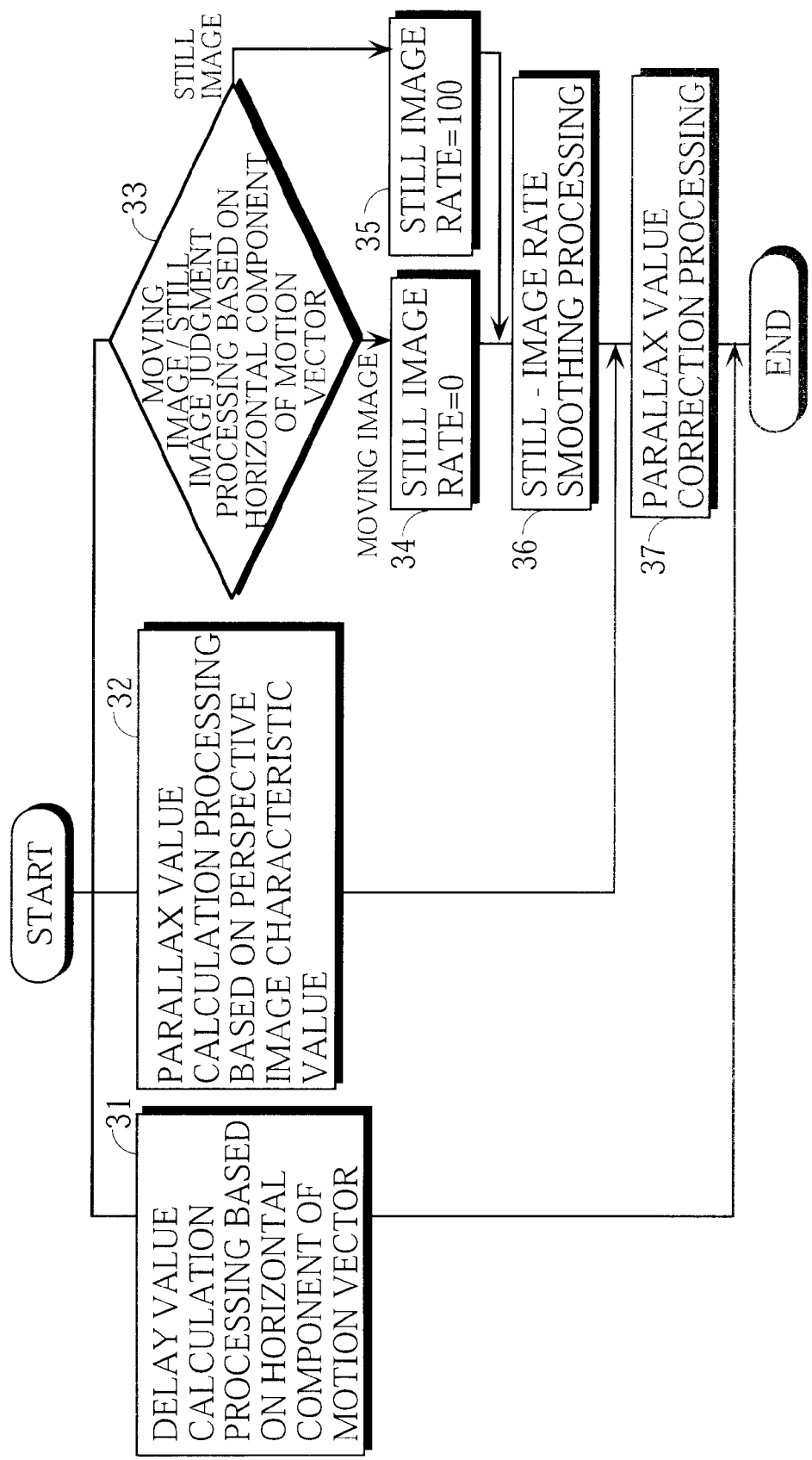
FIG. 44 is a flow chart representing steps of a procedure taken by a CPU 830.
Figure 45:
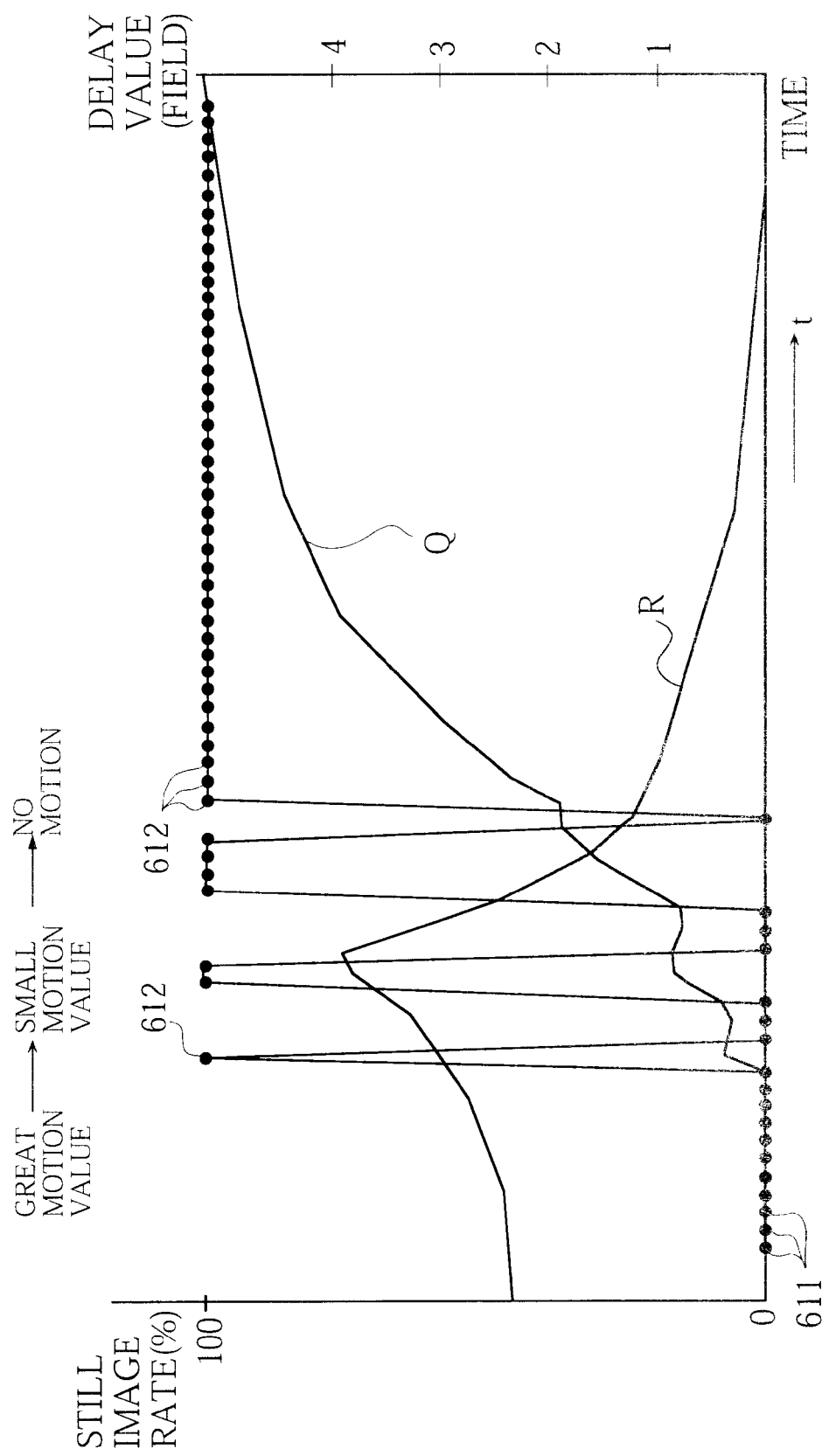
FIG. 45 is a graphical representation of principal variations of the still image rate.

FIG. 44 is a flow chart representing steps taken by the CPU 830.

The CPU 830 calculates a delay value on a per-field basis by using a horizontal component of the motion vector sensed by the motion vector sensing circuit 811, the delay value which is used in the 2D/3D moving image conversion process (Step 31). In this processing, the CPU 830 decides which of the main image and the sub-image to be used as the left eye image, the other used as the right eye image, based on a direction (rightward or leftward) of the horizontal component of the motion vector, the main image serving as the base in the 2D/3D moving image conversion process whereas the sub-image being time-delayed relative to the main image. Results of this decision is represented by way of signs (positive and negative) of the delay values.

As a method of determining the delay value, the algorithm shown in FIG. 3 of Japanese Unexamined Patent Publication No.8(1996)-149513, for example, may be used. Additionally, the algorithm of FIG. 3 of the patent publication No.8(1996)-149513 may be applied to a processing for smoothing the resultant delay values for reduction of delay value variations between fields. The delay value determined by the CPU 830 is supplied to the memory control unit 813.

The CPU 830 calculates parallax information per parallax calculation region in the one-field screen on a field-by-field basis by using the perspective image characteristic value determined by the various in-screen data calculating circuit 812 (Step 32). The algorithm shown in FIG. 12 may be used as the method of calculating the parallax information.

Based on the horizontal component of the motion vector sensed by the motion vector sensing circuit 811, the CPU 830 further determines, on a per-field basis, whether the present field is an image with motion (moving image) or an image with no motion (still image) (Step 33). In the case of the moving image, the CPU sets the still image rate to "0" (Step 34). In the case of the still image, the CPU sets the still image rate to "100" (Step 35). Subsequently, a still-image rate smoothing processing is performed for reduction of still image rate variations between fields (Step 36).

Figure 16:
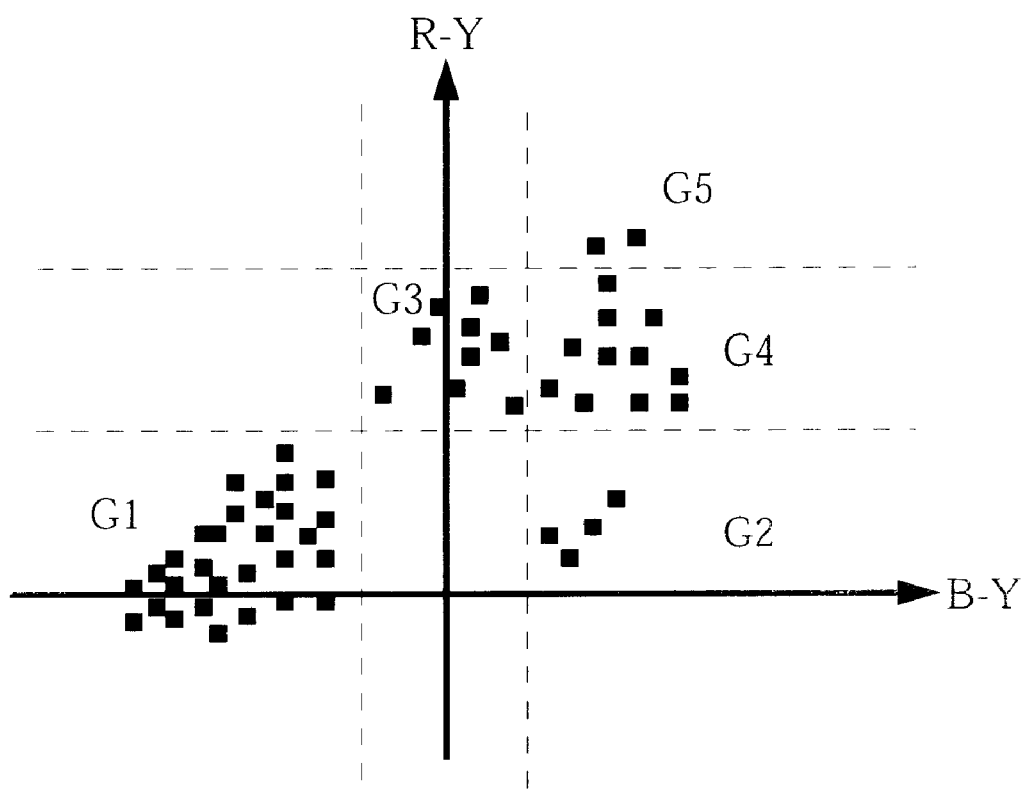
FIG. 16 is a graphical representation of a distribution of the parallax calculation regions with the normalized values of R-Y component integration values plotted as ordinate and the normalized values of B-Y component integration values plotted as abscissa.
Figure 17:
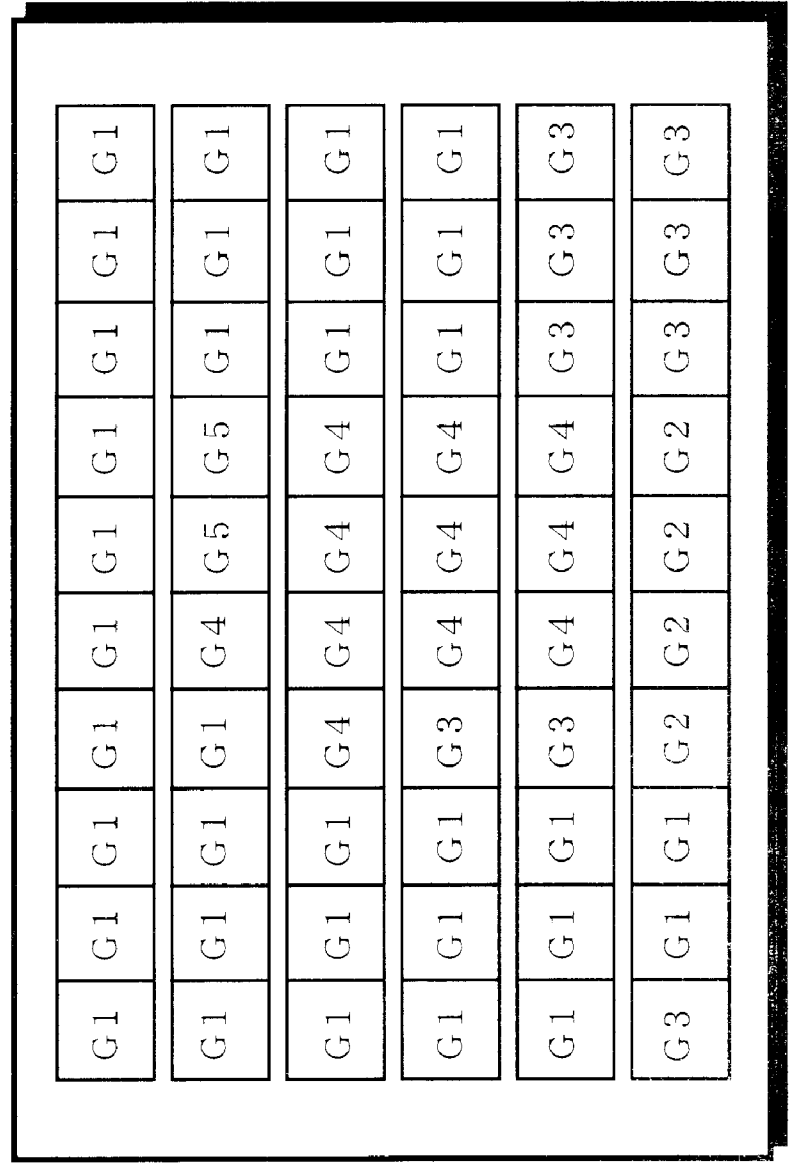
FIG. 17 is a schematic diagram showing a result of the grouping processing based on the graph of FIG. 16.
Figure 18:
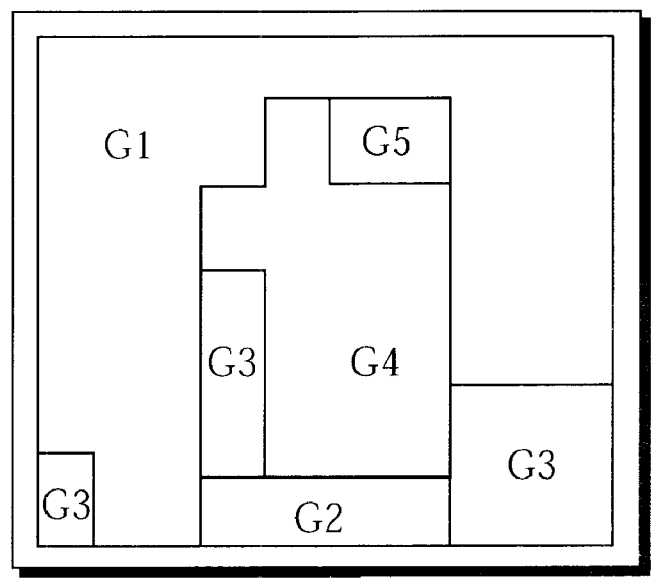
FIG. 18 is a schematic diagram showing the result of the grouping processing based on the graph of FIG. 16.
Figure 19:
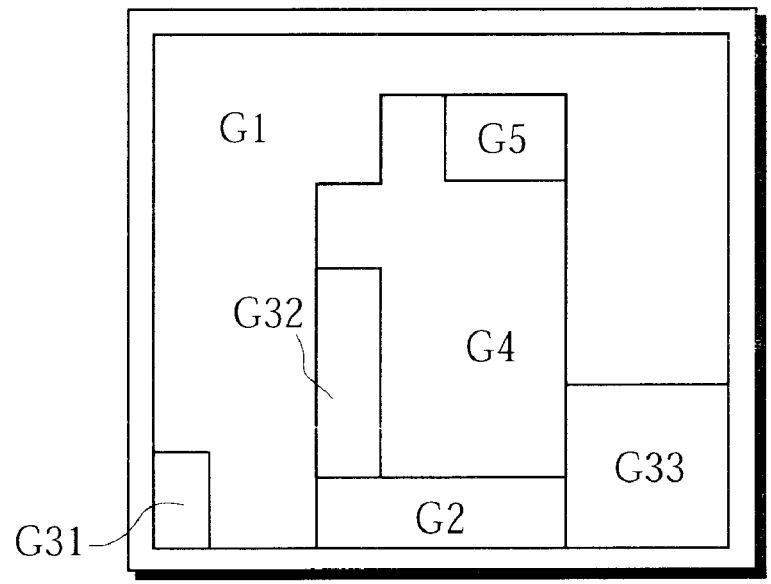
FIG. 19 is a schematic diagram showing a result of the grouping processing corrected through a spatial separation processing.
Figure 20:
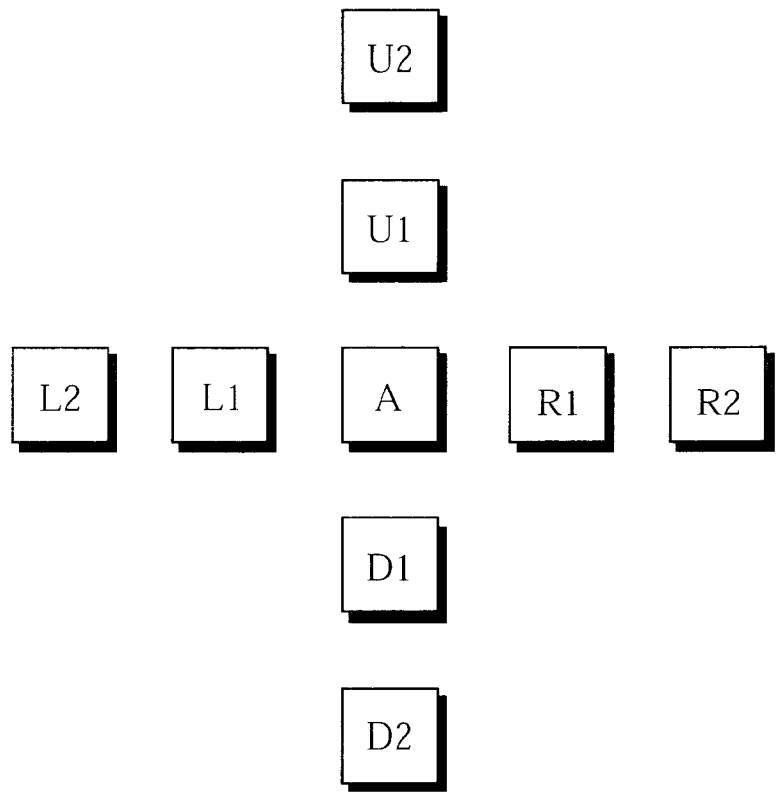
FIG. 20 is a schematic diagram for illustration of a singular point processing.
Figure 21:
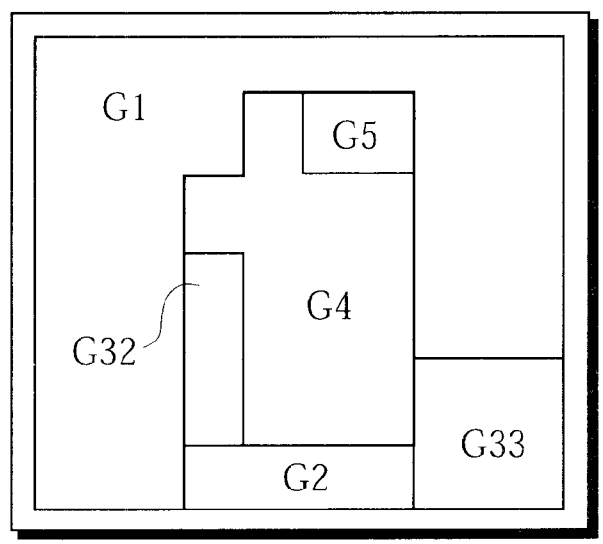
FIG. 21 is a schematic diagram showing a result of the grouping processing corrected through the singular point processing.
Figure 23:
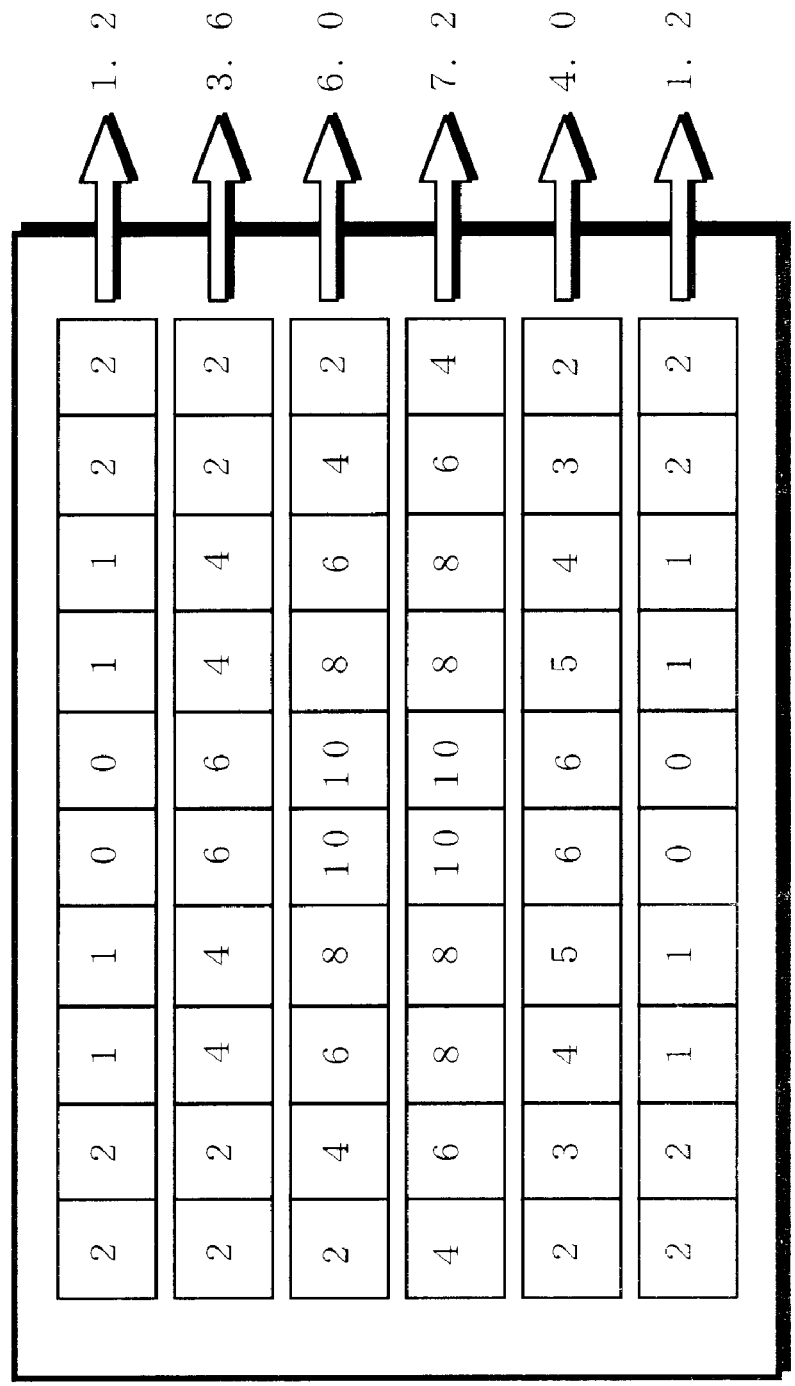
FIG. 23 is a schematic diagram showing one example of depth information on the respective parallax calculation regions prior to a depth correction processing.
Figure 24:
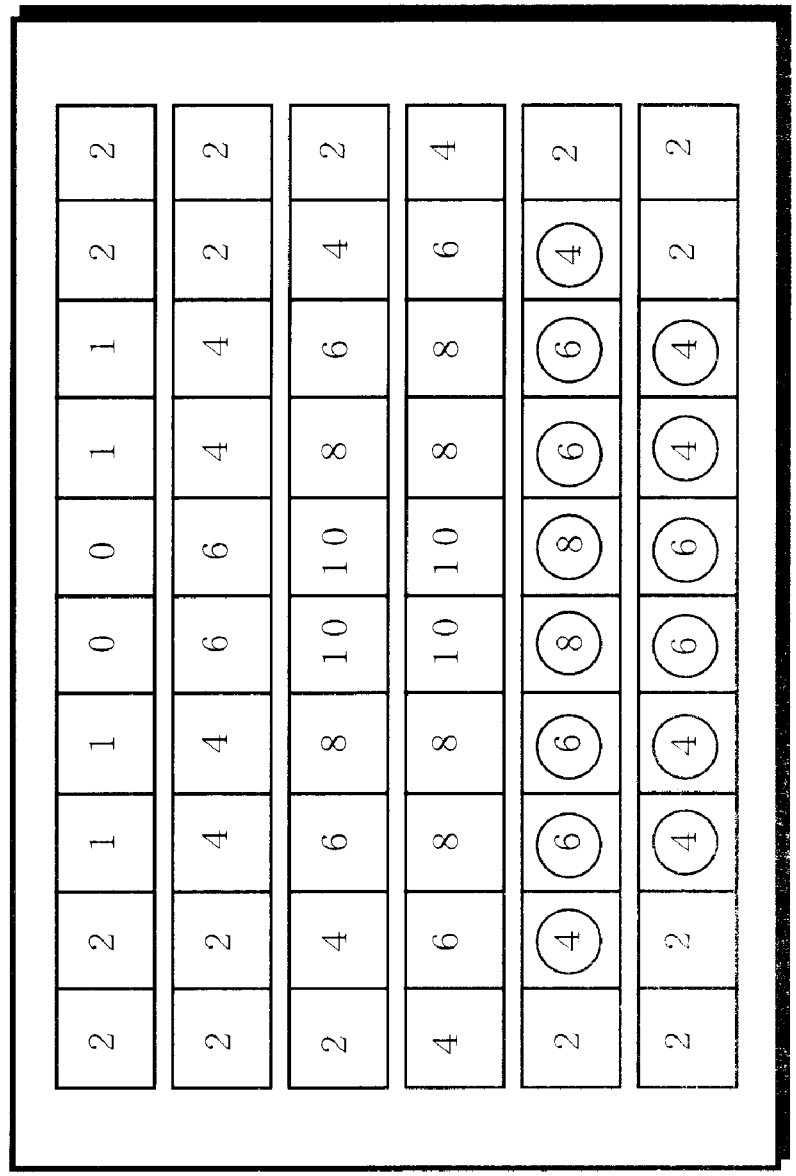
FIG. 24 is a schematic diagram showing corrected depth information on the respective parallax calculation regions.
Figure 25:
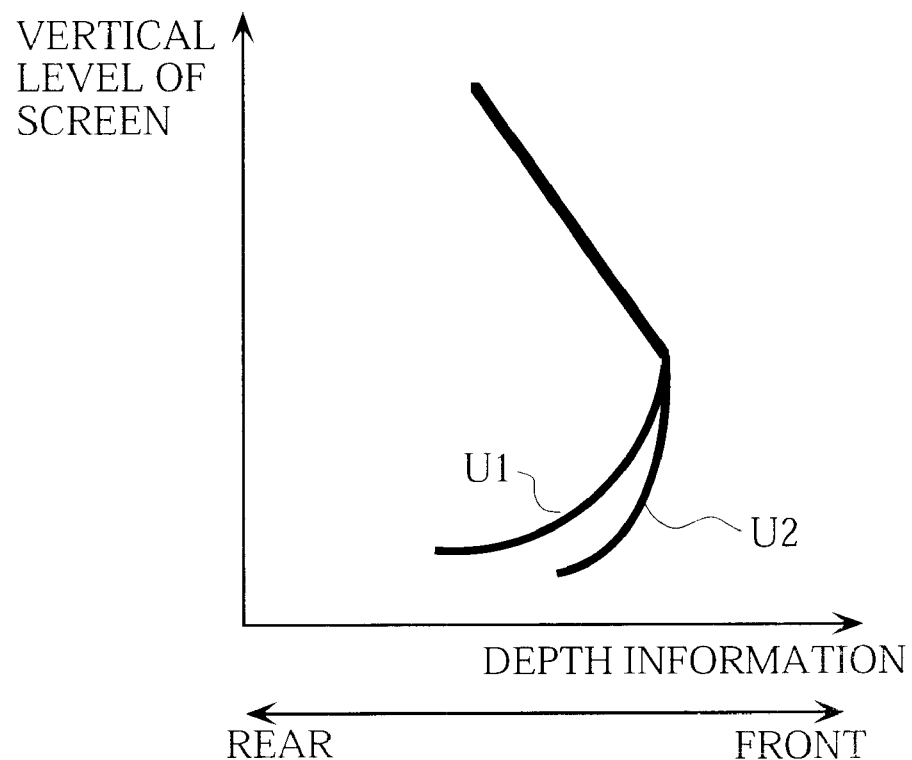
FIG. 25 is a graphical representation of a relation of the depth information versus vertical level of screen prior to the depth correction processing and a relation of the corrected depth information versus the vertical level of screen.
Figure 26:
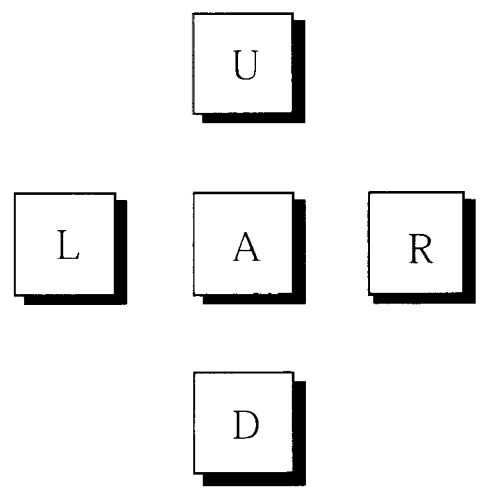
FIG. 26 is a schematic diagram for illustrating an in-group depth information correction processing.
Figure 27:
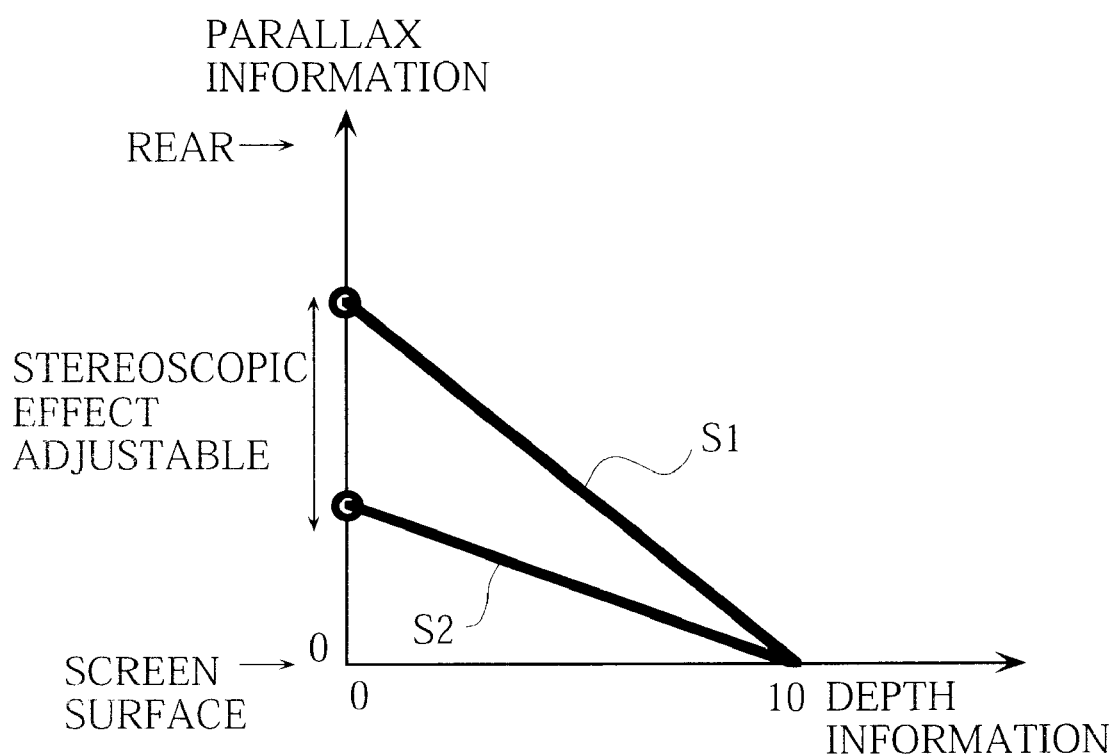
FIG. 27 is a graphical representation of a relation between the depth information and parallax information.

The still-image rate smoothing processing is the same as that of Step 16 shown in FIG. 16 and therefore, a description thereof is omitted. Such a still-image rate smoothing processing permits the still image rate to progressively vary between fields even if the input image is switched between the moving image and the still image. For example, a curve Q in FIG. 45 represents variations of the still image rate subjected the still-image rate smoothing processing when an input image has a great amount of motion which gradually decreases to zero. In FIG. 45, dots represented by a reference numeral 611 denotes a still image rate of "0" set at Step 34 when the present field is determined to be the moving image whereas dots represented by a reference numeral 612 denotes a still image rate of "100" set at Step 35 when the present field is determined to be the still image. A curve R represents variations of the delay value.

When the still image rate is calculated by the smoothing processing at Step 36 and the parallax information per parallax calculation region in the one-field screen is calculated at Step 32, the CPU 830 performs a correction processing for correcting the parallax information per parallax calculation region determined at Step 32 (Step 37). More specifically, the CPU 830 multiplies the parallax information per parallax calculation region computed at Step 32 by the still image rate determined through the smoothing processing of Step 16, thereby correcting the parallax information. The parallax information thus obtained is supplied to the parallax control circuit 818.

Based on the delay value supplied from the CPU 830, the memory control unit 813 decides a field memory to which an input image is written and a field memory from which an image signal is read out. Further, the memory control unit 813 applies a selection control signal to the right-eye image selection circuit 814 and the left-eye image selection circuit 815 based on the sign of the delay value.

It is assumed hereafter for convenience of illustration that the input image itself is used as the main image while an image read out from the field memory is used as the sub-image time-delayed relative to the main image. The main image is applied to a first input terminal of the right-eye image selection circuit 814 and to a first input terminal of the left-eye image selection circuit 815. The sub-image is applied to a second input terminal of the right-eye image selection circuit 814 and to a second input terminal of the left-eye image selection circuit 815.

The selection circuits 814, 815 each respond to the selection control signal from the memory control unit 813 for selectively outputting either one of the image signals applied to the first and second input terminals thereof. Thus, the main image is outputted from one of the selection circuits 814, 815 while the sub-image is outputted from the other circuit.

The parallax control circuit 818 shown in FIG. 43 generates parallax information per pixel based on the parallax information per parallax calculation region supplied from the CPU 830. The parallax control circuit 818 of FIG. 43 is equivalent to the parallax control circuit 4 of FIG. 1 and more specifically, to the circuit occupying the portion indicated at 701 in FIG. 28. However, the parallax information per parallax calculation region applied to the parallax control circuit 818 differs from that applied to the parallax control circuit 4 of FIG. 1 in that the parallax information applied to the circuit 818 takes the still image rate into consideration. Except for this, the parallax control circuit 818 of FIG. 43 operates the same way as the portion of the reference numeral 701 in FIG. 28 and therefore, a description thereof is omitted.

The right-eye parallax generating circuit 816 and the left-eye parallax generating circuit 817 perform the horizontal phase control on each pixel of the right-eye and the left-eye image signals based on the parallax information corresponding to the pixel and supplied from the parallax control circuit 818, the right-eye and left-eye image signals obtained through the 2D/3D moving image conversion process.

The right-eye parallax generating circuit 816 shown in FIG. 43 is equivalent to the circuit indicated at 702 in FIG. 28 whereas the left-eye parallax generating circuit 817 shown in FIG. 43 is equivalent to the circuit indicated at 703 in FIG. 28. However, image signals applied to the right-eye parallax generating circuit 816 and the left-eye parallax generating circuit 817 differ from those applied to the circuits of the reference numerals 701, 703 in FIG. 28 in that the signals applied to the circuits 816, 817 are obtained through the 2D/3D moving image conversion process. Except for this, the right-eye parallax generating circuit 816 and the left-eye parallax generating circuit 817 of FIG. 43 operate the same way as the circuits 702, 703 of FIG. 28, respectively, and therefore, a detailed description thereof is omitted.

In the above second embodiment, the right eye image and the left eye image are constantly produced through the 2D/3D moving image conversion process. The right eye image and the left eye image thus produced through the 2D/3D moving image conversion process are subject to the phase control based on the parallax information per pixel obtained through a similar method to the 2D/3D still image conversion method.

It is to be noted that when the still image rate is at a small value, there is used parallax information of a value reduced from the parallax information determined by the normal 2D/3D still image conversion process. The still image rate is subject to the smoothing processing such that the still image rate variations between fields may be suppressed even when the input image is switched between the moving image and the still image. Hence, the parallax variations are reduced when the input image is switched between the still image and the moving image.

[3] Third Embodiment

Now, a third embodiment of the invention will be described with reference to FIGS. 46 to 52.

Figure 46:
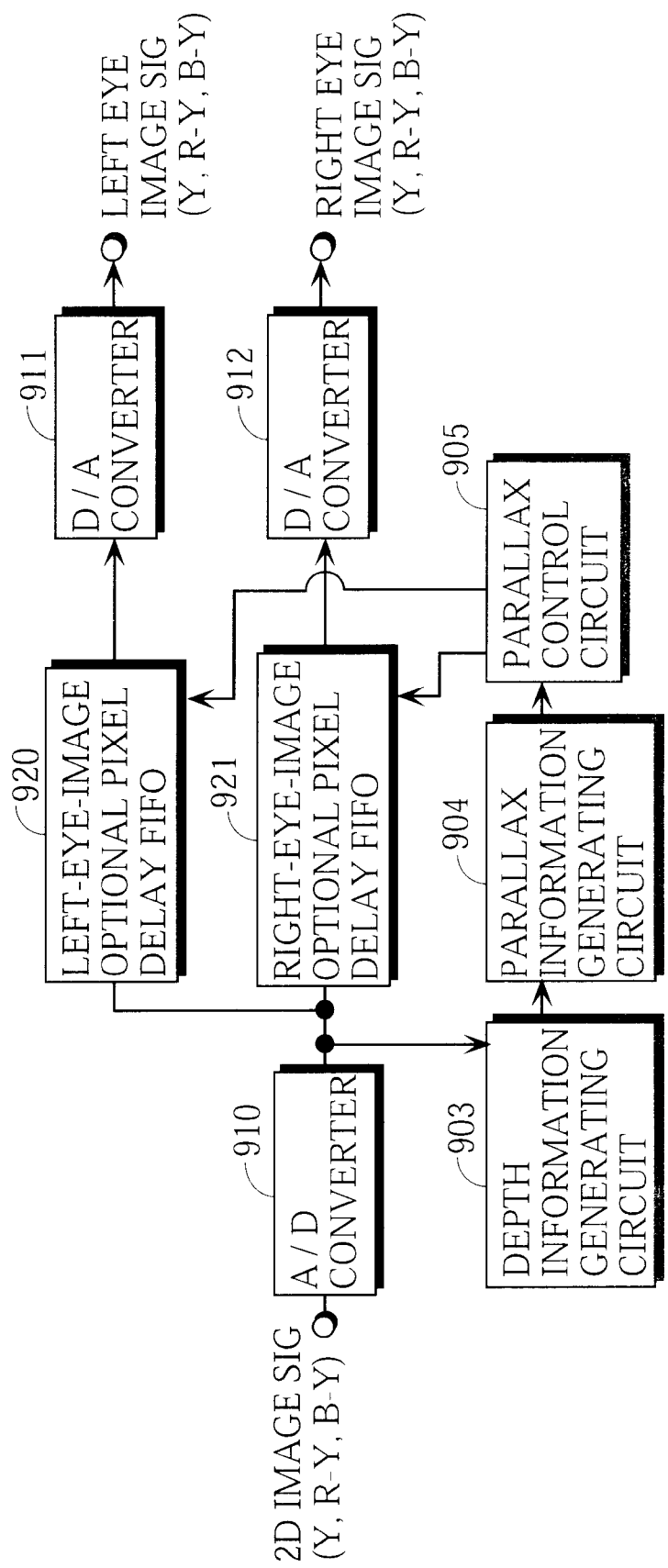
FIG. 46 is a block diagram showing a whole construction of a 2D/3D image conversion system according to a third embodiment of the invention.

FIG. 46 diagrammatically illustrates a construction of a 2D/3D image conversion system for converting 2D images into 3D images.

A 2D image signal includes a luminance signal Y and color difference signals R-Y and B-Y, each of which is converted into a digital signal by an A/D converter 910 and then sent to a left-eye-image optional pixel delay FIFO 920, a right-eye-image optional pixel delay 921 and a depth information generating circuit 903. The left-eye-image optional pixel delay FIFO 920 and the right-eye-image optional pixel delay FIFO 921 sequentially write the respective 2D image signals digitally converted. Although not shown in the figure, there are provided left-eye-image optional pixel delays FIFOs and right-eye-image optional pixel delays FIFOs dedicated to the respective 2D image signals Y, R-Y and B-Y.

The depth information generating circuit 903 generates, from the 2D image signal, depth information indicating a perspective image characteristic of each of the plural parallax calculation regions F1 to F60 previously defined in the one-field screen, as shown in FIG. 13, subsequently sending the resultant depth information to a parallax information generating circuit 904. A method of generating the depth information will be described in detail hereinafter.

The parallax information generating circuit 904, in turn, generates, from the depth information, parallax information on each parallax calculation region, subsequently sending the resultant parallax information to a parallax control circuit 905.

The parallax control circuit 905, in turn, generates parallax information per pixel position in one field based on the parallax information per parallax calculation regions F1 to F60. Based on the parallax information per pixel position, the parallax control circuit provides control such that the respective image signals are sequentially read out from the left-eye-image optional pixel delay FIFO 920 and the right-eye-image optional pixel delay FIFO 921 in timings shifted from each other. This produces parallax between a left eye image and a right eye image of the same field. The respective image signals read out from the left-eye-image optional pixel delay FIFO 920 and the right-eye-image optional pixel delay FIFO 921 are converted into analog signals by D/A converters 911, 912. Subsequently, a 3D image signal including the analog left-eye and right-eye image signals is outputted.

The outputted 3D image signal is committed to a 3D display unit (not shown) while, of the displayed images, the left eye image is viewed only by the left eye and the right eye image is viewed only by the right eye whereby a 3D image with a perspective effect is established.

Incidentally, the configuration of the parallax control circuit 905 is illustrated as the portion of the reference numeral 701 in FIG. 28 and therefore, the description thereof is omitted.

Figure 47:
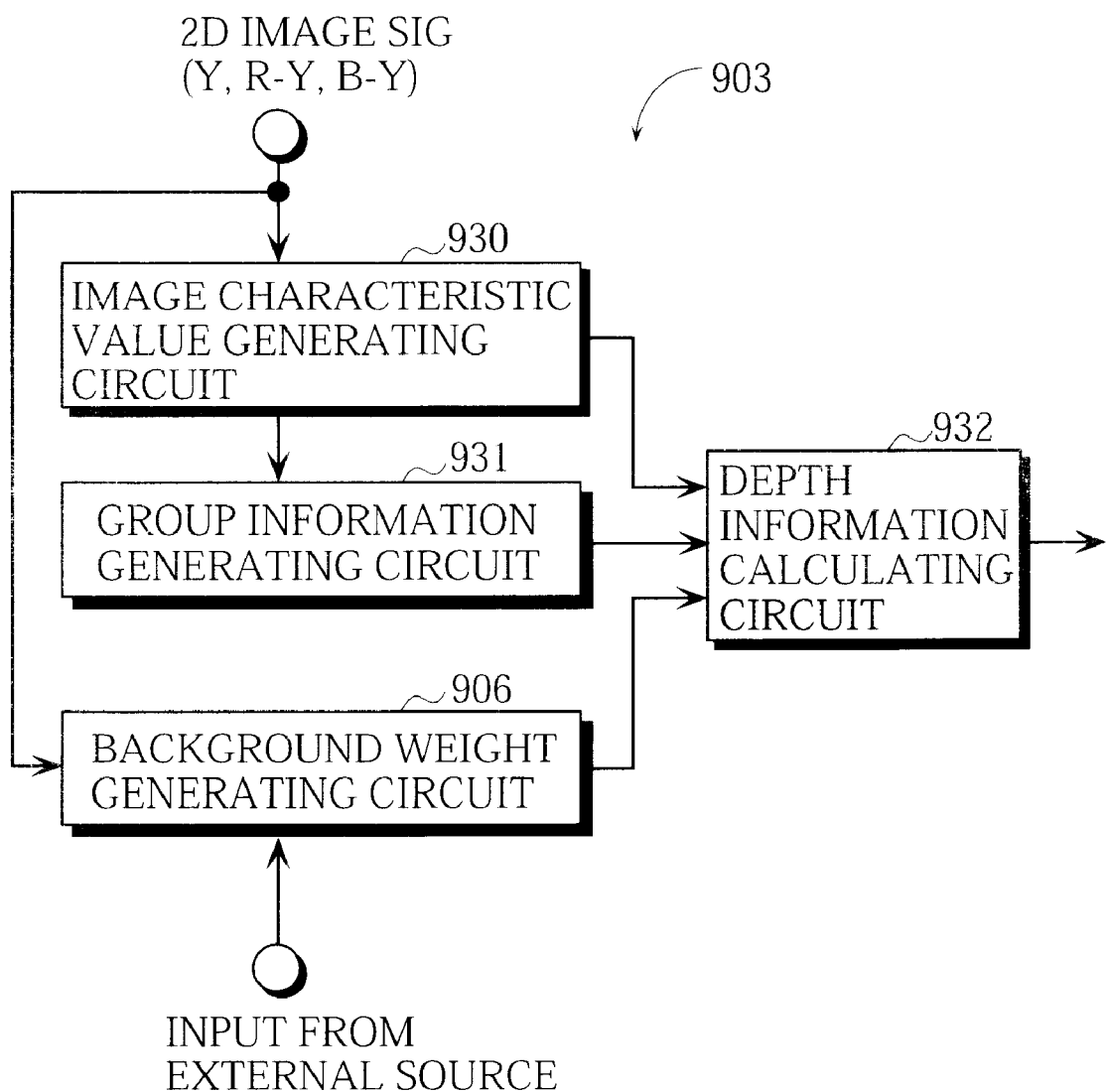
FIG. 47 is a block diagram showing a configuration of a depth information generating circuit.

FIG. 47 diagrammatically illustrates a configuration of the depth information generating circuit 903. The respective digitized 2D image signals are applied to an image-characteristic value generating circuit 930. The image-characteristic value generating circuit 930 includes the high-frequency component integrating circuit 8, luminance contrast calculating circuit 9, R-Y component integrating circuit 31 and B-Y component integrating circuit 32 shown in FIG. 1, serving to calculate, on a per-field basis, a perspective image characteristic value of each of the plural parallax calculation regions F1 to F60 defined in the one-field screen.

In typical images, the focus is mostly on an object in front view. Accordingly, it is believed that the more to the front is the object, the greater are the high-frequency component, contrast, luminance and chroma, thus the greater are the image characteristic values such as luminance/high-frequency component integration value, luminance contrast and the like.

Of the image characteristic values generated by the image-characteristic value generating circuit 930, the R-Y signal component integration value and the B-Y signal component integration value are applied to a group information generating circuit 931. Additionally, the luminance/high-frequency component integration value may sometimes be applied to the group information generating circuit 931. Of the aforesaid image characteristic values, the luminance/high-frequency component integration value and the luminance contrast are applied to a depth information calculating circuit 932.

The group information generating circuit 931 uses the image characteristic values for dividing the parallax calculation regions into some groups on a basis of object included in the one-field image so as to generate group information indicating to which group each parallax calculation region belongs. The resultant group information is supplied to the depth information calculating circuit 932. The depth information calculating circuit 932, in turn, calculates the depth information on a group-by-group basis.

Figure 12:
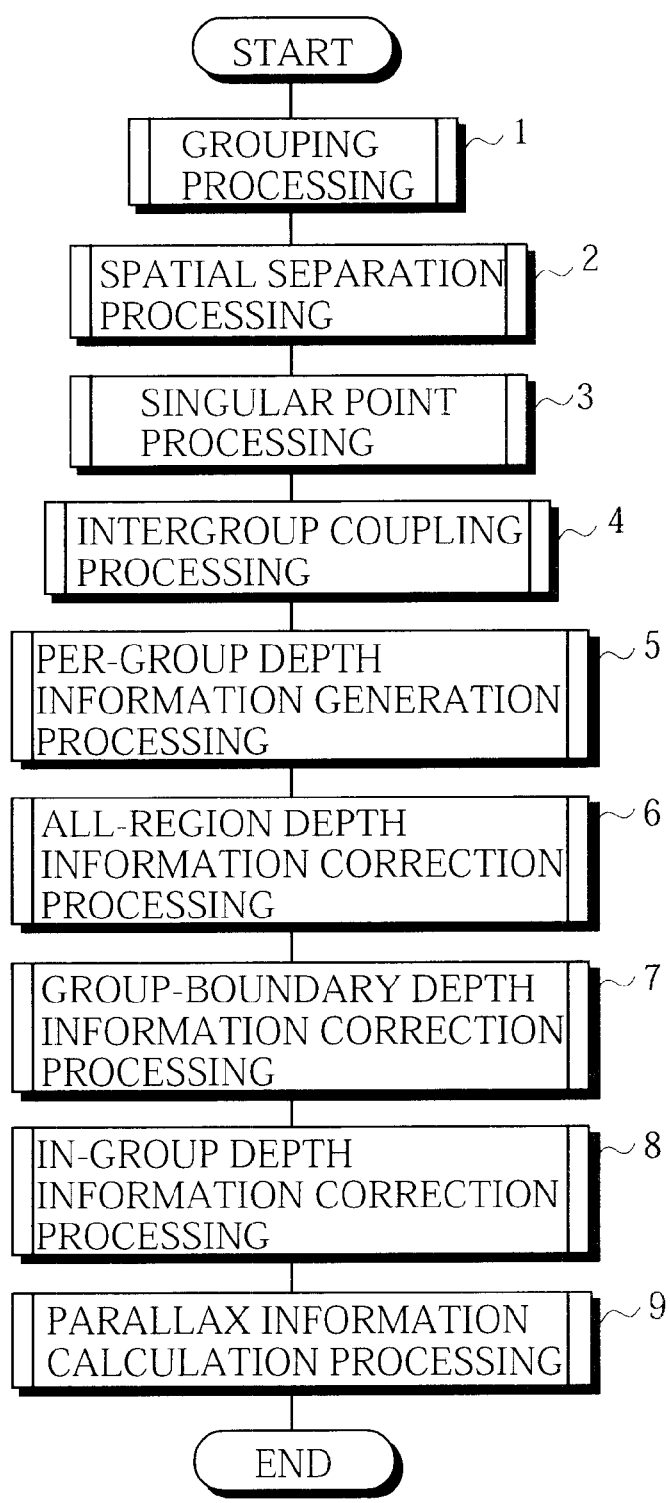
FIG. 12 is a flow chart representing steps in a parallax information generating procedure taken by a CPU.
Figure 14:
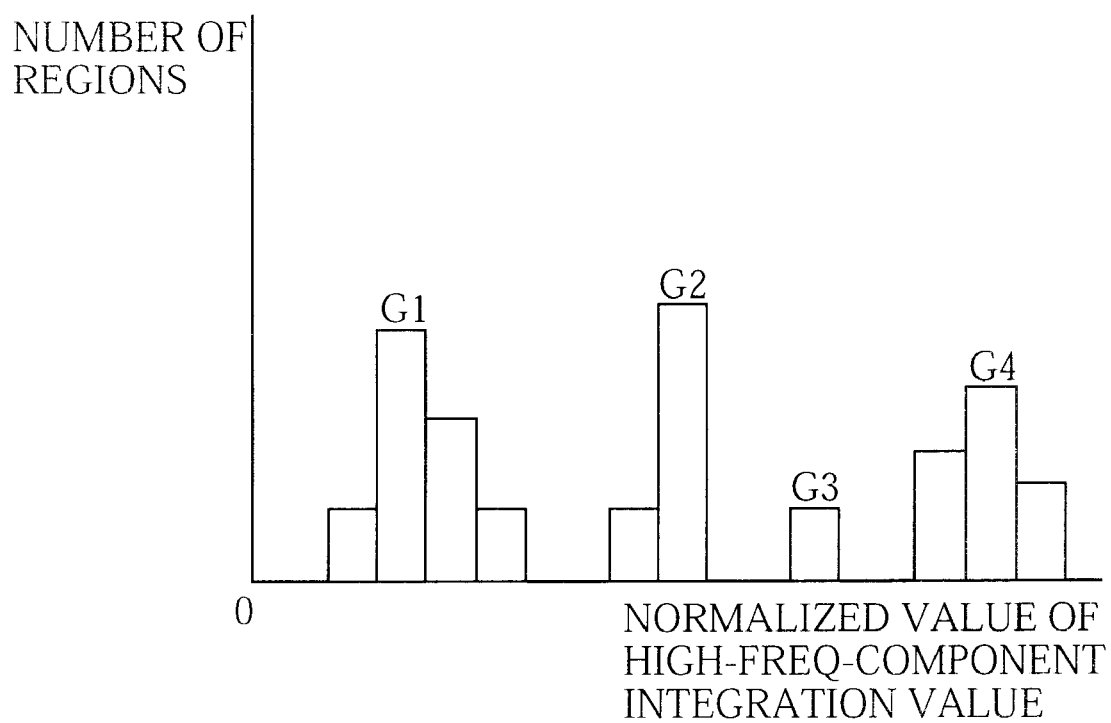
FIG. 14 is a histogram representing numbers of parallax calculation regions with respect to respective normalized values of high-frequency integration values.

The method, wherein the image characteristic values are used for dividing the parallax calculation regions into some groups on a basis of object included in the one-field image, has been described with reference to Steps 1 to 4 shown in FIG. 12 and therefore, the description thereof is omitted.

In the calculation of the depth information, the background weight as well as the aforesaid image characteristic value are used. The background weight is a numerical value specified for each parallax calculation region and used for improvement of the depth information precision. Since the background weight is variable in this embodiment, the depth information generating circuit 903 includes a background weight generating circuit 906 for generating the background weight.

A configuration of the background weight generating circuit 906 will be described hereinafter.

The depth information calculating circuit 932 calculates the depth information on a group-by-group basis by using the luminance/high-frequency component integration value and the luminance contrast supplied thereto from the image-characteristic value generating circuit 931 on a per-parallax-calculation-region basis, the group information per field image supplied thereto from the group information generating circuit 931, and the background weight per parallax calculation region supplied thereto from the background weight generating circuit 906.

Now, description will be made on a method of calculating depth information on one optional group. First, a number n of parallax calculation regions belonging to the group is found. Further, there is found a total sum Σa of normalized values a of luminance/high-frequency component integration values of the above parallax calculation regions. Similarly, a total sum Σb of normalized values b of luminance contrasts and a total sum Σc of background weight components c of the above parallax calculation regions are found.

Then, depth information H on the above group is found by using the following equation (16):

$$H = (K1_1 \cdot \Sigma a + K2 \cdot \Sigma b + K3 \cdot \Sigma c) \div n \tag{16}$$

where K1, K2 and K3 denote factors defined as, for example, K1=3/8, K2=1/8 and K3=4/8.

The above depth information H is subject to a suitable correction processing and then supplied to the parallax information generating circuit 904.

Figure 48:
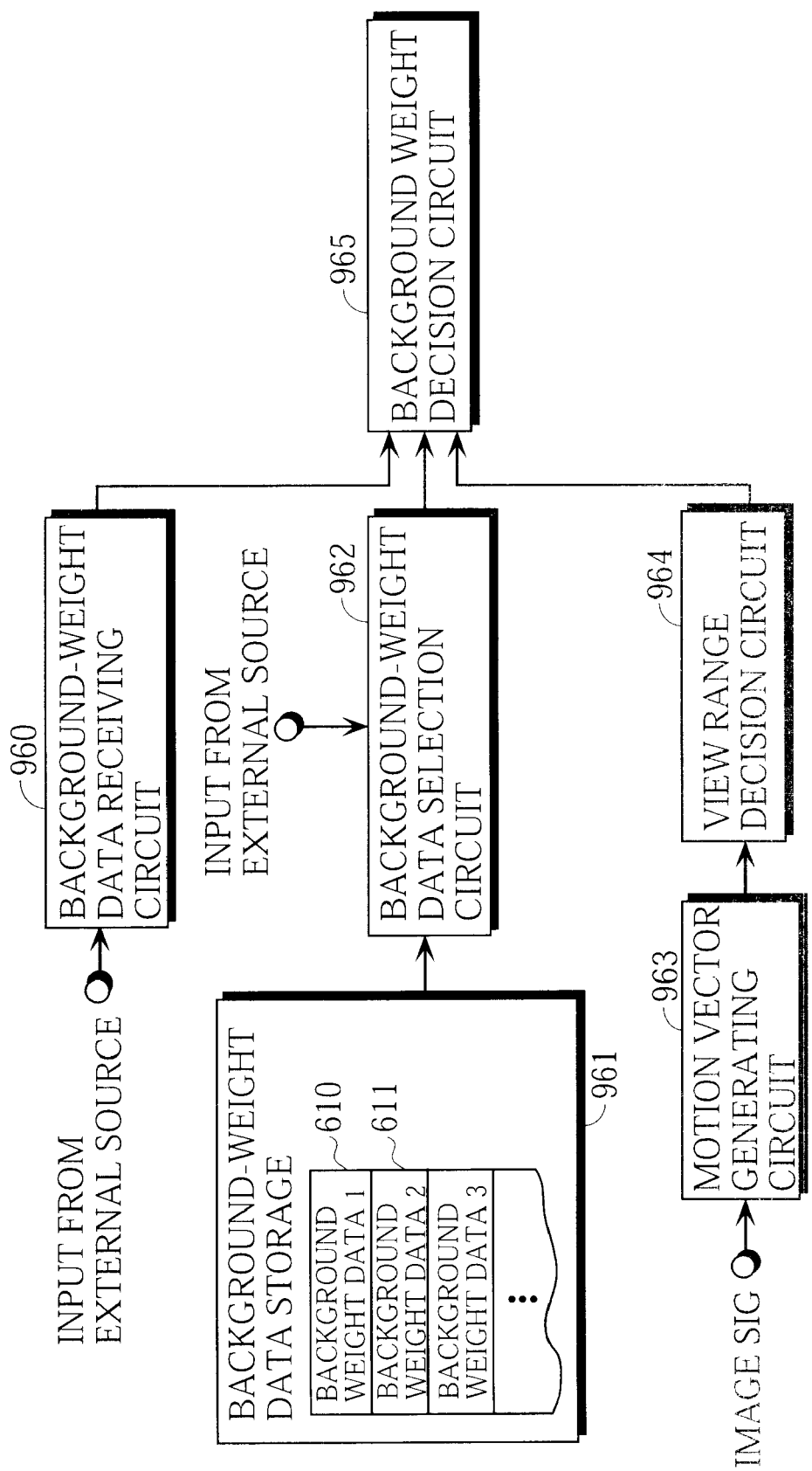
FIG. 48 is a block diagram showing a configuration of a background weight generating circuit.

FIG. 48 diagrammatically illustrates a configuration of the background weight generating circuit 906.

The background weight generating circuit 906 includes a background-weight data receiving circuit 960 for receiving from an external source, such as a computer, background weight data including background weights of the respective parallax calculation regions. The background weight data received by the background-weight data receiving circuit 960 is supplied to a background weight decision circuit 965.

The background weight generating circuit 906 includes a background-weight data storage 961 for storing plural pieces of background weight data abovementioned and a background-weight data selection circuit 962 responsive to an external instruction such as through contact input for selectively reading a desired background weight data piece from the background-weight data storage 961. The background data piece read out by the background-weight data selection circuit 962 is supplied to the background weight decision circuit 965 which will be described hereinafter.

The background weight generating circuit 906 further includes a motion vector generating circuit 963 for generating from the 2D image signal a motion vector per parallax calculation region, and a view range decision circuit 964 which determines, from the motion vector, a view range of each parallax calculation region and generates background weight data based on this determination. The background weight data generated by the view range decision circuit 964 is supplied to the background weight decision circuit 965 which will be described hereinafter. Incidentally, a method of generating from a 2D image signal a motion vector per given region and determining a view range per given region based on the motion vector is set forth in, for example, Japanese Unexamined Patent Publication No.7(1995)-88276 and therefore, the description thereof is omitted.

The background weight decision circuit 965 suitably combines background data supplied from the background-weight data receiving circuit 960, the background-weight data selection circuit and the view range decision circuit 964. The background data thus combined by the background weight decision circuit 965 is supplied to the depth information calculating circuit 932.

As to this embodiment, the background weight generating circuit 906 may include at least one selected from the group consisting of (a) the background-weight data receiving circuit 960, (b) the background-weight data storage 961 and the background-weight data selection circuit 962, and (c) the motion vector generating circuit 963 and the view range decision circuit 964.

Now, description will be made on exemplary applications of the third embodiment of the invention.

[3-1] First Exemplary Application

In a first exemplary application, there is considered a case where besides the normal 2D image, a 2D image, such as of an exit of a tunnel or viewed through the endscope, wherein a rear view occupies a central portion thereof and a front view occupies a peripheral portion thereof is inputted in the 2D/3D image conversion system.

According to the first exemplary application, the background weight generating circuit 906 utilizes the background-weight data storage 961 and the background-weight data selection circuit 962 for generation of the background weight data. In the background-weight data storage 961, typical background weight data, referred to as "background weight data 1", wherein the central and lower portions of the image have greater values than the peripheral and upper portions, as shown in FIG. 49, is committed to storage at a first data storage portion 610 of FIG. 48. On the other hand, background weight data, referred to as "background weight data 2", wherein the peripheral portion of the image have greater values than the central portion as shown in FIG. 50 is committed to storage at a second data storage portion 611.

An arrangement is made such that when the normal image is inputted in the 2D/3D image conversion system, the background-weight data selection circuit 962 selects the first data storage portion 610 for reading out the background weight data 1, which is applied to the depth information calculating circuit 932. When, on the other hand, the image viewed through the endscope is inputted in the system, the background-weight data selection circuit 962 responds to the external instruction such as through the contact input for selecting the second data storage portion 611 thereby to read out the background weight data 2, which is applied to the depth information calculating circuit 932.

Thus, the first exemplary application is adapted to select a background weight suitable for the input image and apply the background weight thus selected to the depth information calculating circuit 932, so that the depth information calculating circuit 932 is allowed to generate depth information suitable for the input image. As a result, the production of a 3D image precisely corresponding the input image is ensured.

[3-2] Second Exemplary Application

In a second exemplary application, there is considered a case where both a moving image and a still image are inputted in the 2D/3D image conversion system.

According to the second exemplary application, the background weight generating circuit 906 utilizes the background-weight data storage 961, the background-weight data selection circuit 962, the motion vector generating circuit 963 and the view range decision circuit 964 for the generation of the background weight data. An arrangement is made such that the aforesaid background weight data 1 is previously stored in the background-weight data storage 961 while the background-weight data selection circuit 962 is adapted to constantly read out the background weight data 1 for applying the same to the background weight decision circuit 965.

When the moving image is inputted in the 2D/3D image conversion system, the motion vector generating circuit 963 generates motion vectors for permitting the view range decision circuit 964 to provide a favorable view range determination with few undecidable regions N, as shown in FIG. 51. Hence, the background weight decision circuit 965 can suitably select the background weight data supplied from the view range decision circuit 964, thus sending the data thus selected to the depth information calculating circuit 932.

On the other hand, when the still image is inputted in the 2D/3D image conversion system or when a scene of the present field is changed from that of the preceding field (scene change), the generation of motion vectors is difficult. Therefore, the background weight decision circuit 965 selects the background weight data 1 via the background-weight data selection circuit 962 thereby to send the same to the depth information calculating circuit 932.

Figure 52:
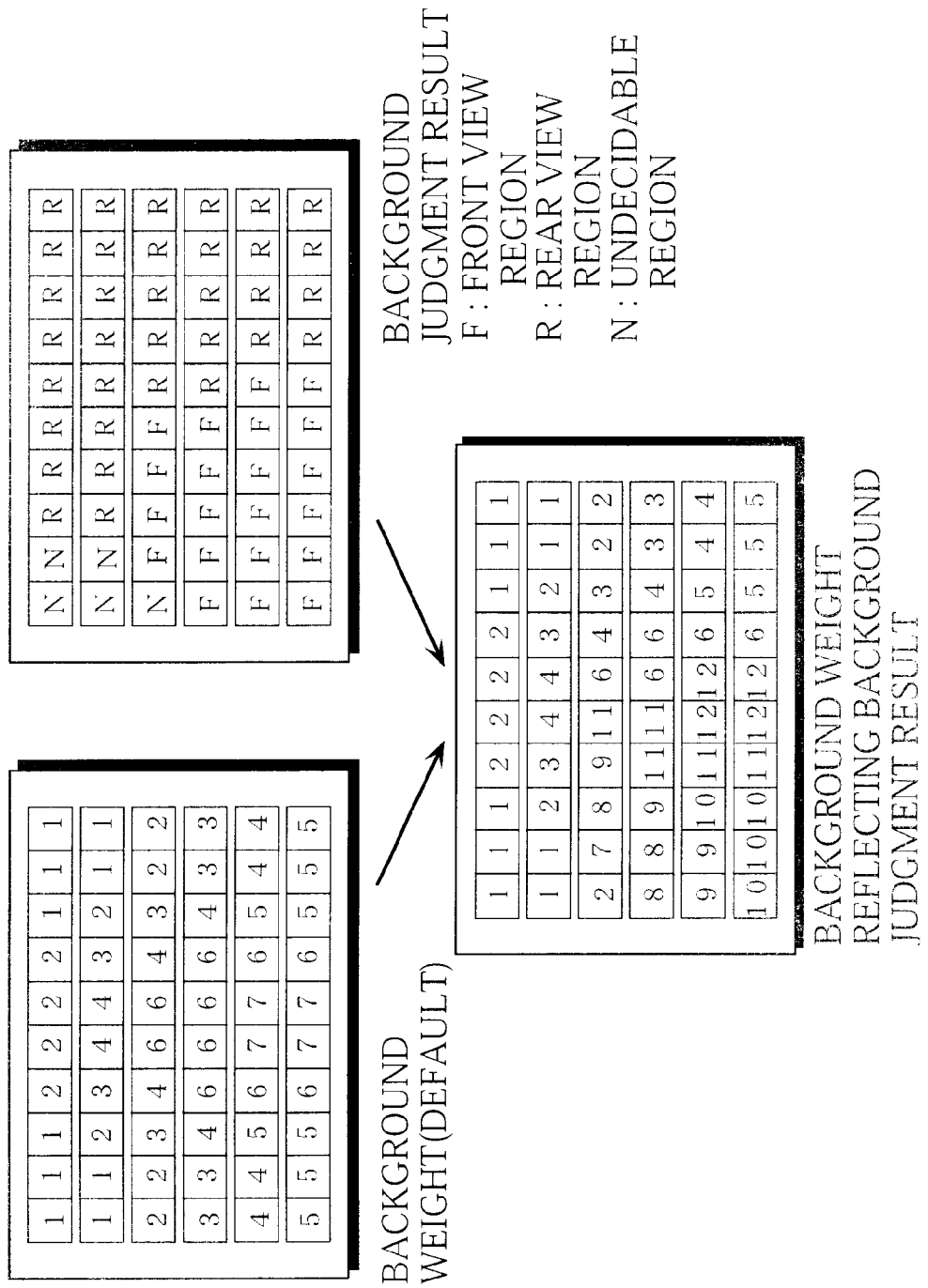
FIG. 52 is a schematic diagram showing background weights generated by combining the general background weights and the results of the view range decision.

In a case where a 2D image with obscure motion is inputted in the 2D/3D image conversion system, a view range decision based on the motion vector is low in reliability. Therefore, the background weight decision circuit 965 receives both the background weight data from the view range decision circuit 964 and the background weight data 1 from the background-weight data selection circuit 962 so as to combine the both in the following manner before sending the resultant data to the depth information calculating circuit 932. Specifically, in the background weight data supplied from the view range decision circuit 964, a background weight component of the front view region F is represented by "5", that of the rear view region R by "0" and that of the undecidable region N by "0", as shown in FIG. 52. These components are added to the background weight components of corresponding regions of the background weight data 1 supplied from the background-weight data selection circuit 962 and the respective sums are supplied to the depth information calculating circuit 932.

Thus, the second exemplary application permits the generation of background weight components corresponding to both the moving image and to the still image, respectively. As a result, the production of favorable 3D images corresponding to both the moving images and the still images is ensured.

[3-3] Third Exemplary Application

In a third exemplary application, there is considered a case where an image signal together with front-view region specifying data are inputted in the 2D/3D image conversion system from a personal computer, the front-view region specifying data specifying a region of the parallax calculation regions which is desired to correspond to the front view.

According to the third exemplary application, the background weight generating circuit 906 utilizes the background-weight data receiving circuit 960 for the generation of the background weight data. The background-weight data receiving circuit 960 receives front-view region specifying data from the personal computer so as to send the same to the depth information calculating circuit 932.

Thus, the third exemplary application permits an external device to specify a region corresponding to the front view. The third exemplary application is useful when, in a computer system featuring a multi-window, a user desires a specific window (e.g., an active window) of a plurality of windows shown on the display to constitute the front view.

What is claimed is:

1. A system for converting a 2D image into a 3D image comprising:

depth information generating means which extracts from a 2D input image a perspective image characteristic value of each of a plurality of parallax calculation regions defined in a one-field screen, and generates depth information per parallax calculation region based on the extracted image characteristic value;

target phase value calculating means for calculating a target phase value per parallax calculation region based on a dynamic range of a preset target phase value and on depth information generated by the depth information generating means;

real phase value calculating means which calculates a current real phase value of each parallax calculation region in a manner to progressively approximate a current real phase value to a target phase value of a parallax calculation region with a corresponding previous real phase value, and then determines a current real phase value in the one-field screen based on the current real phase value per parallax calculation region thus obtained; and, phase control means for generating a first image signal and a second image signal from a signal residing in each given unit area of the 2D input image, the first and second image signals having a horizontal phase difference therebetween based on the current real phase value.

2. A system for converting a 2D image into a 3D image as set forth in claim 1, wherein the real phase value calculating means calculates an amount of image motion per parallax calculation region based on the 2D input image so as to calculate a current real phase value per parallax calculation region in a manner that a real phase value of a parallax calculation region with greater image motion is correspondingly more quickly approximated to a target phase value of the region, and then determines a current real phase value in the one-field screen based on the current real phase value per parallax calculation region thus obtained.

3. A system for converting a 2D image into a 3D image comprising:

depth information generating means which extracts from a 2D input image a perspective image characteristic value of each of a plurality of parallax calculation regions defined in a one-field screen, and generates depth information per parallax calculation region based on the extracted image characteristic value;

correction means for correcting a dynamic range of a preset target phase value thereby decreasing the dynamic range of the target phase value when a maximum value of depth information differences between respective pairs of adjacent regions exceeds a reference value;

target phase value calculating means for calculating a target phase value per parallax calculation region based on the dynamic range of the target phase value given by the correction means and on depth information generated by the depth information generating means;

real phase value calculating means which calculates a current real phase value per parallax calculation region in a manner to progressively approximate a current real phase value to a target phase value of a parallax calculation region with a corresponding previous real phase value, and determines a current real phase value in the one-field screen based on the current real phase value per parallax calculation region thus obtained; and phase control means for generating a first image signal and a second image signal from a signal residing in the 2D input image, the first and second image signals having a horizontal phase difference therebetween based on the current real phase value.

4. A system for converting a 2D image into a 3D image as set forth in claim 3, wherein the real phase value calculating means calculates an amount of image motion per parallax calculation region based on the 2D input image so as to calculate a current real phase value per parallax calculation region in a manner that a real phase value of a parallax calculation region with greater image motion is correspondingly more quickly approximated to a target phase value of the region, and then determines a current real phase value in the one-field screen based on the current real phase value per parallax calculation region thus obtained.

5. A system for converting a 2D image into a 3D image comprising:

image converting means which produces from a 2D input image a main image serving as a base and a sub-image time-delayed relative to the main image, and outputs either one of the main image and the sub image as a left eye image and the other as a right eye image;

moving image/still image judging means for determining whether the 2D input image is a moving image or a still image;

still image rate calculating means for calculating a still image rate based on a judgment result given by the moving image/still image judging means;

depth information generating means which extracts from the 2D input image a perspective image characteristic value of each of a plurality of parallax calculation regions defined in a one-field screen, and generates depth information per parallax calculation region based on the extracted image characteristic value;

correction means for correcting a dynamic range of a preset target phase value by multiplying the dynamic range of the target phase value by the still image rate;

target phase value calculating means for calculating a target phase value per parallax calculation region based on the dynamic range of the target phase value corrected by the correction means and on depth information generated by the depth information generating means;

real phase value calculating means which calculates a current real phase value per parallax calculation region in a manner to progressively approximate a current real' phase value to a target phase value of a parallax calculation region with a corresponding previous real phase value, and determines a current real phase value in the one-field screen based on the current real phase value per parallax calculation region thus obtained; and phase control means for performing a horizontal phase control on a signal residing in the right eye image and the left eye image which are outputted by the image converting means, the horizontal phase control being based on a real phase value supplied by the real phase value calculating means.

6. A system for converting a 2D image into a 3D image as set forth in claim 5, wherein the real phase value calculating means calculates an amount of image motion per parallax calculation region based on the 2D input image so as to calculate a current real phase value per parallax calculation region in a manner that a real phase value of a parallax calculation region with greater image motion is correspondingly more quickly approximated to a target phase value of the region, and then determines a current real phase value in the one-field screen based on the current real phase value per parallax calculation region thus obtained.

7. A system for converting a 2D image into a 3D image as set forth in claim 5, wherein the still image rate calculating means includes means for setting the still image rate to "0" when the 2D input image is determined to be a moving image by the moving image/still image judging means while setting the still image rate to "100" when the 2D input image is determined to be a still image, and means for smoothing the set still image rates between fields.

8. A system for converting a 2D image into a 3D image comprising:
    image converting means which produces from a 2D input image a main image serving as a base and a sub-image time-delayed relative to the main image, and outputs either one of the main image and the sub-image as a left eye image and the other as a right eye image;
    moving image/still image judging means for determining whether the 2D input image is a moving image or a still image;
    still image rate calculating means for calculating a still image rate based on a judgment result given by the moving image/still image judging means;
    depth information generating means which extracts from the 2D input image a perspective image characteristic value of each of a plurality of parallax calculation regions defined in a one-field screen, and generates depth information per parallax calculation region based on the extracted image characteristic value;
    first correction means for correcting a dynamic range of a preset target phase value thereby decreasing the dynamic range of the target phase value when a maximum value of depth information differences between respective pairs of adjacent regions exceeds a reference value;
    second correction means for correcting the dynamic range of the target phase value by multiplying the dynamic range of the target phase value, given by the first correction means, by the still image rate;
    target phase value calculating means for calculating a target phase value per parallax calculation region based on the dynamic range of the E target phase value given by the second correction means and on depth information generated by the depth information generating means;
    real phase value calculating means which calculates a current real phase value per parallax calculation region in a manner to progressively approximate a current real phase value to a target phase value of a parallax calculation region with a corresponding previous real phase value, and determines a current real phase value in the one-field screen based on the current real phase value per parallax calculation region thus obtained; and
    phase control means for performing a horizontal phase control on a signal residing in the right eye image and the left eye image which are outputted by the image converting means, the horizontal phase control being based on a real phase value supplied by the real phase value calculating means.

9. A system for converting a 2D image into a 3D image as set forth in claim 8, wherein the real phase value calculating means calculates an amount of image motion per parallax calculation region based on the 2D input image so as to calculate a current real phase value per parallax calculation region in a manner that a real phase value of a parallax calculation region with greater image motion is correspondingly more quickly approximated to a target phase value of the region, and then determines a current real phase value in the one-field screen based on the current real phase value per parallax calculation region thus obtained.

10. A system for converting a 2D image into a 3D image as set forth in claim 8, wherein the still image rate calculating means includes means for setting the still image rate to "0" when the 2D input image is determined to be a moving image by the moving image/still image judging means while setting the still image rate to "100" when the 2D input image is determined to be a still image, and means for smoothing the set still image rates between fields.

11. A system for converting a 2D image into a 3D image comprising:
    image converting means which produces from a 2D input image a main image serving as a base and a sub-image time-delayed relative to the main image, and outputs either one of the main image and the sub image as a left eye image and the other as a right eye image;
    moving image/still image judging means for determining whether the 2D input image is a moving image or a still image;
    still image rate calculating means for calculating a still image rate based on a judgment result given by the moving image/still image judging means;
    parallax information generating means which extracts from the 2D input image a perspective image characteristic value of each of a plurality of parallax calculation regions defined in a one-field screen, and generates parallax information per parallax calculation region based on the extracted image characteristic value;
    parallax information correcting means which corrects the parallax information per parallax calculation region by multiplying the parallax information per parallax calculation region, generated by the parallax information generating means, by the still image rate given by the still image rate calculating means, and generates parallax information in the one-field screen based on each parallax information piece thus corrected; and
    phase control means for performing a horizontal phase control on a signal residing in the right eye image and the left eye image which are outputted by the image converting means, the horizontal phase control being based on the parallax information supplied by the parallax information correcting means.

12. A system for converting a 2D image into a 3D image as set forth in claim 11, wherein the still image rate calculating means includes means for setting the still image rate to "0" when the 2D input image is determined to be the moving image by the moving image/still image judging means while setting the still image rate to "100" when the 2D input image is determined to be the still image, and means for smoothing the set still image rates between fields.

13. A method of converting a 2D image into a 3D image comprising the steps of:
    a first step of producing from a 2D input image a main image serving as a base and a sub-image time-delayed relative to the main image, followed by outputting either one of the main image and the sub-image as a left eye image and the other as, a right eye image;
    a second step of determining whether the 2D input image is a moving image or a still image;
    a third step of calculating a still image rate based on the determination given by the second step;

a fourth step of extracting from the 2D input image a perspective image characteristic value of a each of a plurality of parallax calculation regions defined in a one-field screen, followed by generating parallax information per parallax calculation region based on the extracted image characteristic value;

a fifth step of correcting the parallax information per parallax calculation region by multiplying the parallax information per parallax calculation region generated at the fourth step by the still image rate given by the third step, followed by generating parallax information in the one-field screen based on each parallax information piece thus corrected; and a sixth step of performing a horizontal phase control on a signal residing in each given unit area of the right eye image and the left eye image which are outputted at the first step, the horizontal phase control being based on the parallax information supplied by the fifth step.

14. A method of converting a 2D image into a 3D image as set forth in claim 13, wherein the third step includes a step of setting the still image rate to "0" when the 2D input image is determined by the second step to be a moving image while setting the still image rate to "100" when the 2D input image is determined to be a still image, and a step of smoothing the set still image rates between fields.

* * * * *